(12) United States Patent
Smirnov et al.

(10) Patent No.: US 8,156,514 B2
(45) Date of Patent: Apr. 10, 2012

(54) AUTO BALANCING DEVICE AND DISC CHUCKING DEVICE AND DISC DRIVING DEVICE HAVING THE SAME

(75) Inventors: Viatcheslav Smirnov, Suwon-si (KR); Pyo Kim, Suwon-si (KR); Sang-Kyu Lee, Suwon-si (KR)

(73) Assignee: Samsung Electro-Mechanics Co. Ltd., Suwon (KR)

( * ) Notice: Subject to any disclaimer, the term of this patent is extended or adjusted under 35 U.S.C. 154(b) by 987 days.

(21) Appl. No.: 12/081,859

(22) Filed: Apr. 22, 2008

(65) Prior Publication Data

US 2009/0106782 A1    Apr. 23, 2009

(30) Foreign Application Priority Data

Oct. 22, 2007  (KR) .......... 10-2007-0106299
Nov. 22, 2007  (KR) .......... 10-2007-0119673

(51) Int. Cl.
*G11B 17/028* (2006.01)

(52) U.S. Cl. ........ 720/701; 720/707

(58) Field of Classification Search .......... 720/695–705, 720/717; 310/51, 216.117; 336/100
See application file for complete search history.

(56) References Cited

U.S. PATENT DOCUMENTS 6,330,220 B1 * 12/2001 Shiga et al. .......... 720/702
6,664,670 B2 * 12/2003 Kikuchi et al. .......... 310/51
2002/0080711 A1 * 6/2002 Han .......... 369/264
2007/0150910 A1 * 6/2007 Shishido et al. .......... 720/701
2008/0002288 A1 * 1/2008 Takaki et al. .......... 360/99.12

FOREIGN PATENT DOCUMENTS

| JP | 2000-295813 | 10/2000 |
|---|---|---|
| KR | 1999-013500 | 2/1999 |
| KR | 1999-0063032 | 7/1999 |
| KR | 2000-11397 | 2/2000 |

OTHER PUBLICATIONS

Korean Office Action issued on Feb. 19, 2009 in corresponding Korean Patent Application 10-2007-0106299.
Korean Office Action issued on Jan. 14, 2009 in corresponding Korean Patent Application 10-2007-0119673.

* cited by examiner

*Primary Examiner* — Nathan Danielsen

(57) ABSTRACT

An auto-balancing device, and a disc chucking device and a disc driving device equipped with the auto-balancing device are disclosed. The auto-balancing device may include: a housing, which is coupled with a rotating body, and on which a boss is formed; multiple balancing members, which are rotatably supported by the boss, and in at least one of which a hole is formed; and a guiding roller, which is inserted in the hole, and which guides a movement of the balancing member. The auto-balancing device can be utilized to reduce noise and vibration for a rotating body during acceleration and deceleration and during high-speed rotations.

51 Claims, 47 Drawing Sheets

AUTO BALANCING DEVICE AND DISC CHUCKING DEVICE AND DISC DRIVING DEVICE HAVING THE SAME

CROSS-REFERENCE TO RELATED APPLICATIONS

This application claims the benefit of Korean Patent Application No. 10-2007-0106299 filed with the Korean Intellectual Property Office on Oct. 22, 2007, and of Korean Patent Application No. 10-2007-0119673 filed with the Korean Intellectual Property Office on Nov. 22, 2007, the disclosures of which are incorporated herein by reference in their entirety.

BACKGROUND

1. Technical Field

The present invention relates to an auto-balancing device, and to a disc chucking device and a disc driving device equipped with the auto-balancing device.

2. Description of the Related Art

Recent developments in electronics have led to the use of high-capacity information storage apparatus, such as the CD (compact disc), DVD (digital versatile disc), BD (Blu-ray disc), HD DVD (high definition DVD), etc. Accordingly, there is also a demand for high-speed rotations in the disc drive, which is a device for operating such storage apparatus.

FIG. 1 is a cross-sectional view of an optical disc drive motor according to the related art. Referring to FIG. 1, the motor 10 may be equipped with a disc chucking device 20. While the motor 10 according to the related art may not provide any problems for rotations at low speeds, but for high speed rotations, the motor 10 may cause serious problems. The centrifugal force acting on a rotating object increases quadratically with respect to the increase in rotation speed. Thus, an increase in the rotation speed of the motor 10 is correlated with an increase in vibration.

The more the rotation speed of the motor 10 is increased, the greater will be the degree of unbalanced centrifugal force, where the resulting vibration may cause difficulty in reading or writing information from or to a disc. Although recent developments in motor-manufacturing techniques have reduced manufacturing tolerances, etc., to increase precision in the products, this is correlated with a rise in manufacturing costs.

A disc chucking device that is equipped with an auto-balancing device to overcome such problems may include multiple correcting balls in a ring-shaped insertion groove. During low-speed rotations, the positions of the correcting balls may be random. After the rotation speed exceeds a certain level, the correcting balls may be distributed evenly across the insertion groove, due to centrifugal forces. In an unbalanced state, the distribution of the correcting balls may be temporarily concentrated in a particular area to resolve this unbalance.

However, at around the resonance point, a phenomenon may occur, in which the correcting balls do not halt within the insertion groove but instead continue to rotate, where this phenomenon is liable to cause problems in operation. Moreover, the correcting balls may act as a dead load in cases where the rotating shaft of the motor forms an angle with the direction of gravity, and problems of noise and vibration may occur during acceleration or deceleration, when the correcting balls collide with one another.

Also, due to an increase in spatial restrictions caused by the trends in current electronic products towards smaller and thinner devices, the annular insertion groove, into which multiple correcting balls may be inserted, may be located near the outer perimeter of the motor. This structure can result in various external forces, caused by an unbalance in the structure, being applied over the entire structure of the motor, as well as in losses in rotational force of the rotor.

SUMMARY

An aspect of the invention is to provide an auto-balancing device, as well as a disc chucking device and a disc driving device equipped with the auto-balancing device, which can reduce noise and vibration for a rotating body during acceleration and deceleration and during high-speed rotations.

One aspect of the invention provides an auto-balancing device that includes: a housing, which is coupled with a rotating body, and on which a boss is formed; multiple balancing members, which are rotatably supported by the boss, and in at least one of which a hole is formed; and a guiding roller, which is inserted in the hole, and which guides a movement of the balancing member.

Here, the balancing member may include an annular ring inserted onto the boss and a mass coupled to one side of the annular ring, where multiple first protrusions may be formed on an outer perimeter of the boss that contact an inner perimeter of the annular ring. Also, a second protrusion may be formed on a bottom surface of the housing that supports the balancing member. The second protrusion can be formed on the bottom surface adjacent to the boss such that the second protrusion supports an inner perimeter of the annular ring, and can be formed in an annular shape concentric with the rotating body such that the second protrusion supports the mass.

The hole can be detached from the guiding roller, and can be shaped as an arc formed along a circumference concentric with the rotating body.

The balancing member may be a magnetic body, and the auto-balancing device may further include a magnet, which may be configured to selectively restrain a movement of the balancing member, and which may be coupled to a predetermined position on an inner perimeter of the housing. A portion on an outer perimeter of the balancing member may protrude from the balancing member to be adjacent to the magnet. Here, a holding indentation may be formed in the inner perimeter, and the magnet may be inserted in the holding indentation. Furthermore, a side wall of the holding indentation may slant towards an inside surface of the holding indentation such that the magnet is restrained facing a center of rotation of the rotating body. The magnet can be detached in the holding indentation.

A receiving indentation may be formed in an outer perimeter of the balancing member along an imaginary circumference, which is concentric with the balancing member, and which passes through the guiding roller.

The auto-balancing device may further include a sliding disc that supports the guiding roller and the balancing member, and the sliding disc may include a lubrication layer on a surface, where the lubrication layer may include a hard metal coating layer.

The guiding roller used in the auto-balancing device can be of a cylindrical or a spherical shape.

Another aspect of the invention provides a disc chucking device that includes: a chuck base; multiple chuck pins, which are inserted in the chuck base such that the chuck pins protrude outwards from the chuck base; an elastic member, which is coupled to the chuck base, and which elastically supports at least one of the chick pins; a boss, formed on an inside of the chuck base; multiple balancing members, which are rotatably supported by the boss, and in at least one of which a hole is formed; and a guiding roller, which is inserted in the hole to guide a movement of the balancing member.

Here, the balancing member may include an annular ring inserted onto the boss and a mass coupled to one side of the annular ring, where multiple first protrusions may be formed on an outer perimeter of the boss that contact an inner perimeter of the annular ring. Also, a second protrusion may be formed on a bottom surface of the chuck base that supports the balancing member. The second protrusion can be formed on the bottom surface adjacent to the boss such that the second protrusion supports an inner perimeter of the annular ring, and can be formed in an annular shape concentric with the chuck base such that the second protrusion supports the mass.

The hole can be detached from the guiding roller, and can be shaped as an arc formed along a circumference concentric with the chuck base.

The balancing member may be a magnetic body, and the disc chucking device may further include a magnet, which may be configured to selectively restrain a movement of the balancing member, and which may be coupled to a predetermined position on an inner perimeter of the chuck base. A portion on an outer perimeter of the balancing member may protrude from the balancing member to be adjacent to the magnet. Here, a holding indentation may be formed in the inner perimeter, and the magnet may be inserted in the holding indentation. Furthermore, a side wall of the holding indentation may slant towards an inside surface of the holding indentation such that the magnet is restrained facing a center of rotation of the chuck base. The magnet can be detached in the holding indentation.

A receiving indentation may be formed in an outer perimeter of the balancing member along an imaginary circumference, which is concentric with the balancing member, and which passes through the guiding roller.

The disc chucking device may further include a sliding disc that supports the guiding roller and the balancing member, and the sliding disc may include a lubrication layer on a surface, where the lubrication layer may include a hard metal coating layer.

The guiding roller included in the disc chucking device can be of a cylindrical or a spherical shape.

Yet another aspect of the invention provides a disc driving device for driving a disc. The disc driving device includes: a stator; a rotor, which rotates relatively to the stator; a disc chucking device, which is coupled to one end of the rotor, and to which the disc may be separably coupled; a housing, which is coupled with the rotor, and on which a boss is formed; multiple balancing members, which are rotatably supported by the boss, with at least one of the balancing members having a hole formed therein; and a guiding roller, which is inserted in the hole, and configured to guide a movement of the balancing member.

Here, the balancing member may include an annular ring inserted onto the boss and a mass coupled to one side of the annular ring, where multiple first protrusions may be formed on an outer perimeter of the boss that contact an inner perimeter of the annular ring. Also, a second protrusion may be formed on a bottom surface of the housing that supports the balancing member. The second protrusion can be formed on the bottom surface adjacent to the boss such that the second protrusion supports an inner perimeter of the annular ring, and can be formed in an annular shape concentric with the rotor such that the second protrusion supports the mass.

The hole can be detached from the guiding roller, and can be shaped as an arc formed along a circumference concentric with the rotor.

The balancing member may be a magnetic body, and the disc driving device may further include a magnet, which may be configured to selectively restrain a movement of the balancing member, and which may be coupled to a predetermined position on an inner perimeter of the housing. A portion on an outer perimeter of the balancing member may protrude from the balancing member to be adjacent to the magnet. Here, a holding indentation may be formed in the inner perimeter, and the magnet may be inserted in the holding indentation. Furthermore, a side wall of the holding indentation may slant towards an inside surface of the holding indentation such that the magnet is restrained facing a center of rotation of the rotor. The magnet can be detached in the holding indentation.

A receiving indentation may be formed in an outer perimeter of the balancing member along an imaginary circumference, which is concentric with the balancing member, and which passes through the guiding roller.

The disc driving device may further include a sliding disc that supports the guiding roller and the balancing member, and the sliding disc may include a lubrication layer on a surface, where the lubrication layer may include a hard metal coating layer.

The guiding roller included in the disc driving device can be of a cylindrical or a spherical shape.

Additional aspects and advantages of the present invention will be set forth in part in the description which follows, and in part will be obvious from the description, or may be learned by practice of the invention.

DETAILED DESCRIPTION

Figure 1:
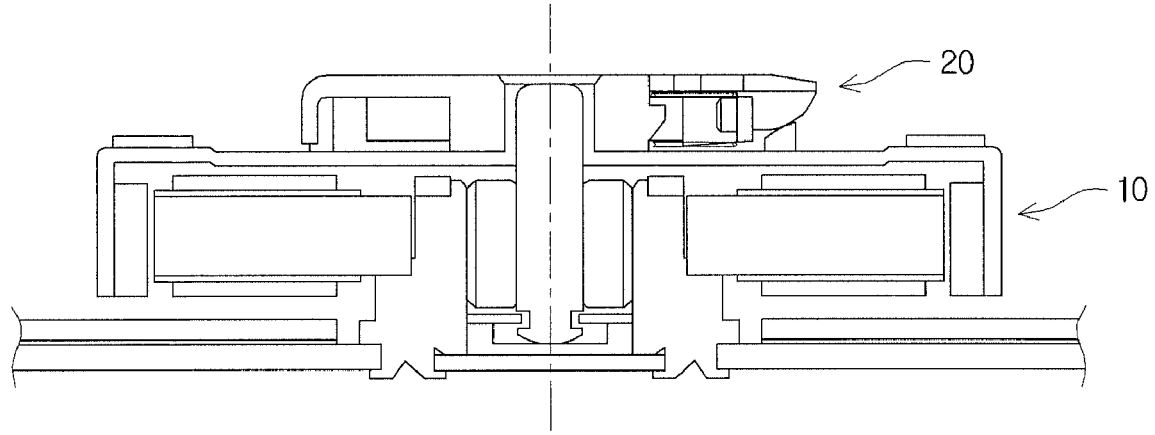
FIG. 1 is a cross-sectional view of an optical disc drive motor according to the related art.

The auto-balancing device, as well as the disc chucking device and disc driving device having the auto-balancing device, according to certain embodiments of the invention will be described below in more detail with reference to the accompanying drawings. Those components that are the same or are in correspondence are rendered the same reference numeral regardless of the figure number, and redundant explanations are omitted.

Figure 2:
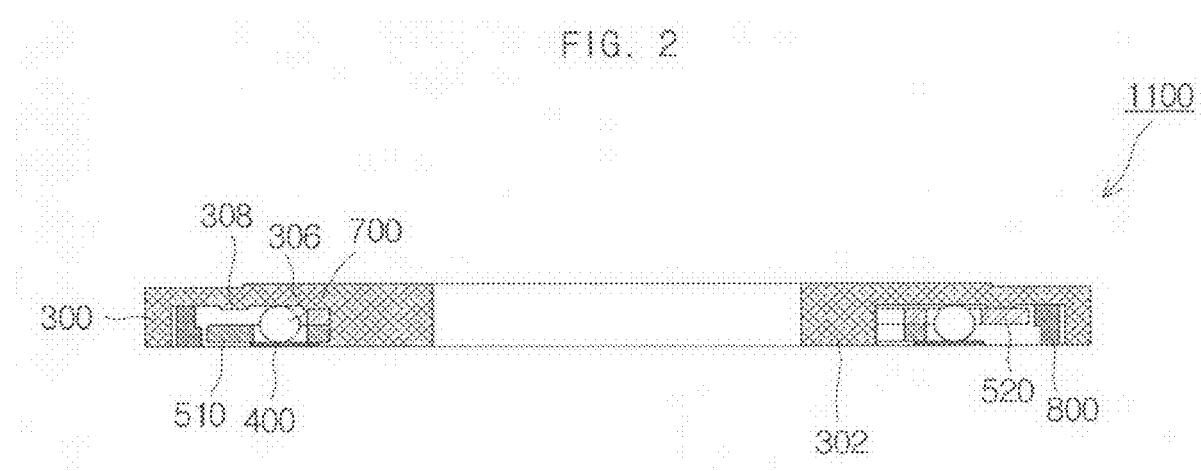
FIG. 2 is a cross-sectional view of an auto-balancing device according to a first disclosed embodiment of the invention.

FIG. 2 is a cross-sectional view of an auto-balancing device 1100 according to a first disclosed embodiment of the invention. In FIG. 2, there are illustrated an auto-balancing device 1100, a sliding disc 400, a housing 300, a boss 302, second protrusions 306, 308, balancing members 510, 520, guiding rollers 700, and magnets 800, etc.

An auto-balancing device 1100 according to the first disclosed embodiment of the invention may include a housing 300, which may be coupled with a rotating body, and on which a boss 302 may be formed; multiple balancing members 510, 520, which may be rotatably supported by the boss 302, and in which holes 506 may be formed; and guiding rollers 700, which may be inserted in the holes 506, and which may guide the movement of the balancing members 510, 520. The auto-balancing device 1100 may be utilized to reduce noise and vibration for a rotating body during acceleration and deceleration and during high-speed rotations.

As illustrated in FIG. 2, the auto-balancing device 1100 may be coupled to a rotating body. The rotating body can be, for example, a motor. The auto-balancing device 1100 may be coupled to the rotation shaft of the motor. Also, the auto-balancing device 1100 may be fabricated as an integrated body with the motor, and in certain cases, such as for the case of an optical disc drive motor, may be fabricated as an integrated body with a disc chucking device to be coupled with the motor.

Figure 3:
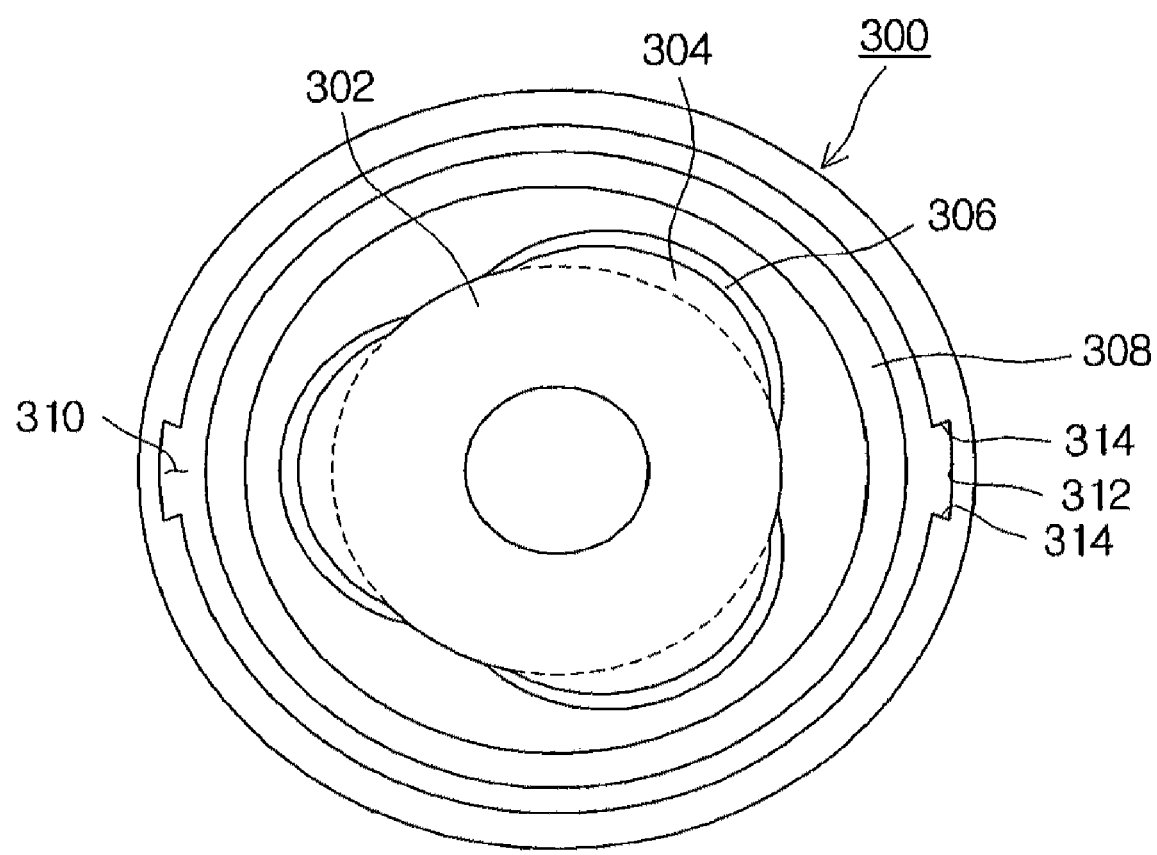
FIG. 3 is a cross-sectional view of a housing in an auto-balancing device according to the first disclosed embodiment of the invention.
Figure 4:
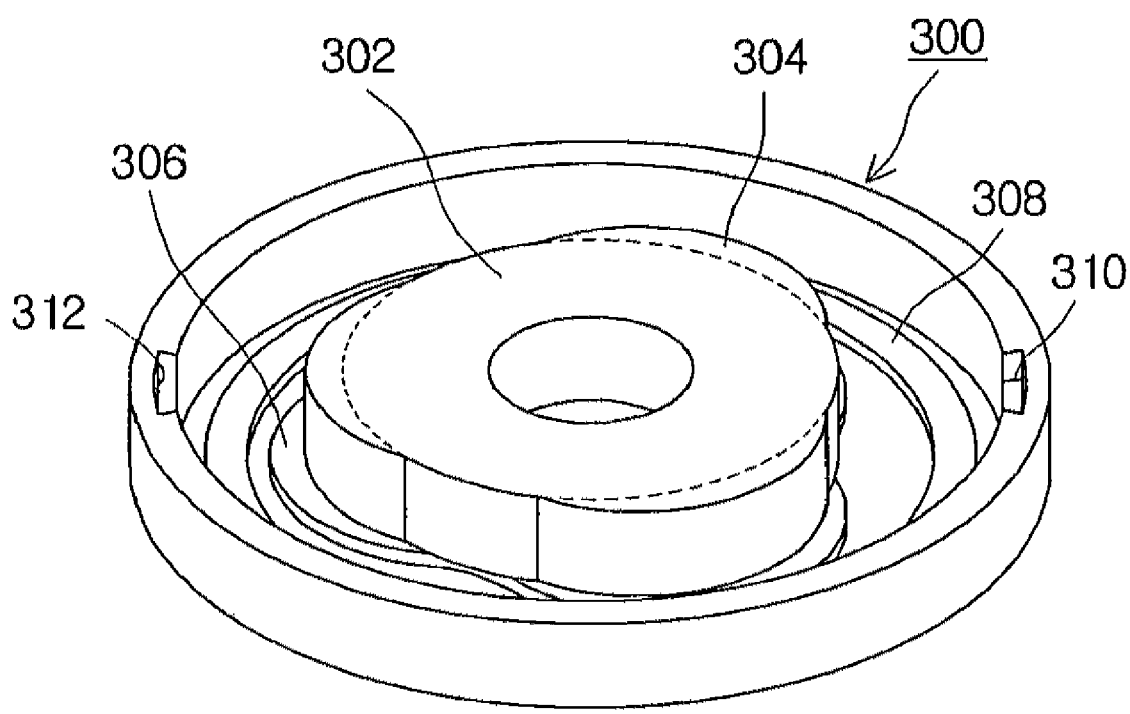
FIG. 4 is a perspective view of a housing in an auto-balancing device according to the first disclosed embodiment of the invention.

FIG. 3 is a cross-sectional view of a housing 300 in an auto-balancing device 1100 according to the first disclosed embodiment of the invention, and FIG. 4 is a perspective view of a housing 300 in an auto-balancing device 1100 according to the first disclosed embodiment of the invention. As illustrated in FIGS. 3 and 4, a boss 302 may be formed on the inside of the housing 300. The inner perimeter of the boss 302 can be the portion coupling with the rotating body. For example, if the auto-balancing device 1100 is mounted on a motor, the rotating body can be the rotation shaft of the motor.

The inner diameter of the boss 302 may be adjusted according to the size of the rotating body to which it is coupled. The housing 300 may be structured to cover the internal components of the auto-balancing device 1100. In the space formed by the boss 302 and the inner perimeter of the housing 300, balancing members 510, 520 may be installed.

The boss 302 may include multiple first protrusions 304 formed on the outer perimeter of the boss 302 to be in contact with the inner perimeters of the balancing members 510, 520. As the inner perimeters of the balancing members 510, 520 contact the first protrusions 304 of the boss 302, the balancing members 510, 520 may be rotatably supported by the first protrusions 304. The first protrusions 304 may decrease the area of contact with the balancing members 510, 520, whereby the friction between the boss 302 and the balancing members 510, 520 can be reduced.

Second protrusions may be formed on a bottom surface of the housing 300 to support the balancing members 510, 520. Here, the second protrusions 306 may be formed on the bottom of the housing 300 adjacent to the boss 302, to support the inner perimeters of the annular rings 502 forming the balancing members 510, 520. Also, a second protrusion 308 may be formed on a bottom surface of the housing 300 in an annular shape concentric with the rotating body, in order to support a mass 504 coupled to one side of an annular ring 502 in each of the balancing members 510, 520. The second protrusions 306 adjacent to the boss 302 and the ring-shaped second protrusion 308 may each reduce the contact area between the balancing members 510, 520 and the bottom surface of the housing 300, to thereby reduce friction between the balancing members 510, 520 and the bottom surface of the housing 300.

In the inner perimeter of the housing 300, holding indentations 310 may be formed, in which magnets 800 may be inserted. The side walls 314 of the holding indentations 310 may be formed slanting towards the inside surfaces 312 of the holding indentations 310, such that the magnets 800 may be restrained to face the center of rotation of the rotating body. The cross section of the holding indentation 310 can be a trapezoidal shape. The holding indentations 310 may be formed in predetermined positions of the inner perimeter. The predetermined positions may refer to positions at which the magnets 800 inserted in the holding indentations 310 can apply magnetic attraction to protruding portions on the outer perimeters of the balancing members 510, 520 such that the balancing members 510, 520 become arranged in a symmetrical disposition with respect to the rotating body.

Figure 5:
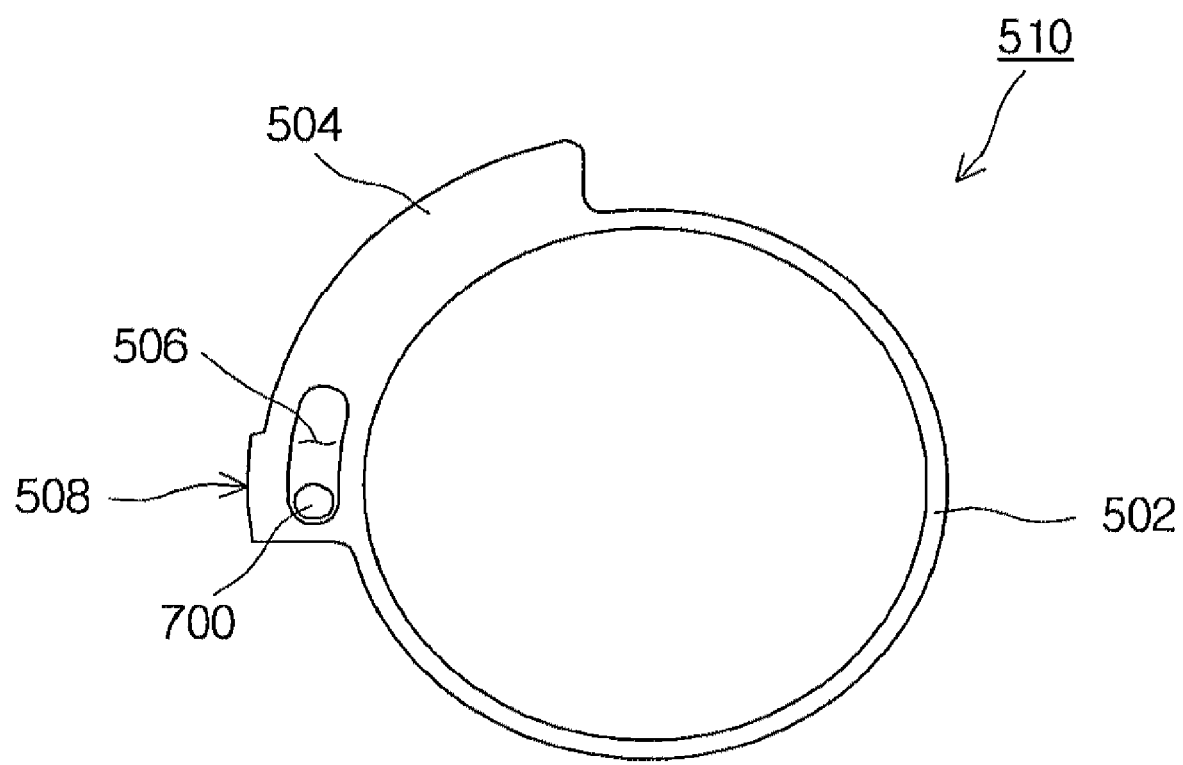
FIG. 5 is a plan view of a first balancing member in an auto-balancing device according to the first disclosed embodiment of the invention.
Figure 6:
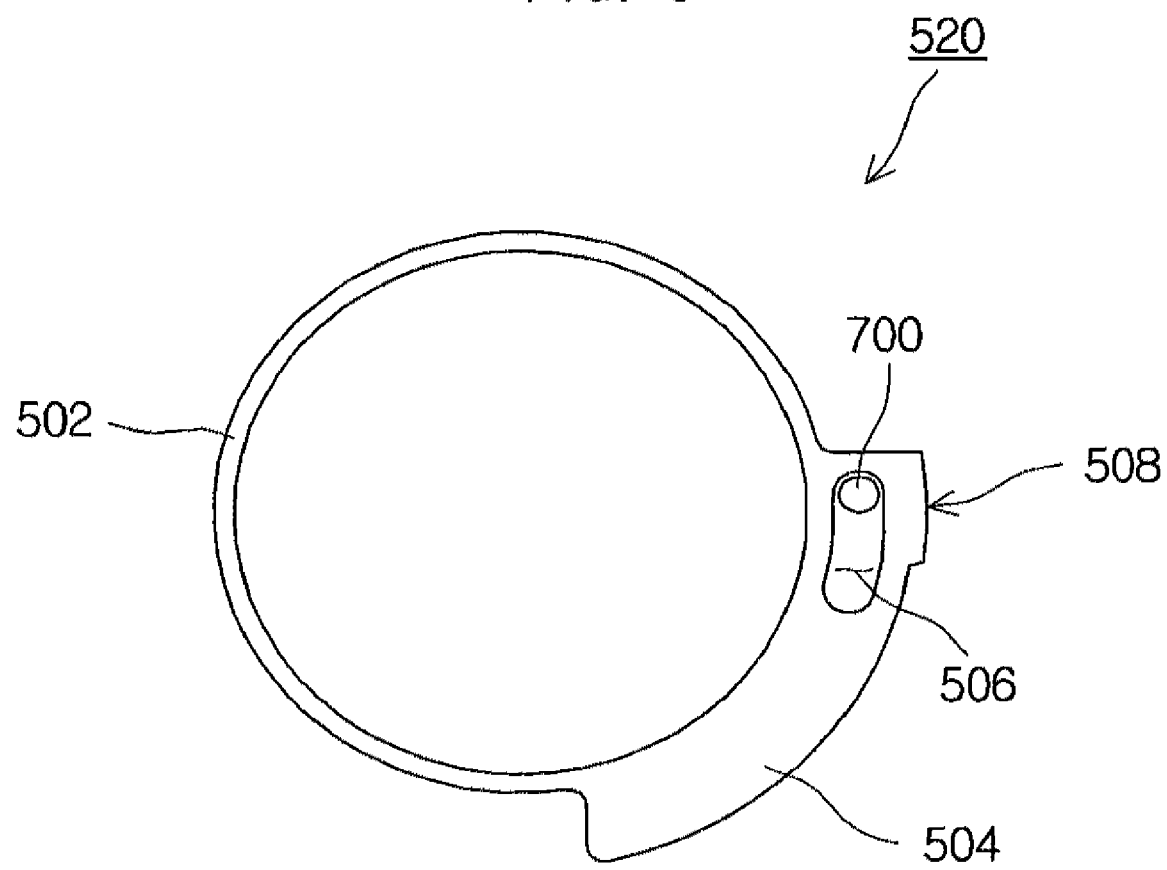
FIG. 6 is a plan view of a second balancing member in an auto-balancing device according to the first disclosed embodiment of the invention.

FIG. 5 is a plan view of a first balancing member 510 in an auto-balancing device 1100 according to the first disclosed embodiment of the invention, and FIG. 6 is a plan view of a second balancing member 520 in an auto-balancing device 1100 according to the first disclosed embodiment of the invention. A balancing member 510, 520 can include an annular ring 502, which may be inserted onto the boss 302, and a mass 504, which may be coupled to one side of the annular ring 502. A multiple number of balancing members can be included.

Because of the mass 504 coupled to one side of the annular ring 502, the balancing member 510, 520 is given a generally eccentric form. When the rotating body is in an unbalanced state, the masses 504 on the multiple balancing members 510, 520 may be concentrated in a particular area, whereas in a balanced state, the masses 504 may be evenly distributed inside the housing 300.

As illustrated in FIGS. 5 and 6, a pair of balancing members 510, 520 may be used, where the pair of balancing members 510, 520 may be inserted in the housing 300 in the same orientation. The orientation in which the balancing members 510, 520 are inserted can be changed in consideration of the structure of the rotating body and the operating direction of the rotating body, etc. The shape of the balancing members 510, 520 may also vary, in consideration of the structure of the rotating body and the installation space of the auto-balancing device 1100, etc.

In the mass 504 of the balancing member 510, 520, a hole 506 may be formed in which a guiding roller 700 may be inserted. As illustrated in FIG. 5, the hole 506 can be shaped as an arc formed along a circumference concentric with the rotating body. The guiding roller 700 inserted in the arc-shaped hole 506 may be able to move along the hole 506 in the circumferential direction. When the distribution of the balancing members 510, 520 is concentrated in a particular area in the housing 300, as the rotating body is in an unbalanced state, the guiding rollers 700 may move within the hole 506 along the circumference, whereby the pair of balancing members 510, 520 may be distributed in a more concentrated area.

Lubrication may be interposed between the balancing members 510, 520 and the insertion hole. Examples of such lubrication include liquid lubricants and slidable plastic spacers. The material used for the balancing members 510, 520 can be a metal or a plastic coated with hard metal.

Figure 7:
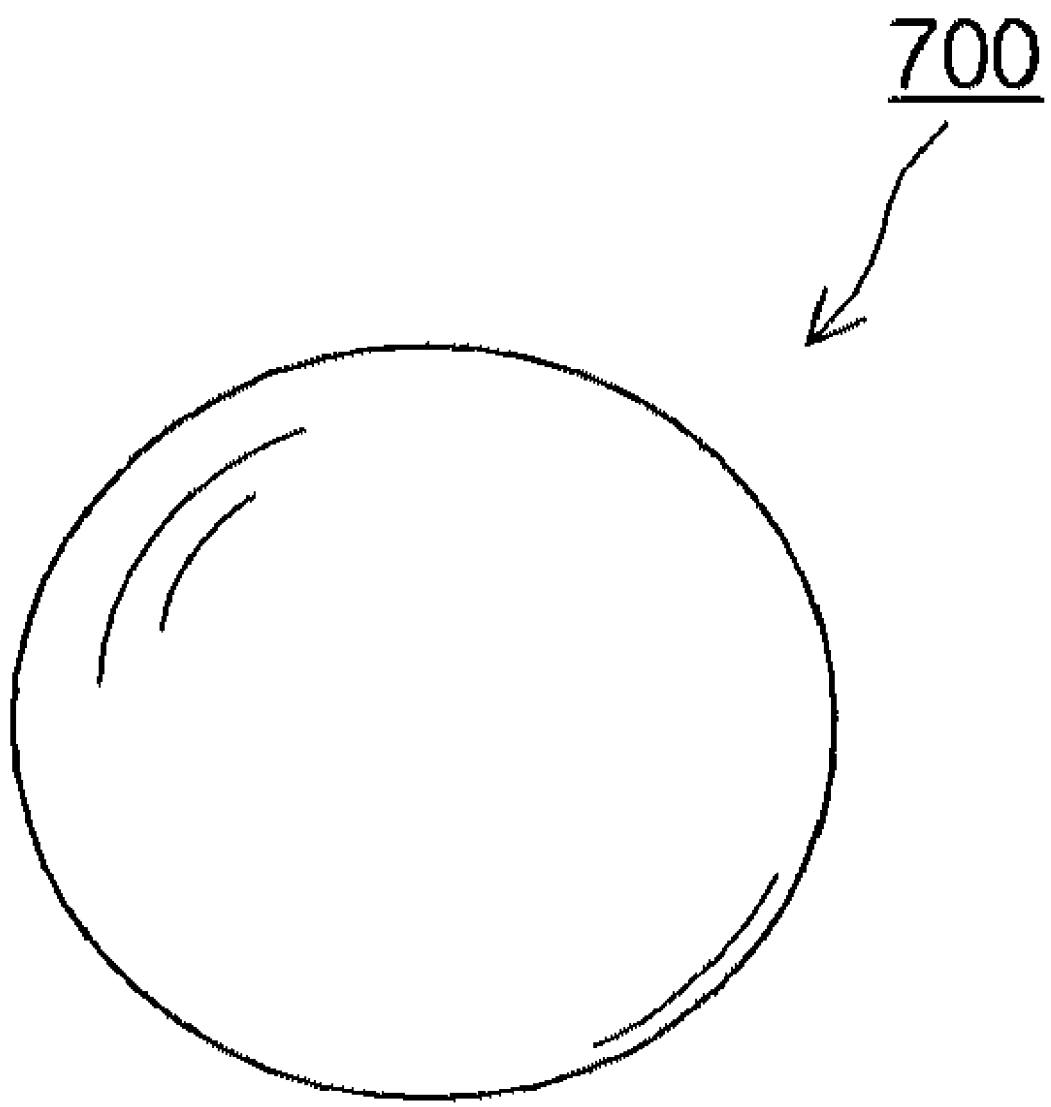
FIG. 7 is a perspective view of a guiding roller in an auto-balancing device according to the first disclosed embodiment of the invention.

FIG. 7 is a perspective view of a guiding roller 700 in an auto-balancing device 1100 according to the first disclosed embodiment of the invention. In the auto-balancing device 1100 described for the first disclosed embodiment of the invention, the guiding rollers 700 may have a spherical shape. The guiding rollers 700 may be inserted in the holes 506 in the masses 504 of the balancing members 510, 520, and may limit and guide the movement of the balancing members 510, 520. As illustrated in FIG. 2, a first guiding roller 700 may touch the outer perimeter of a second balancing member 520, and in this way, the movement of the balancing members 510, 520 may be limited. Also, the guiding roller 700 can be detached from the hole 506, which may reduce vibration that may otherwise occur when the rotating body accelerates or decelerates.

Moreover, a spherical guiding roller 700 may have a reduced contact area with respect to the balancing members 510, 520, sliding disc 400, and bottom surface of the housing 300, etc., so that the friction applied on the spherical guiding roller 700 may be reduced.

Figure 8:
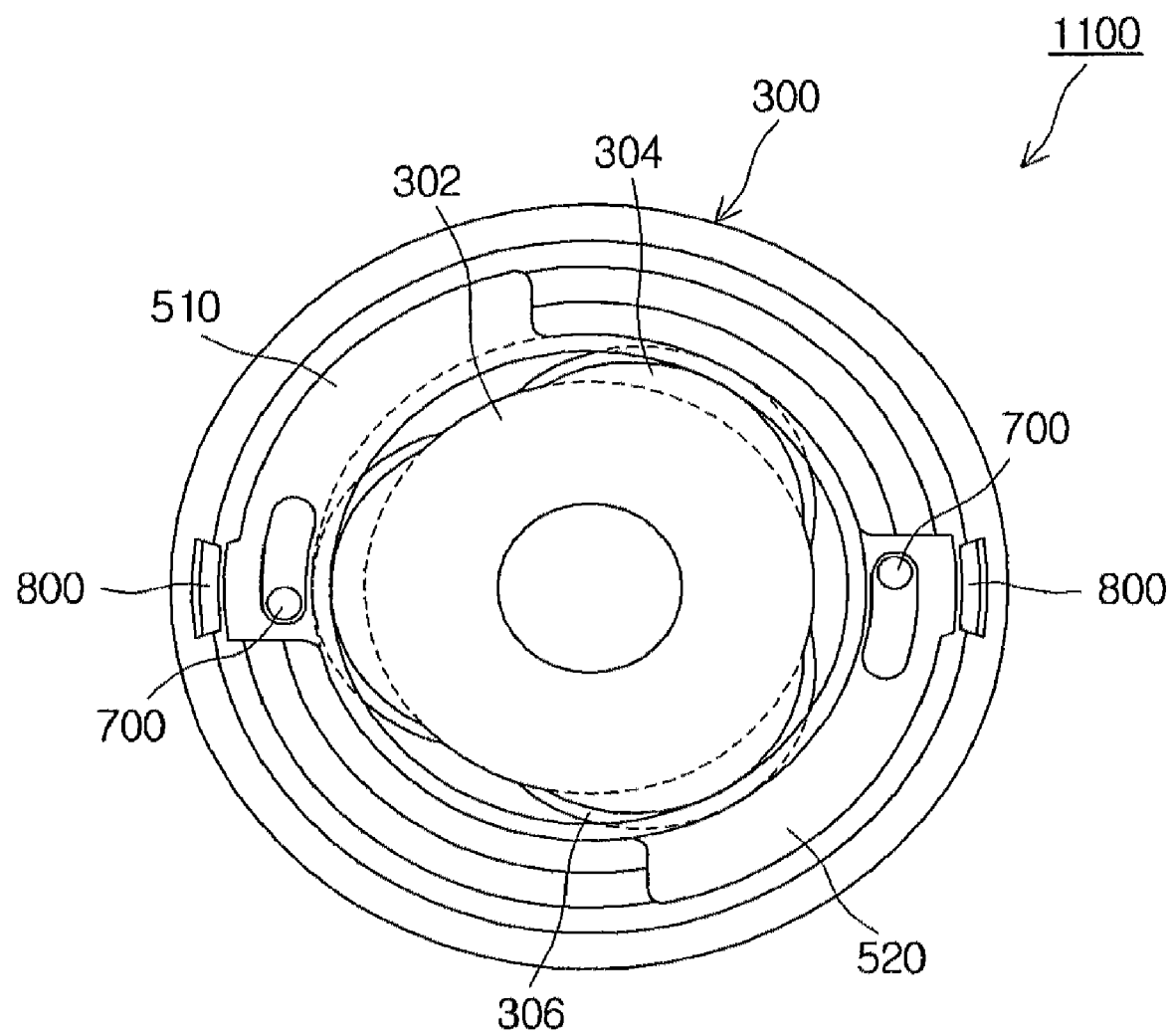
FIG. 8 is a bottom view of an auto-balancing device according to the first disclosed embodiment of the invention.

FIG. 8 is a bottom view of an auto-balancing device 1100 according to the first disclosed embodiment of the invention. As illustrated in FIG. 8, the magnets 800 may be coupled to predetermined positions in the inner perimeter of the housing 300, in order to selectively restrain the movement of the balancing members 510, 520. Of course, the balancing members 510, 520 may be magnetic, and there may be portions protruding from the outer perimeters of the balancing members 510, 520 to be adjacent to the magnets 800.

The selective restraining describes how the magnets 800 may restrain the balancing members 510, 520 in particular positions by way of magnetic attraction, until the centrifugal forces applied on the balancing members 510, 520 exceed the magnetic attraction forces of the magnets 800, when the magnets 800 may no longer restrain the balancing members 510, 520.

When the rotating body begins to rotate or undergoes a low-speed rotation, the movement of the balancing members 510, 520 may be restrained by the attractive forces of the magnets 800. Here, the balancing members 510, 520 may be arranged in a configuration illustrated in FIG. 8, and the eccentric masses 504 of the balancing members 510, 520 may not influence the movement of the rotating body when the rotating body is started or stopped. However, when the rotation speed of the rotating body increases, the centrifugal forces applied on the balancing members 510, 520 may exceed the attractive forces that the magnets 800 apply on the balancing members 510, 520. Then, the magnets 800 can no longer restrain the balancing members 510, 520, and the balancing members 510, 520 may rotate to the appropriate positions for resolving the unbalance in the rotating body.

The magnets 800 can be detached from the inside surfaces 312 of the holding indentations 310. The magnets 800 may be inserted in the holding indentations 310 such that the magnets 800 are not attached in the holding indentations 310, so that during low-speed rotations, the magnets 800 may draw closer to the balancing members 510, 520 due to the magnetic attraction to the balancing members 510, 520. Here, gaps may be formed between the outer side of the magnet 800 and the inside surface of the holding indentations 310. In this case, the movement of the balancing members 510, 520 may be restrained by the attraction of the magnets 800.

However, when the rotating speed of the rotating body is increased, such that the magnitude of the centrifugal forces applied to the magnets 800 exceeds the magnitude of the attractive forces between the magnets 800 and the balancing members 510, 520, the outer sides of the magnets 800 may touch the inside surfaces of the holding indentations 310. At this time, the gaps between the outer sides of the magnets 800 and the inside surfaces 312 of the holding indentations 310 may disappear. In this way, the balancing members 510, 520 may no longer be restrained by the attraction to the magnets 800, and may rotate freely within the housing 300, to focus on particular positions inside the housing 300 and resolve the unbalance in the rotating body. The housing 300 can be fabricated from a plastic resin having elastic qualities, in order to provide an environment favorable to the movement of the magnets 800.

As illustrated in FIG. 2, the auto-balancing device 1100 may include a sliding disc 400 that supports the balancing members 510, 520 and guiding rollers 700, to reduce the amount of friction applied on the balancing members 510, 520 and guiding rollers 700. The sliding disc 400 may be positioned at the other side of the bottom surface of the housing 300, and may support the guiding rollers 700 and portions of the balancing members 510, 520 adjacent to the guiding rollers 700. The sliding disc 400 can have an annular shape.

The sliding disc 400 may include a layer of lubrication on its surface, where the lubrication layer may include a hard metal coating layer. Hard metal is an ultra-hard alloy used in tools, etc., made by sintering metal carbide powders, and has a very high degree of hardness. The lubrication layer may also be a liquid lubricant interposed between the balancing members 510, 520 and guiding rollers 700 and the sliding disc 400.

Figure 9:
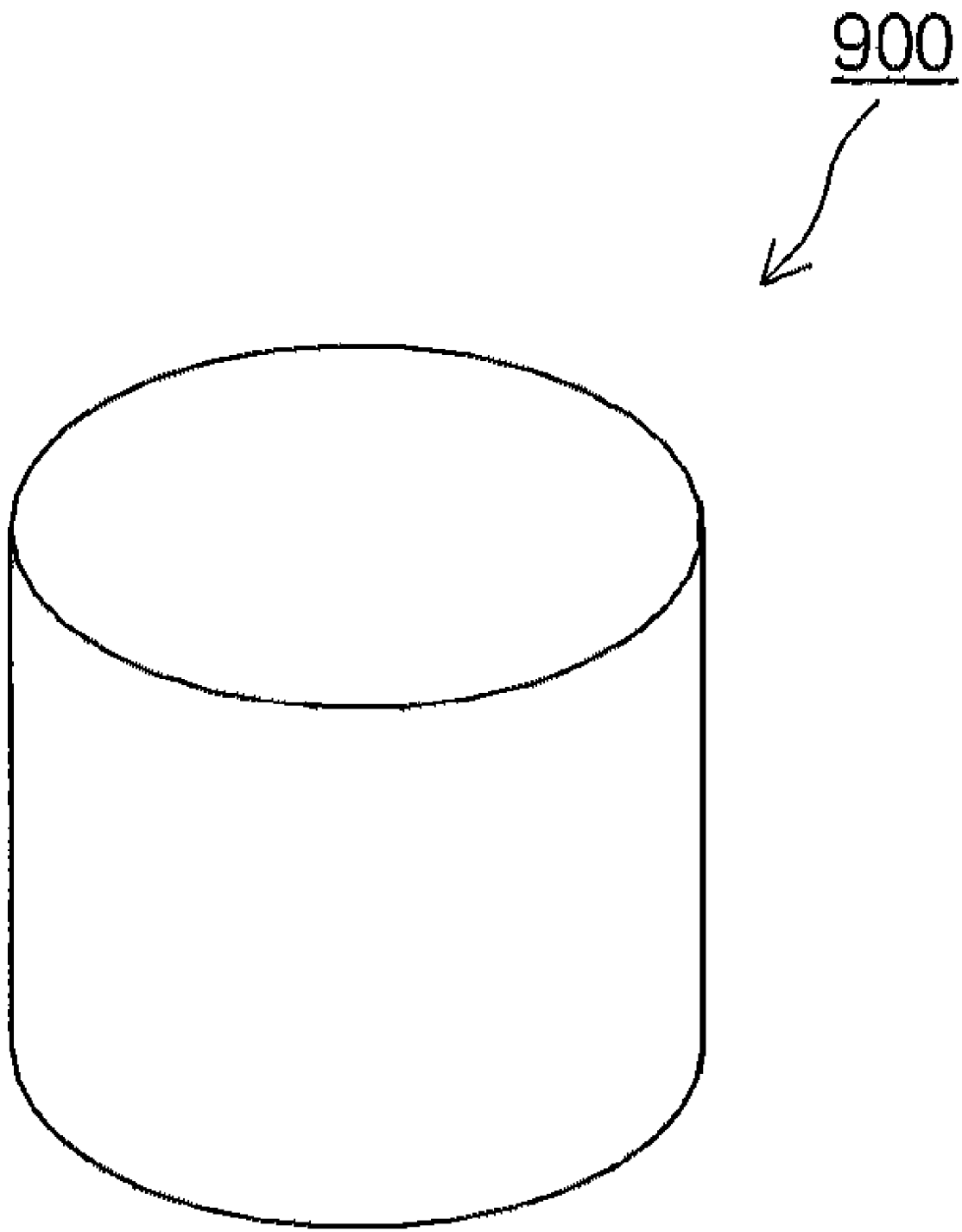
FIG. 9 is a perspective view of a guiding roller in an auto-balancing device according to a second disclosed embodiment of the invention.
Figure 10:
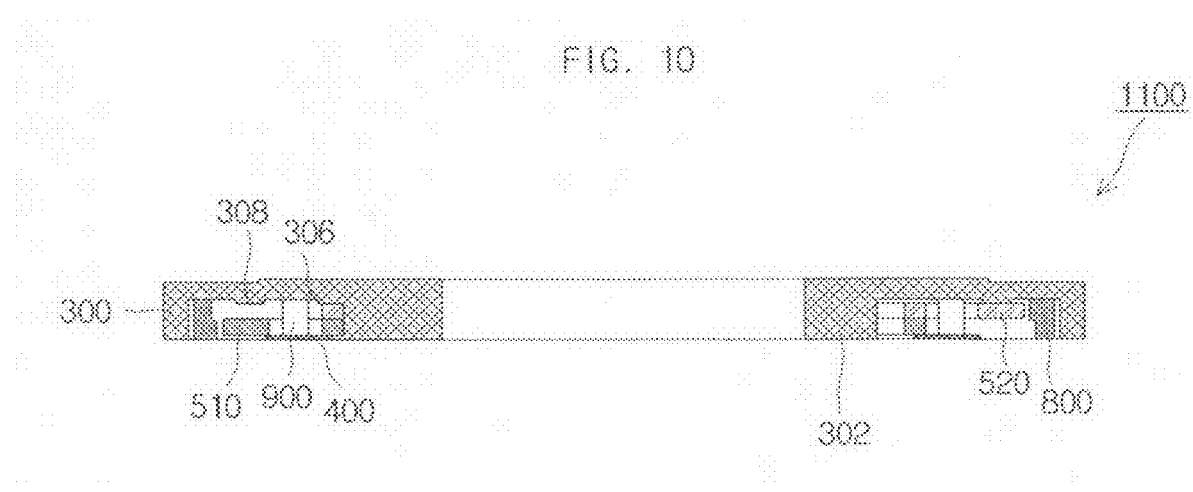
FIG. 10 is a cross-sectional view of an auto-balancing device according to the second disclosed embodiment of the invention.

FIG. 9 is a perspective view of a guiding roller 900 in an auto-balancing device 1100 according to a second disclosed embodiment of the invention, and FIG. 10 is a cross-sectional view of an auto-balancing device 1100 according to the second disclosed embodiment of the invention. As illustrated in FIG. 9, a guiding roller 900 can have a cylindrical shape. As illustrated in FIG. 10, cylindrical guiding rollers 900 may be inserted in the holes 506 to be rotatably coupled to the balancing members 510, 520. The cylindrical guiding rollers 900 allow a more effective use of the operating space for the balancing members 510, 520 and guiding rollers 900 inside the housing 300, and can improve the performance of the auto-balancing device 1100.

Figure 11:
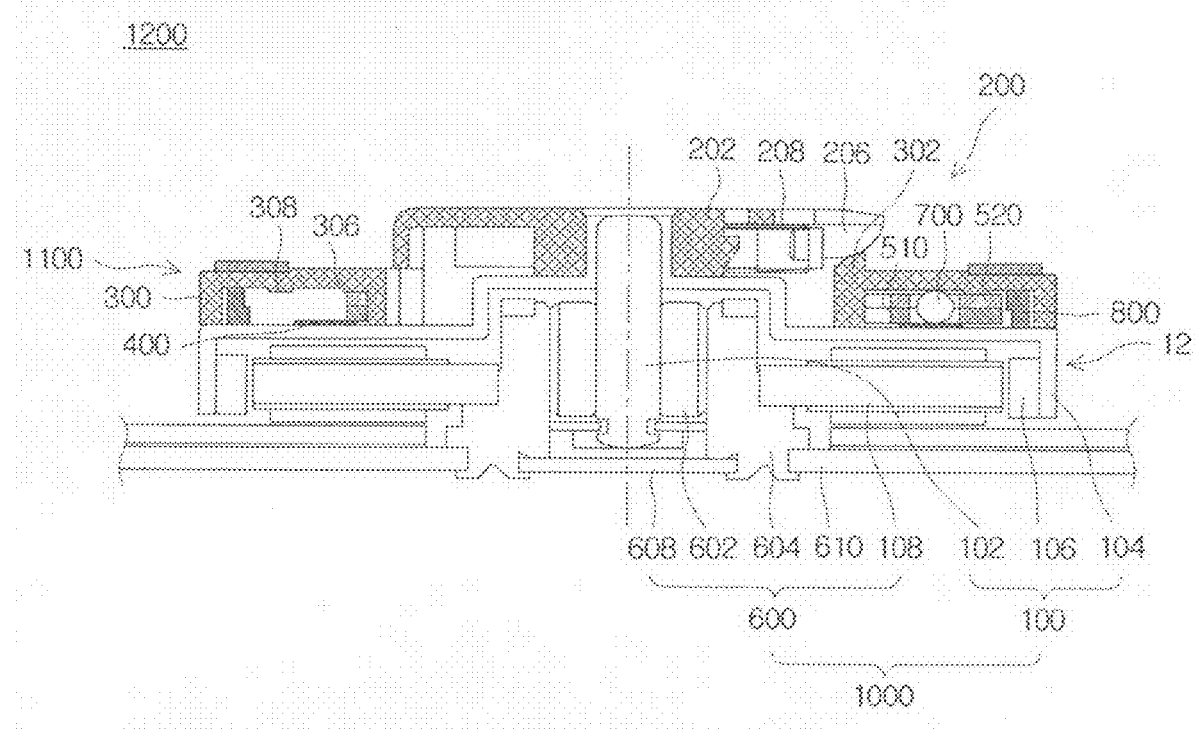
FIG. 11 is a cross-sectional view of an optical disc drive motor equipped with a disc chucking device according to a third disclosed embodiment of the invention.
Figure 12:
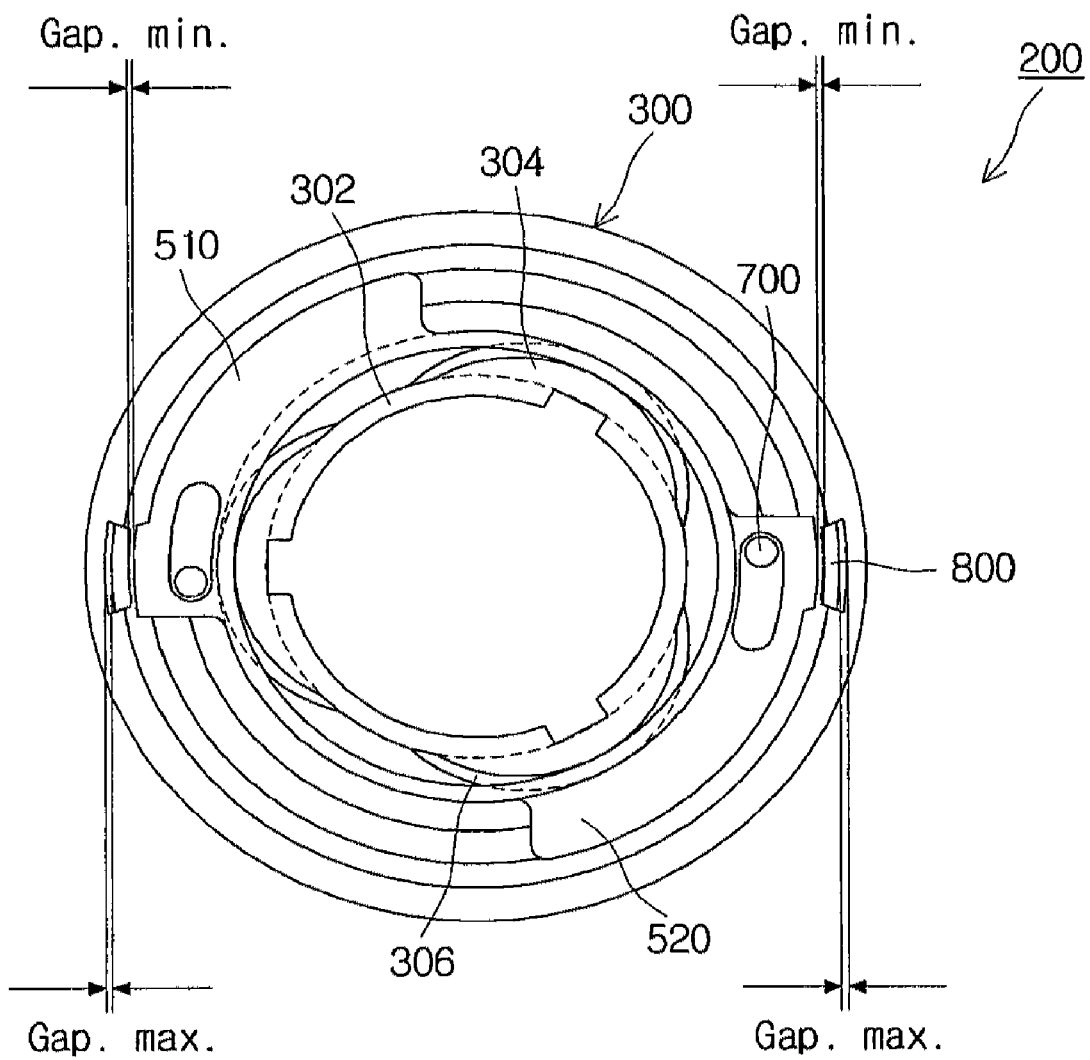
FIG. 12 is a bottom view of a disc chucking device according to the third disclosed embodiment of the invention.
Figure 13:
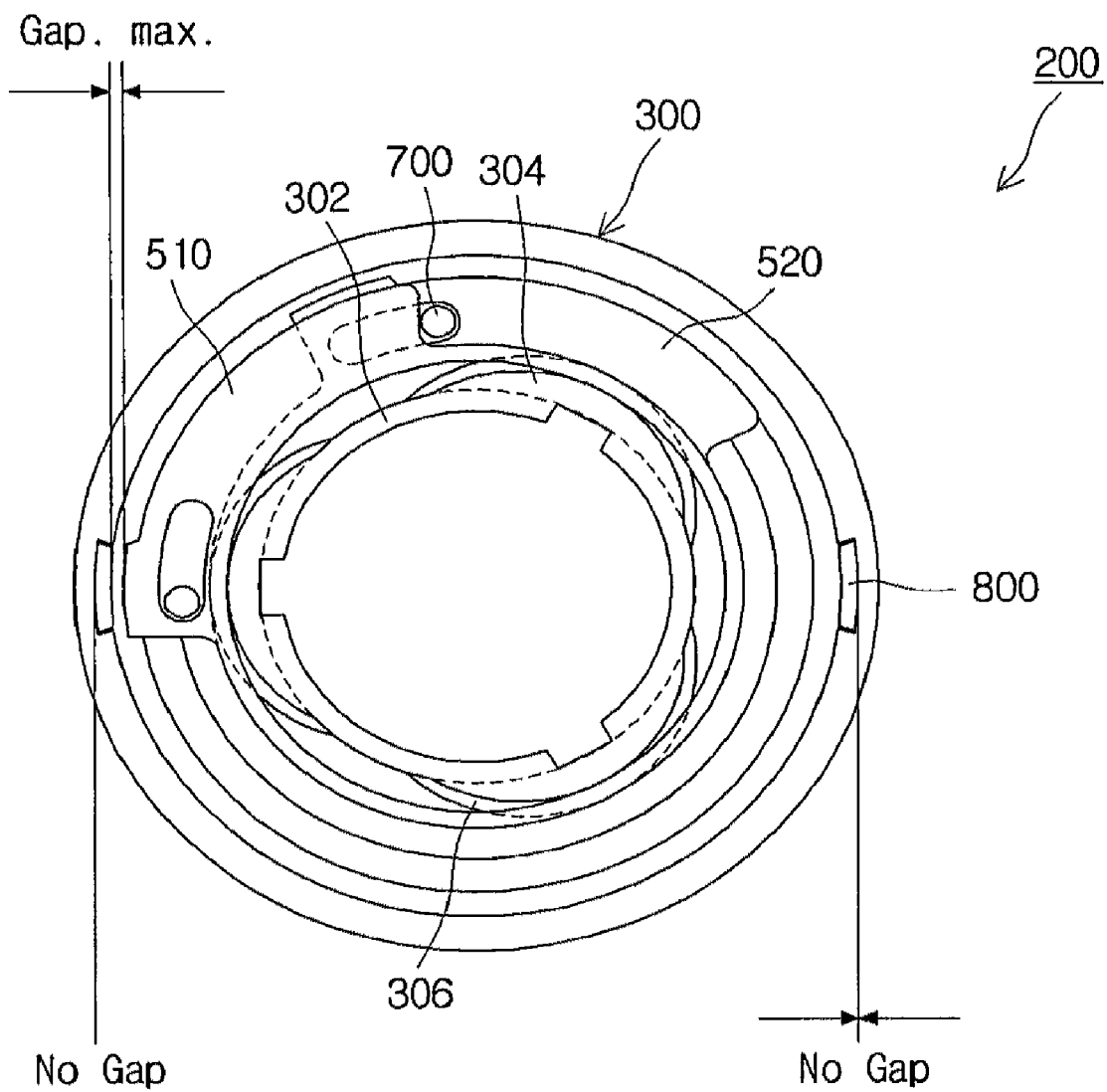
FIG. 13 is a bottom view of a disc chucking device according to the third disclosed embodiment of the invention.
Figure 14:
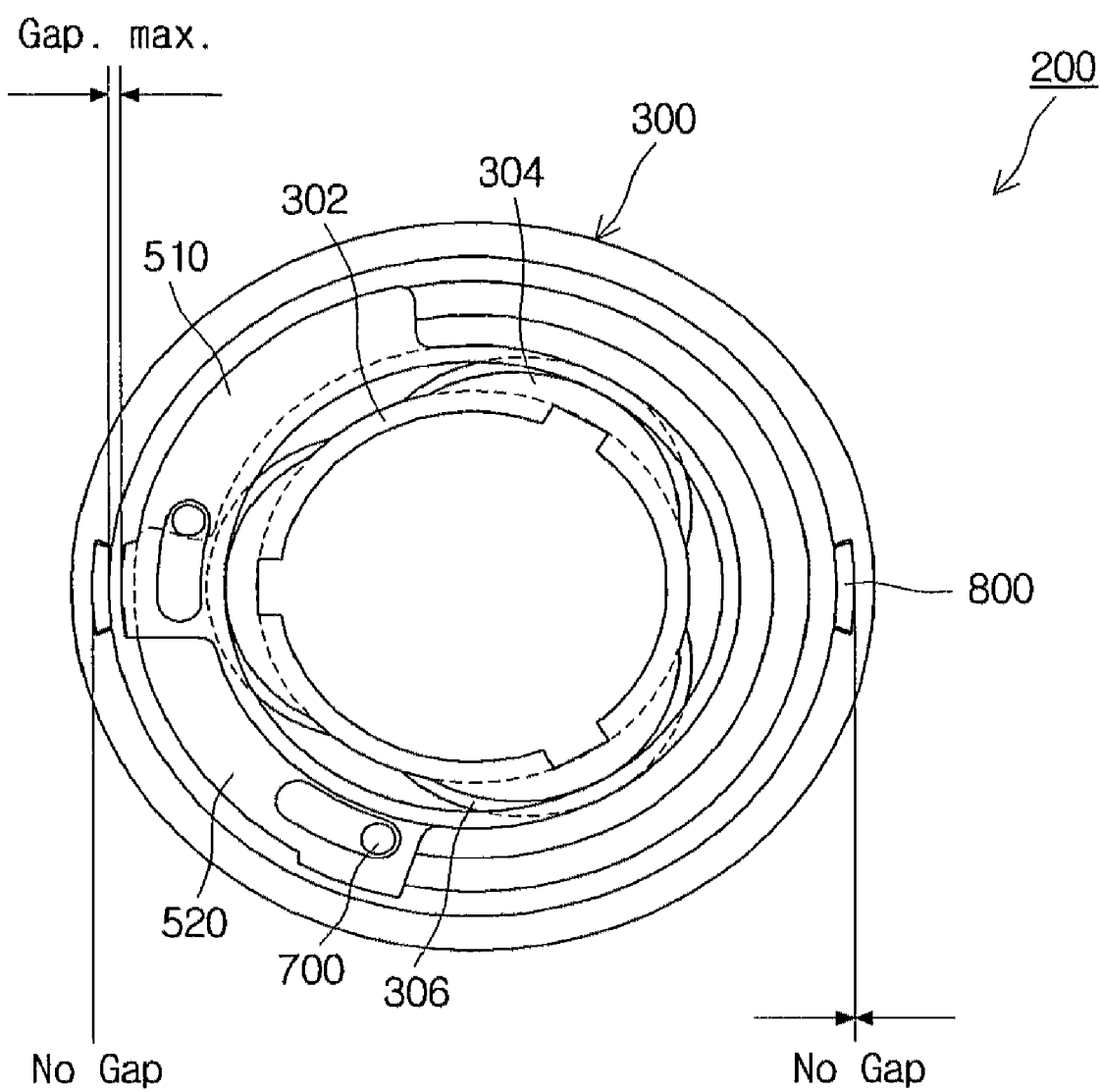
FIG. 14 is a bottom view of a disc chucking device according to the third disclosed embodiment of the invention.
Figure 15:
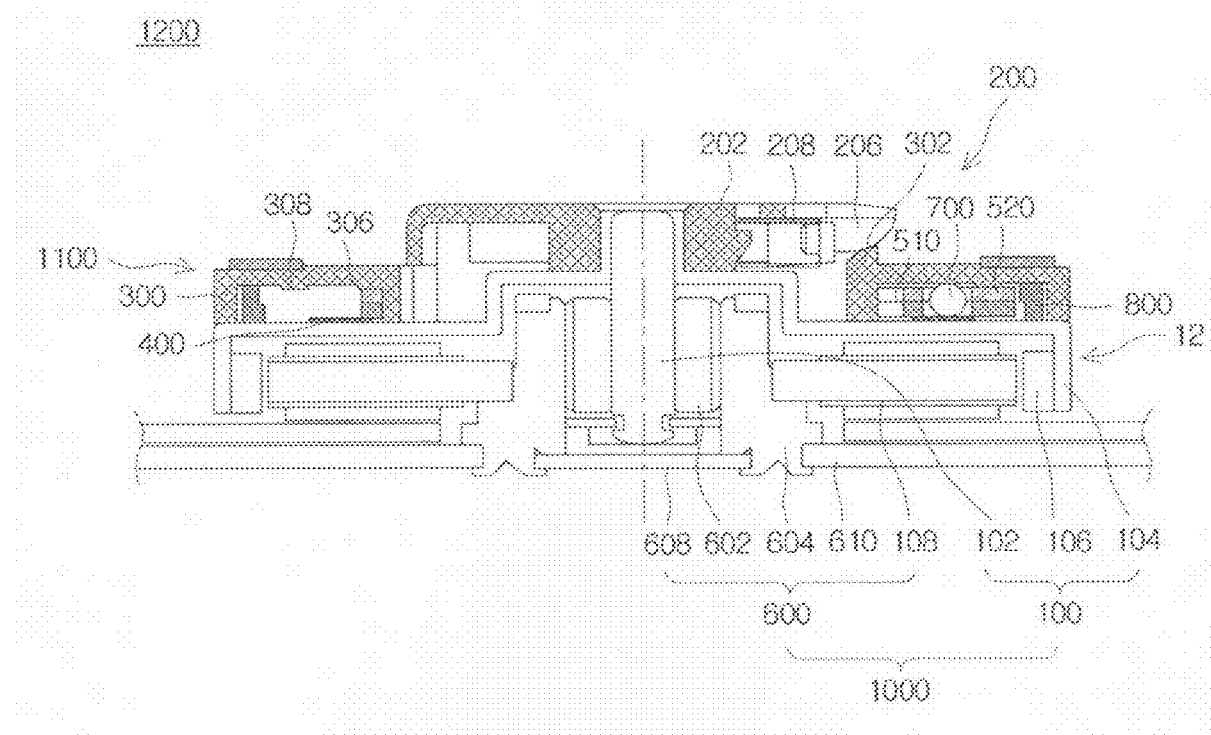
FIG. 15 is a cross-sectional view of an optical disc drive motor equipped with a disc chucking device according to the third disclosed embodiment of the invention.

FIG. 11 is a cross-sectional view of an optical disc drive motor equipped with a disc chucking device 200 according to a third disclosed embodiment of the invention, FIG. 12 is a bottom view of a disc chucking device 200 according to the third disclosed embodiment of the invention, and FIG. 13 is a bottom view of a disc chucking device 200 according to the third disclosed embodiment of the invention. Also, FIG. 14 is a bottom view of a disc chucking device 200 according to the third disclosed embodiment of the invention, and FIG. 15 is a cross-sectional view of an optical disc drive motor equipped with a disc chucking device 200 according to the third disclosed embodiment of the invention. In FIGS. 11 to 15, there are illustrated a disc chucking device 200, a chuck base 202, chuck pins 206, elastic members 208, a rotor 100, etc.

A disc chucking device 200 according to the third disclosed embodiment of the invention can include a chuck base 202; multiple chuck pins 206, which may be inserted in the chuck base 202 to protrude outwards from the chuck base 202; elastic members 208, which may be coupled to the chuck base 202, and which may elastically support the chick pins 206; a boss 302 formed on an inside of the chuck base 202; multiple balancing members 510, 520, which may be rotatably supported by the boss 302, and in which holes 506 may be formed; and guiding rollers, which may be inserted in the holes 506 to guide the movement of the balancing members 510, 520. The disc chucking device 200 may be to reduce noise and vibration for a rotating body during acceleration and deceleration and during high-speed rotations.

As illustrated in FIG. 11, a disc chucking device 200 can be a device for coupling a disc, in which information is inputted, to a motor, etc., for driving the disc. A chuck base 202 may hold the components of the disc chucking device 200, and may include a space at its bottom surface for holding an auto-balancing device 1100. Also, the disc chucking device 200 may couple with the rotation shaft of the motor to transfer the driving force of the motor to the disc.

A chuck pin 206 may be inserted in the chuck base 202 such that the chuck pin 206 protrudes outwards from the chuck base 202. Multiple chuck pins 206 may be formed, which may elastically couple a disc to the chuck base 202. Elastic members 208 may be used to elastically support the chuck pins 206 towards the outside of the chuck base 202. The elastic members 208 can be, for example, coil springs.

The boss 302 is a portion that may rotatably support the balancing members 510, 520 inside the chuck base 202. The boss 302 may be formed as an integrated body with the portion of the disc chucking device 200 that is coupled with the rotation shaft of the motor, or may be formed, as in this particular example, on a lower part of the chuck base 202 separately from the rotation shaft of the motor. The boss 302 may be inserted through the balancing members 510, 520 to rotatably support the balancing members 510, 520.

This embodiment shows how the auto-balancing device 1100 may be coupled beneath the disc chucking device 200, to reduce the overall size and produce a more compact optical disc drive device. Also, by coupling the auto-balancing device 1100 to the disc chucking device 200, the auto-balancing device 1100 may be provided to the optical disc drive device without modifying the existing structure of a motor, simply by coupling the disc chucking device 200 to the optical disc drive device.

The structure of the auto-balancing device 1100 coupled to the disc chucking device 200 according to this embodiment of the invention may be substantially the same as those described for the first and second disclosed embodiments set forth above, and thus will not be described in further detail. A description will now be provided as follows on the operation of the auto-balancing device 1100 coupled to the disc chucking device 200.

FIG. 12 is a bottom view of a disc chucking device 200 according to the third disclosed embodiment of the invention, FIG. 13 is a bottom view of a disc chucking device 200 according to the third disclosed embodiment of the invention, and FIG. 14 is a bottom view of a disc chucking device 200 according to the third disclosed embodiment of the invention.

FIG. 12 illustrates the disc chucking device 200 when the motor is in a balanced state. In this embodiment, the balancing members 510, 520 are inserted in the chuck base 202 in the same orientation. In a balanced state, the balancing members 510, 520 may be arranged inside the chuck base 202 in symmetry with respect to the rotation shaft of the motor. Here, the magnets 800 may be adjacent to the portions protruding from the outer perimeters of the balancing members 510, 520, and the magnetic attraction may restrain the balancing members 510, 520. In other words, the attractive forces between the magnets 800 and the balancing members 510, 520 may be greater than the centrifugal forces acting on the magnets 800. In a balanced state, the gaps between the magnets 800 and the balancing members 510, 520 may be minimum (Gap Min). Also, the gaps between the outer sides of the magnets 800 and the inside surfaces of the holding indentations 310 may be maximum (Gap Max).

As illustrated in FIG. 13, the holes 506 may form arcs formed along a circumference concentric with the rotation shaft of the motor, and when the pair of balancing members 510, 520 overlap, may distribute the balancing members 510, 520 in a more concentrated area.

The relationship between the magnitude of magnetic attraction of the magnets 800 and the magnitude of centrifugal forces applied on the magnets 800 can be configured such that the centrifugal forces are made greater at rotation speeds in which the motor is put in an unbalanced state, so that the balancing members may resolve the unbalanced state.

In a balanced state, the balancing members 510, 520 may be restrained by the magnets 800 inside the chuck base 202, so that the occurrence of noise and vibration may be reduced when the motor is started or stopped, accelerated or decelerated, or when the motor is operated under low-speeds. Of particular note is that this effect may be obtained even when the rotation shaft of the motor is at an angle with the direction of gravity.

FIG. 13 is a bottom view of a disc chucking device 200 according to the third disclosed embodiment of the invention. FIG. 13 illustrates the disc chucking device 200 when the rotation speed of the motor is increased such that the centrifugal forces acting on the magnets 800 are greater the attractive forces acting between the magnets 800 and the balancing members 510, 520. Here, the gaps between the magnets 800 and the balancing members 510, 520 may be maximum (Gap Min), while the outer sides of the magnets 800 and the inside surfaces of the holding indentations 310 may be in contact (No Gap).

The rotation speed at which the magnitude of centrifugal forces applied on the magnets 800 exceed the magnitude of attractive forces between the balancing members 510, 520 and the magnets 800 may be configured to be the rotation speed at which an unbalanced state is obtained. Thus, in an unbalanced state, the balancing members 510, 520 may freely rotate inside the chuck base 202, so that the balancing members 510, 520 may be distributed in a more concentrated area to resolve the unbalanced state.

FIG. 14 is a bottom view of a disc chucking device 200 according to the third disclosed embodiment of the invention. FIG. 14 illustrates the case where the motor rotates in an opposite direction to that in FIG. 13, to reach an unbalanced state. The pair of balancing members 510, 520 are arranged in a relationship vertically opposite to the case in FIG. 13. Similar to the case shown in FIG. 13, the balancing members 510, 520 in this case may also be arranged in any position inside the housing 300 without being restrained in movement by the magnets 800.

FIG. 15 is a cross-sectional view of an optical disc drive motor equipped with a disc chucking device 200 according to the third disclosed embodiment of the invention. FIG. 15 shows a cross section when an optical disc drive motor according to this embodiment is in an unbalanced state. As illustrated in FIG. 15, in an unbalanced state, the balancing members 510, 520 may be concentrated in a particular area inside the housing 300, to resolve the unbalance of the motor.

Figure 16:
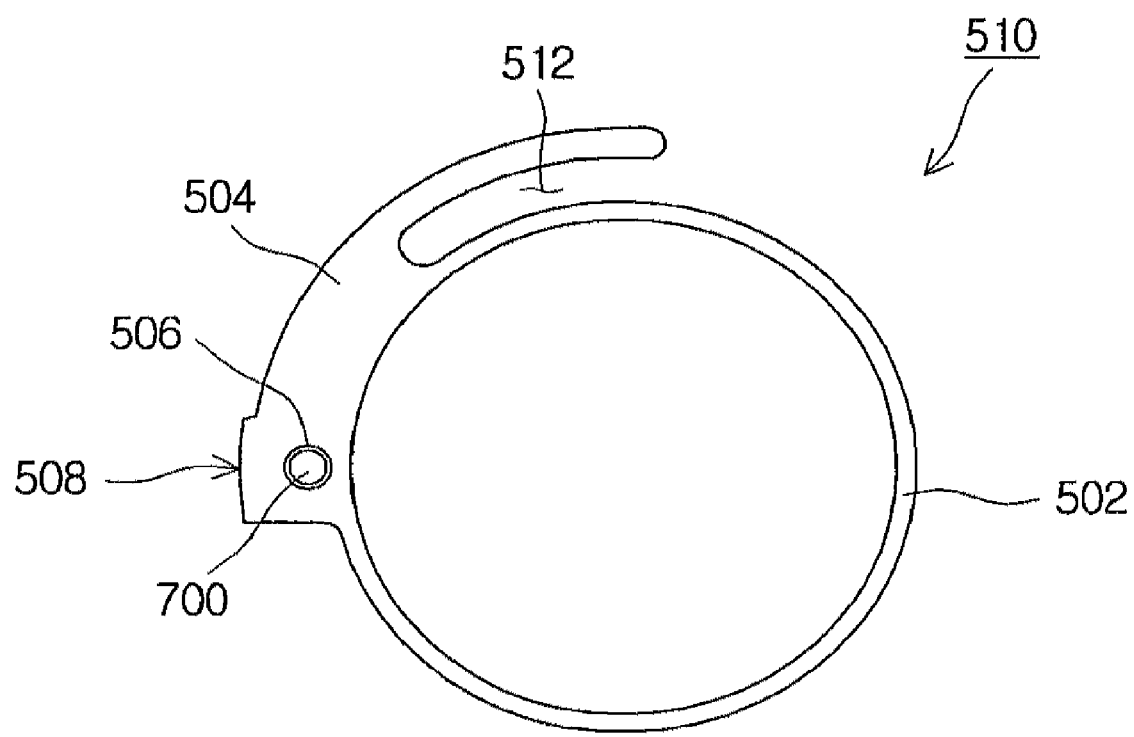
FIG. 16 is a plan view of a first balancing member in a disc chucking device according to a fourth disclosed embodiment of the invention.
Figure 17:
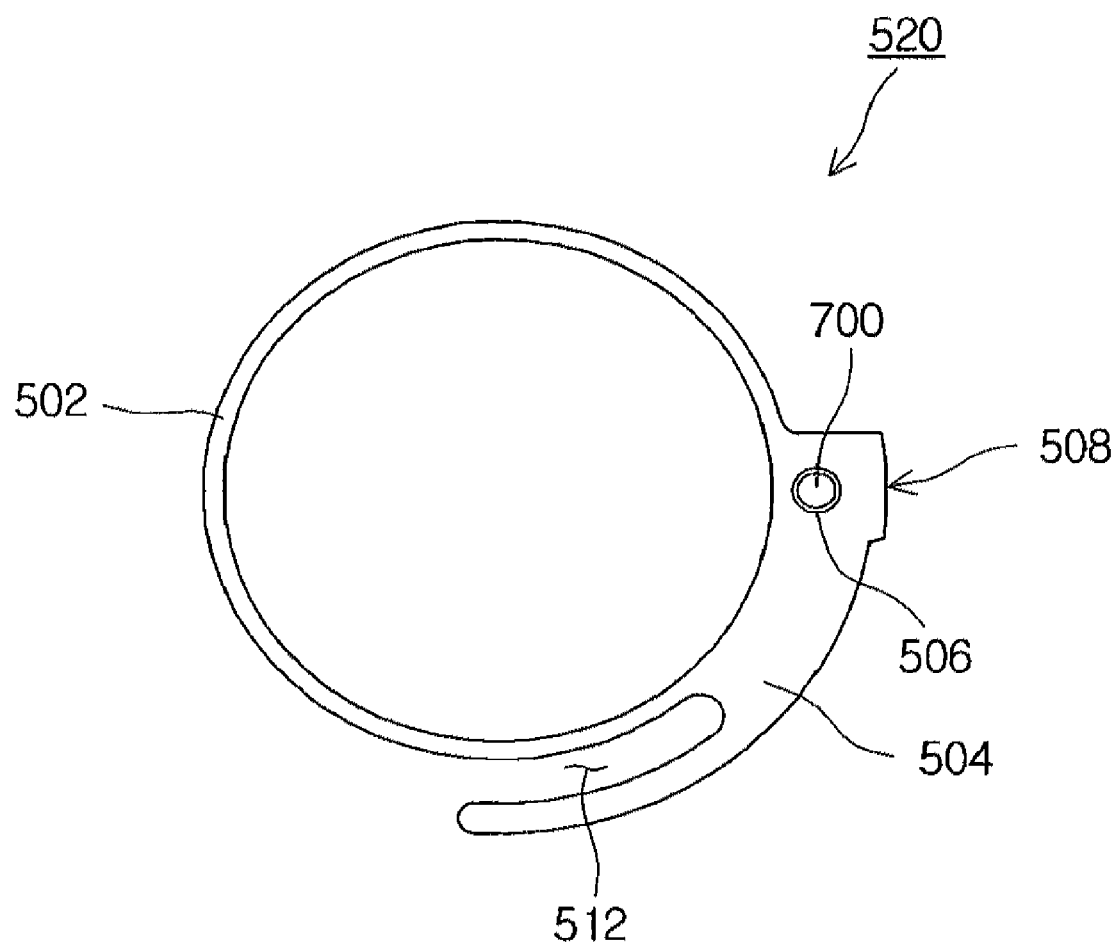
FIG. 17 is a plan view of a second balancing member in a disc chucking device according to the fourth disclosed embodiment of the invention.

FIG. 16 is a plan view of a first balancing member 510 in a disc chucking device 200 according to a fourth disclosed embodiment of the invention, and FIG. 17 is a plan view of a second balancing member 520 in a disc chucking device 200 according to the fourth disclosed embodiment of the invention.

In a balancing member 510, 520 of this particular embodiment, a receiving indentation 512 may be formed in the outer perimeter of the balancing member 510, 520, where the receiving indentation 512 may follow an imaginary-circumference, which is concentric with the balancing member 510, 520, and which passes through the guiding roller. As illustrated in FIG. 16, a receiving indentation 512 may be formed in the mass 504 of a first balancing member 510, allowing a second guiding roller of a second balancing member 520 to be received in the receiving indentation 512.

As the first and second balancing members 510, 520 overlap each other with the second guiding roller received in the receiving indentation 512 of the first balancing member 510, the balancing members 510, 520 may be disposed in a more concentrated area. As illustrated in FIG. 17, the second balancing member 520 may be inserted inside the chuck base 202 arranged in the same orientation as that of the first balancing member 510.

Figure 18:
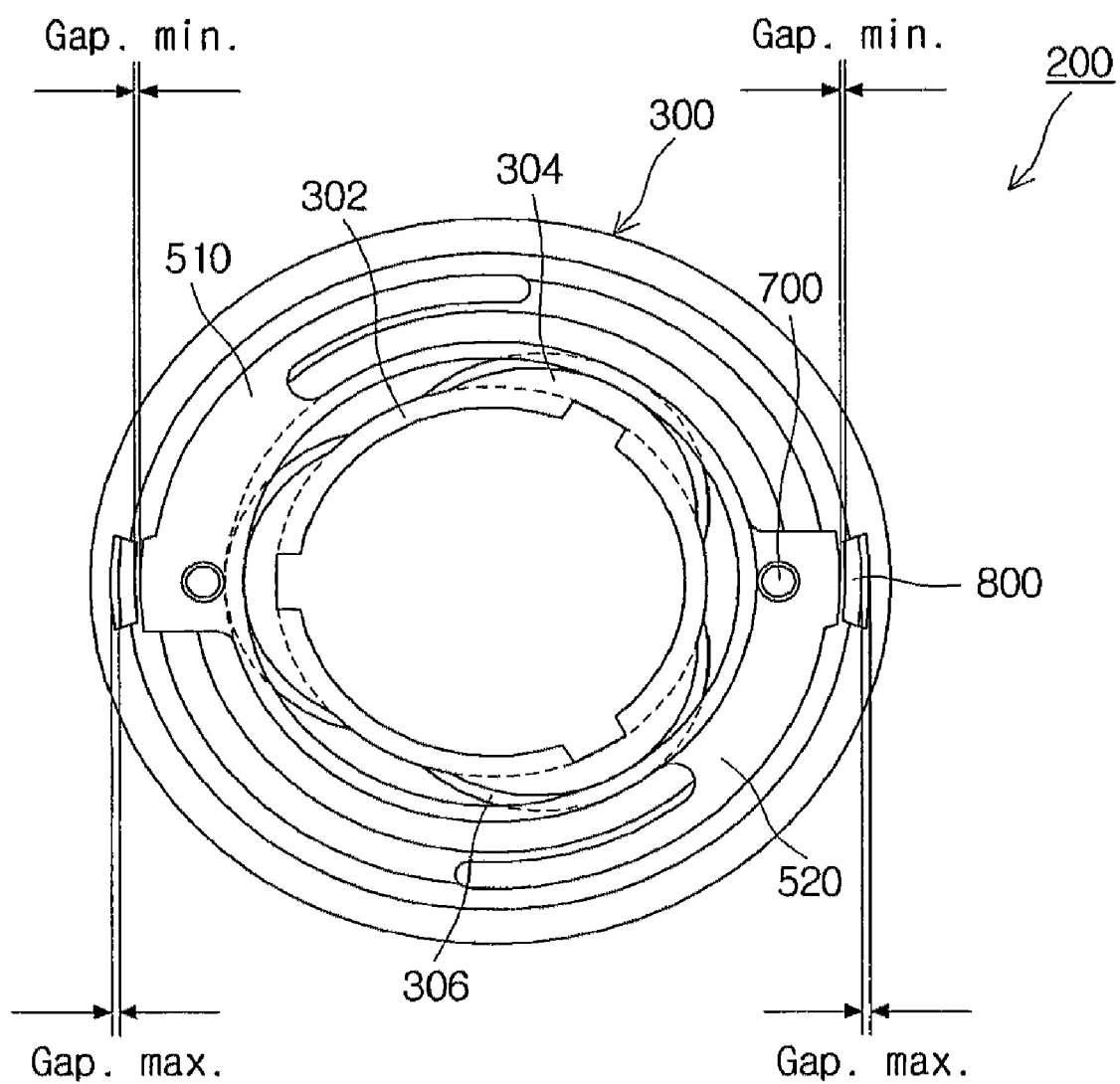
FIG. 18 is a bottom view of a disc chucking device according to the fourth disclosed embodiment of the invention.
Figure 19:
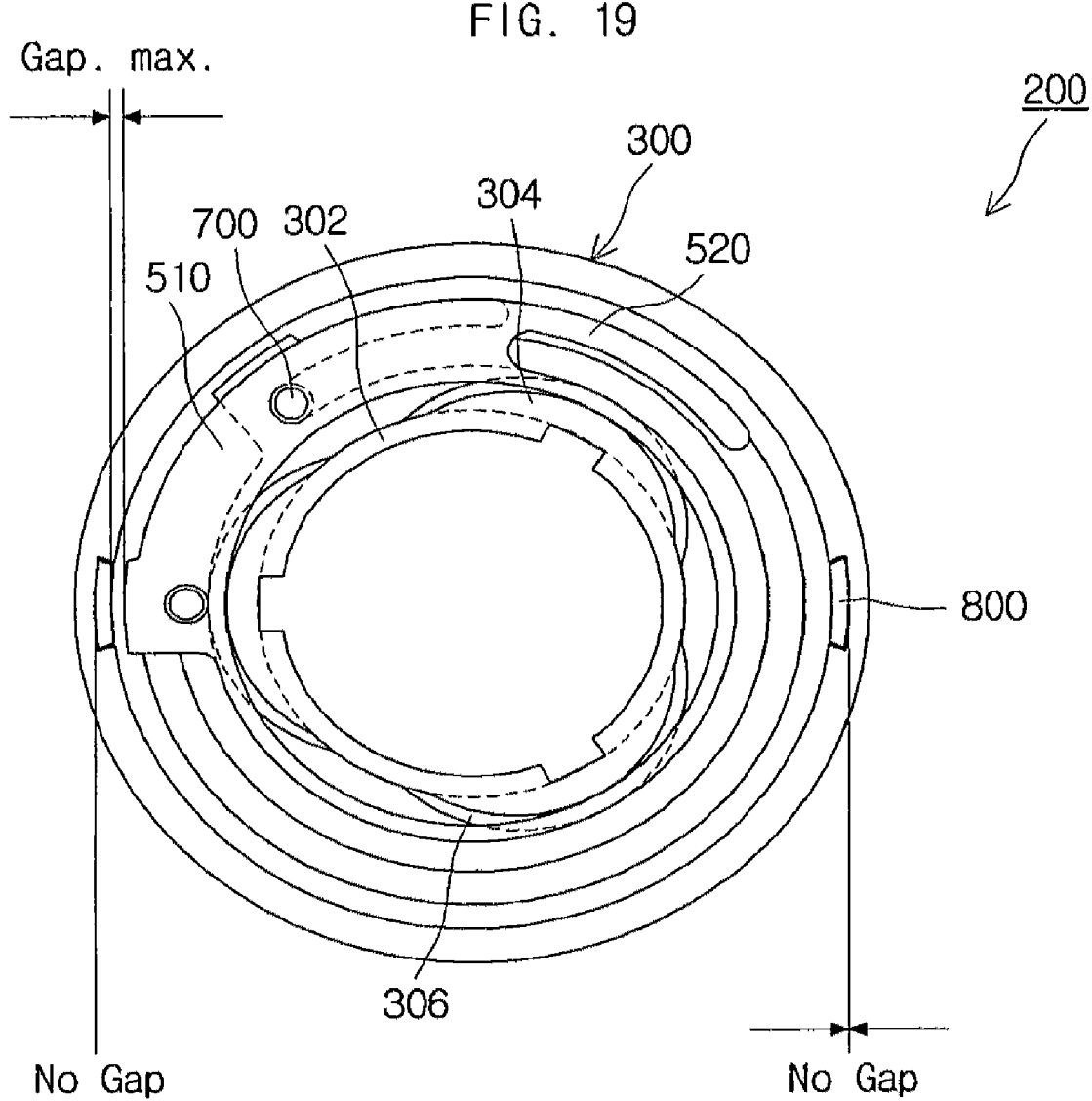
FIG. 19 is a bottom view of a disc chucking device according to the fourth disclosed embodiment of the invention.
Figure 20:
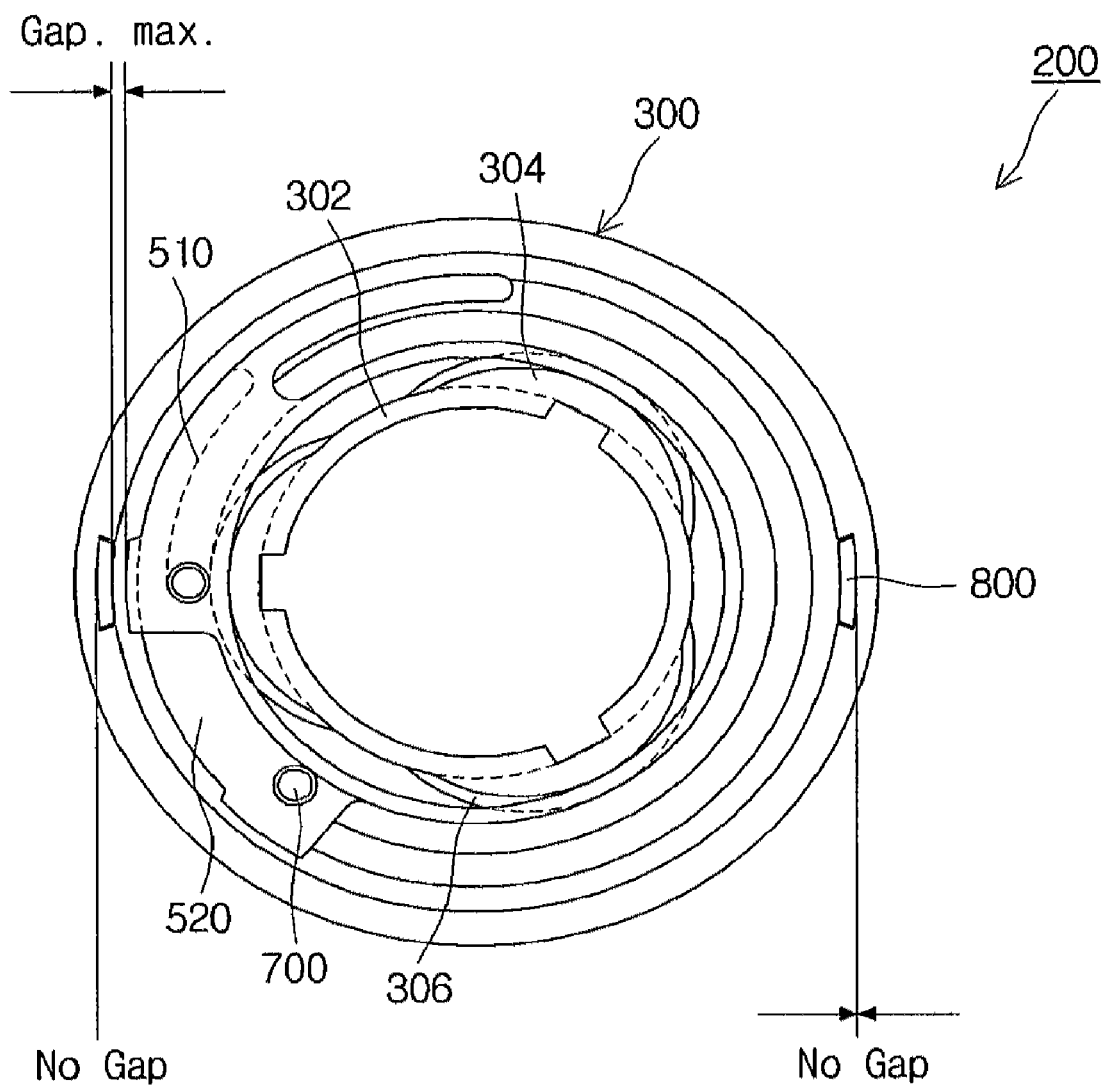
FIG. 20 is a bottom view of a disc chucking device according to the fourth disclosed embodiment of the invention.

FIG. 18 through FIG. 20 are bottom views of a disc chucking device 200 according to the fourth disclosed embodiment of the invention. FIG. 18 illustrates the disc chucking device 200 when the motor is in a balanced state. As described above, the balancing members 510, 520 of this embodiment may be inserted in the chuck base 202 with the same orientation, to be arranged within the chuck base 202 in symmetry with respect to the rotation shaft of the motor. In a balanced state, the magnets 800 may be adjacent to the balancing members 510, 520 and may restrain their movement.

FIGS. 19 and 20 illustrate the cases that may occur when the disc chucking device 200 is in an unbalanced state. With an increase in the centrifugal forces acting on the magnets 800, the outer sides of the magnets 800 may contact the inside surface of the holding indentations 310 (No Gap), and the balancing members 510, 520 may rotate freely within the chuck base 202 to be concentrated in a particular area inside the chuck base 202 and resolve the unbalance of the motor. Here, the second guiding roller can be received in the receiving indentation 512 formed in the mass 504 of the first balancing member 510, allowing the first and second balancing members 510, 520 to be arranged in a more concentrated area.

Figure 21:
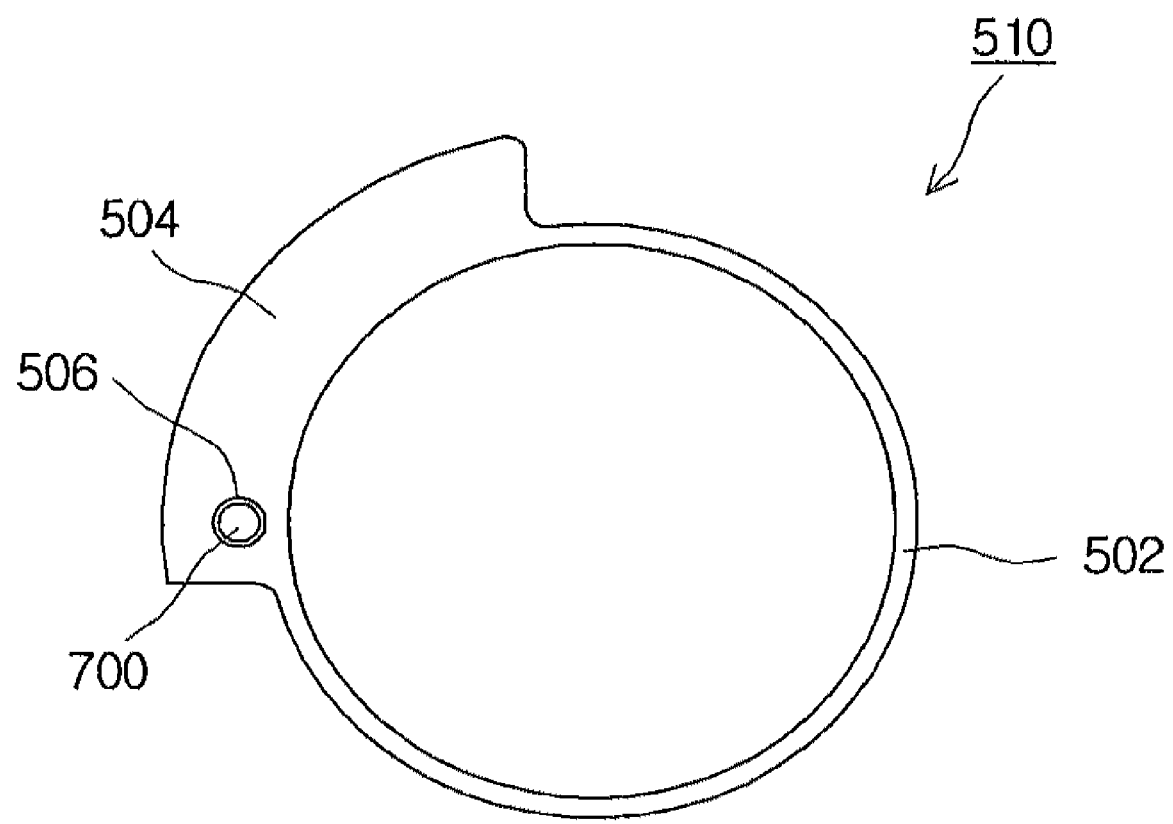
FIG. 21 is a plan view of a first balancing member in a disc chucking device according to a fifth disclosed embodiment of the invention.
Figure 22:
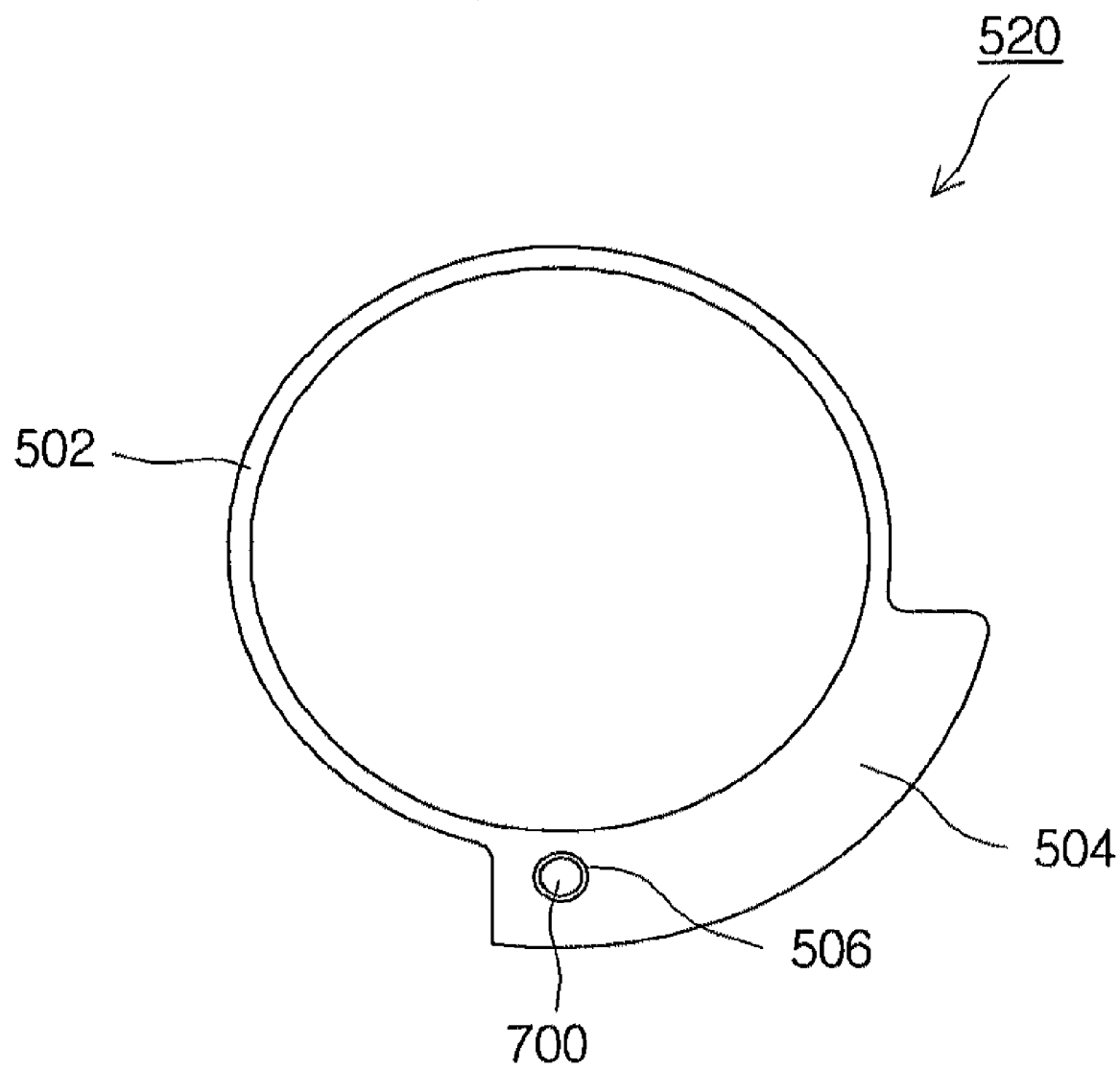
FIG. 22 is a plan view of a second balancing member in a disc chucking device according to the fifth disclosed embodiment of the invention.
Figure 23:
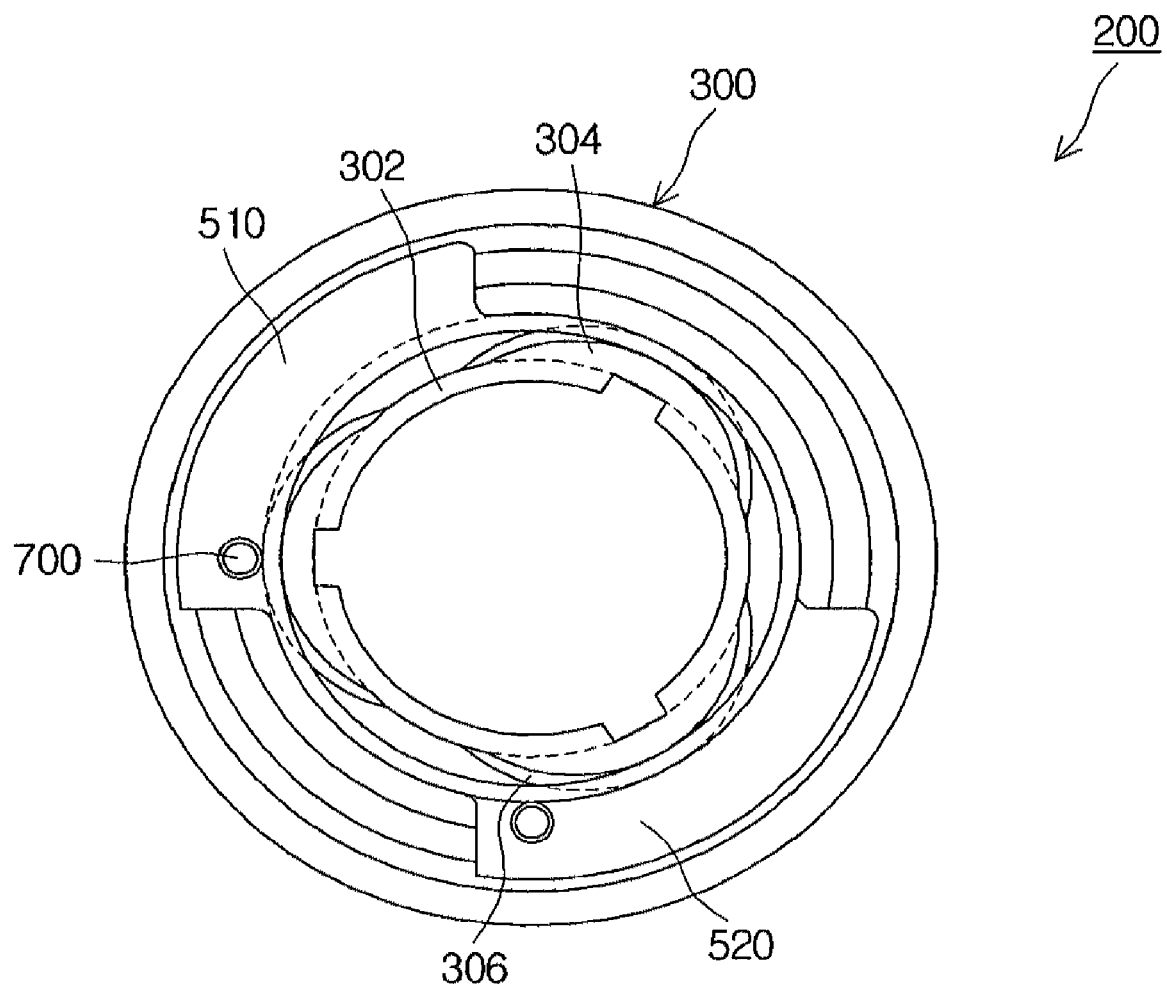
FIG. 23 is a bottom view of a disc chucking device according to the fifth disclosed embodiment of the invention.

FIG. 21 is a plan view of a first balancing member 510 in a disc chucking device 200 according to a fifth disclosed embodiment of the invention, FIG. 22 is a plan view of a second balancing member 520 in a disc chucking device 200 according to the fifth disclosed embodiment of the invention, and FIG. 23 is a bottom view of a disc chucking device 200 according to the fifth disclosed embodiment of the invention. Also, FIG. 24 is a bottom view of a disc chucking device 200 according to the fifth disclosed embodiment of the invention, and FIG. 25 is a bottom view of a disc chucking device 200 according to the fifth disclosed embodiment of the invention.

The disc chucking device 200 according to this embodiment includes balancing members 510, 520 having a different structure. As illustrated in FIGS. 21 and 22, the balancing members 510, 520 may be inserted in opposite orientations. FIG. 23 shows the arrangement of the balancing members 510, 520 when the disc chucking device 200 of this embodiment is in a balanced state.

In the balanced state, the first and second balancing members 510, 520 may be evenly distributed inside the chuck base 202. As described above, in a balanced state, the movement of the balancing members 510, 520 may be restrained by the magnets 800 such that the eccentric masses 504 of the balancing members 510, 520 does not affect the rotation of the motor.

Figure 24:
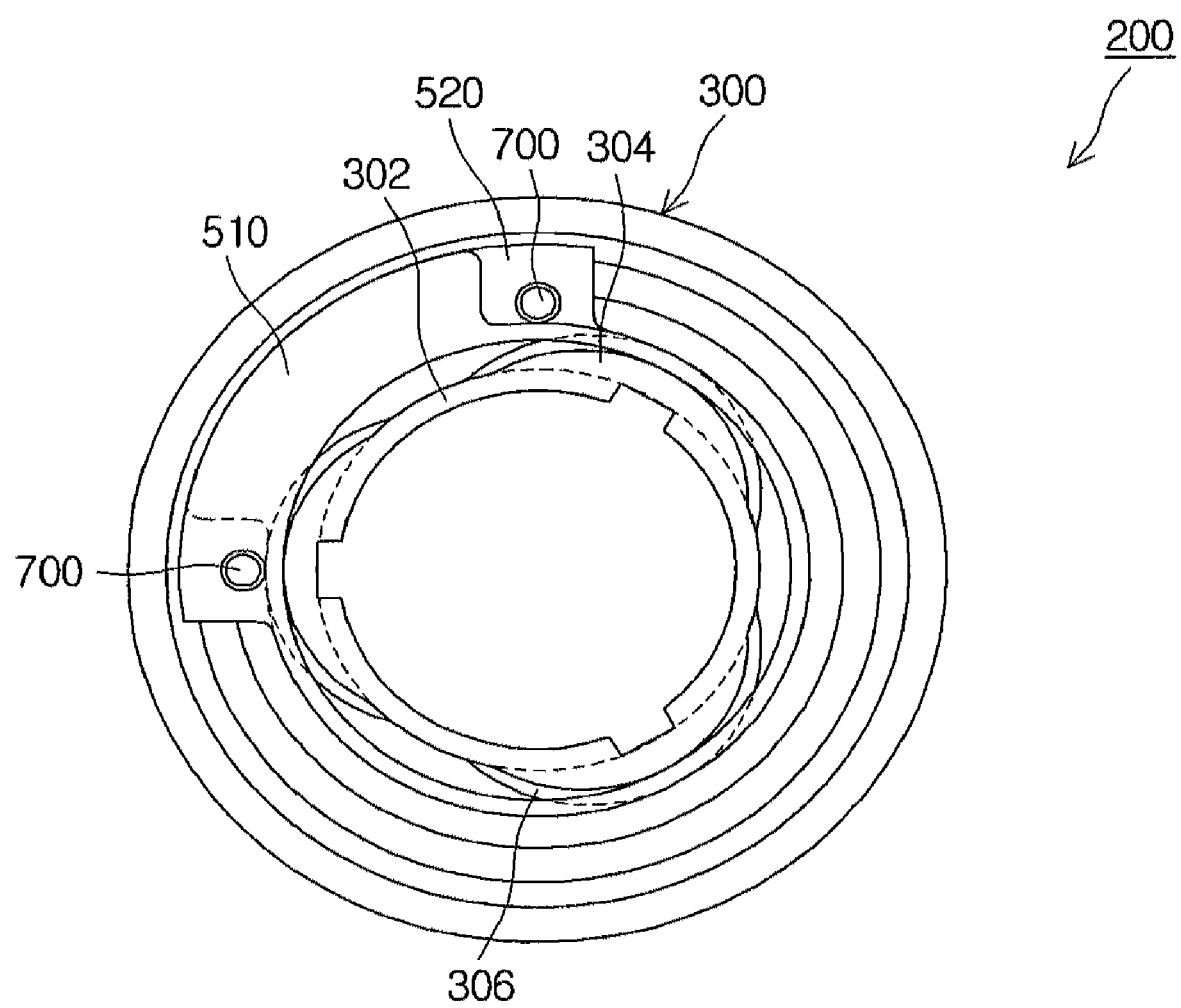
FIG. 24 is a bottom view of a disc chucking device according to the fifth disclosed embodiment of the invention.
Figure 25:
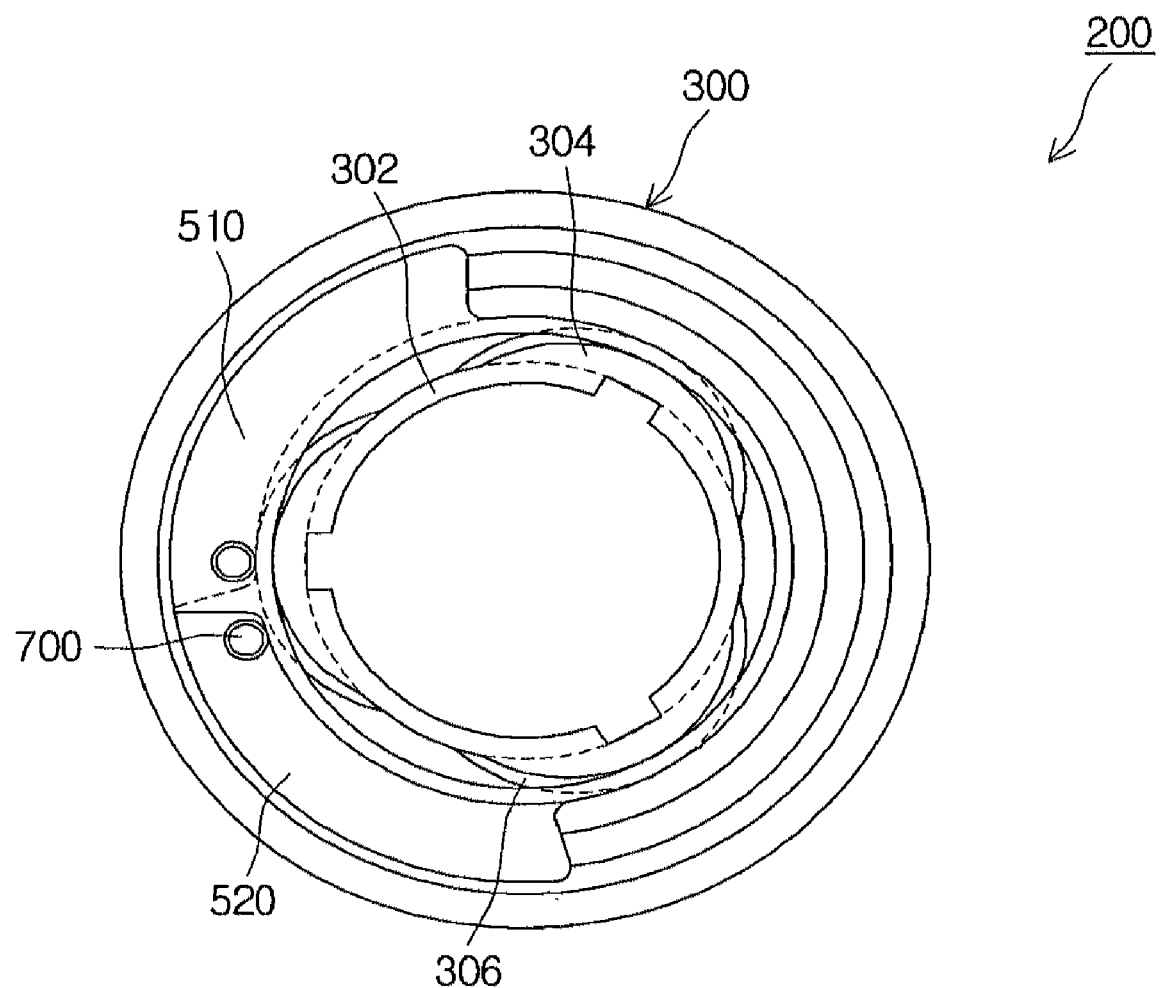
FIG. 25 is a bottom view of a disc chucking device according to the fifth disclosed embodiment of the invention.

FIG. 24 and FIG. 25 show possible arrangements of the balancing members 510, 520 in an unbalanced state. This embodiment shares substantially the same technical features as those of the previously described embodiments, except that the orientations in which the first and second balancing members 510, 520 are inserted is opposite.

The balancing members 510, 520 based on this embodiment, while in an unbalanced state, may rotate freely within the inside of the chuck base 202, to be arranged in a concentrated manner inside the chuck base 202 and resolve the unbalanced state. Because the first and second balancing members 510, 520 may be inserted in opposite orientations, the disc chucking device 200 of this embodiment may respond to an unbalance with greater agility. Of course, in this case, the movement of the balancing members 510, 520 may be guided by the guiding rollers.

In the disc chucking device 200 of this embodiment also, the magnets 800 may be coupled to predetermined positions on the inner perimeter of the chuck base 202, to restrain the positions of the balancing members 510, 520 during the starting or stopping of the motor, as described above, and allow smoother operation for the motor.

Figure 26:
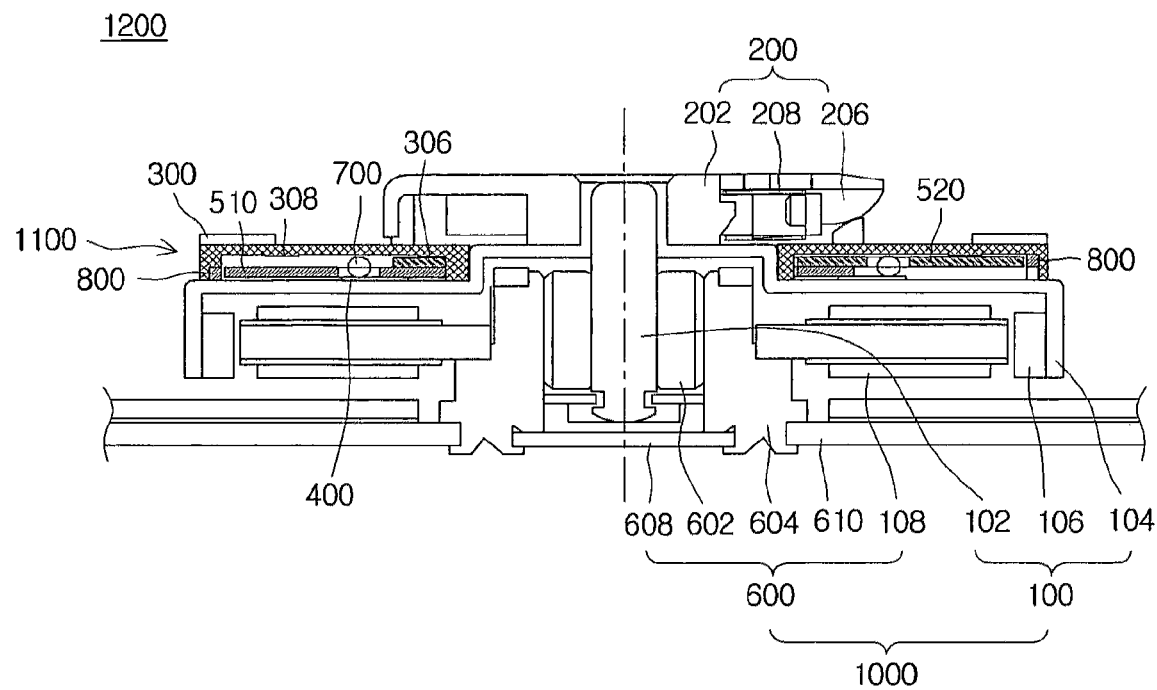
FIG. 26 is a cross-sectional view of a disc driving device according to a sixth disclosed embodiment of the invention, in a balanced state.

FIG. 26 is a cross-sectional view of a disc driving device according to a sixth disclosed embodiment of the invention in a balanced state. In FIG. 26, there are illustrated a rotor 100, a rotation shaft 102, a rotor holder 104, rotor magnets 106, a disc chucking device 200, a chuck base 202, chuck pins 206, elastic members 208, a housing 300, second protrusions 306, 308, a first balancing member 510, a second balancing member 520, magnets 800, a stator 600, a sleeve 602, a bush 604, a finishing plate 608, a frame 610, a motor 1000, an auto-balancing device 1100, and a disc driving device 1200.

A disc driving device 1200 according to the sixth disclosed embodiment of the invention may include a stator 600; a rotor 100, which may rotate relatively to the stator 600; a disc chucking device 200, which may be coupled to one end of the rotor 100, and to which the disc may be separably coupled; a housing 300, which may be coupled with the rotor 100, and on which a boss 302 may be formed; multiple balancing members 510, 520, which may be rotatably supported by the boss 302, and in which holes 506 may be formed; and guiding rollers 700, which may be inserted in the holes 506 to guide a movement of the balancing members 510, 520. The disc driving device 1200 may be utilized to reduce noise and vibration for a rotating body during acceleration and deceleration and during high-speed rotations.

As illustrated in FIG. 26, a disc driving device 1200 may be coupled with an information storage medium, or a disc, to provide a driving force to the disc. The disc driving device 1200 may include a disc chucking device 200, an auto-balancing device 1100, and a motor 1000.

The motor 1000 can be a device for generating a driving force and can include a stator 600, and a rotor 100 that rotates relatively to the stator 600. The stator 600 may include a bush 604 secured to a frame 610 and coils 108 secured to the outer perimeter of the bush 604, while a sleeve 602 may be included inside the bush 604 for supporting a rotation shaft 102 and allowing smooth rotation.

The bush 604, which may be inserted in a hole in the frame 610, may have securing protrusions at one end. The securing protrusions may be folded, after being inserted through the hole in the frame 610, such that the bush 604 is secured to the frame 610. The coils 108 may be equipped on the outer perimeter of the bush 604, where an electric current may be supplied to the coils 108, which may then form an electric field. The coils 108 may be arranged adjacent to rotor magnets 106 secured to a rotor holder 104.

At the center of the bush 604, a finishing plate 608 may be inserted and secured. The finishing plate 608 may prevent foreign substances from infiltrating the inside of the bush 604, while supporting one end of the rotation shaft 102.

The rotor 100 may include the rotation shaft 102, which may be supported by the sleeve 602; the rotor holder 104, which may be inserted over the rotation shaft 102 and which may support the disc chucking device 200 and auto-balancing device 1100; and rotor magnets 106, which may be secured to the inner perimeter of the rotor holder 104.

The rotation shaft 102 may rotate together with the rotor holder 104 and may transfer the rotational force to the disc chucking device 200 and the auto-balancing device 1100. One end of the rotation shaft 102 may be supported by the finishing plate 608, while the other end may be inserted and secured through an insertion portion of the rotor holder 104.

The rotor holder 104 may be inserted onto the rotation shaft 102 and may rotate together with the rotation shaft 102, disc chucking device 200, and auto-balancing device 1100. The rotor holder 104 may have a circular horizontal cross section, and may be open downwards. An upper surface of the rotor holder 104 may be shaped as a circular plate, and may be coupled to the disc chucking device 200 at one end. Also, the auto-balancing device 1100 may be coupled with an upper surface of the rotor holder 104.

The upper surface of the rotor holder 104 may be stepped, in order that the auto-balancing device 1100 may be inserted onto an inner perimeter of the boss 302. A portion of the rotor holder 104 may be inserted through the auto-balancing device 1100 to couple the auto-balancing device 1100 to the motor 1000, and in this way, the auto-balancing device 1100 may be coupled to the rotor 100 in a more convenient manner, while the disc driving device 1200 may be implemented in a compact size.

The rotor magnets 106 may be secured onto an inner perimeter of the rotor holder 104. The interaction between the magnetic field created by the rotor magnets 106 and the electric field created by the coils 108 generates electromagnetic forces, which may cause the rotor 100, disc chucking device 200, and auto-balancing device 1100 to rotate.

Figure 27:
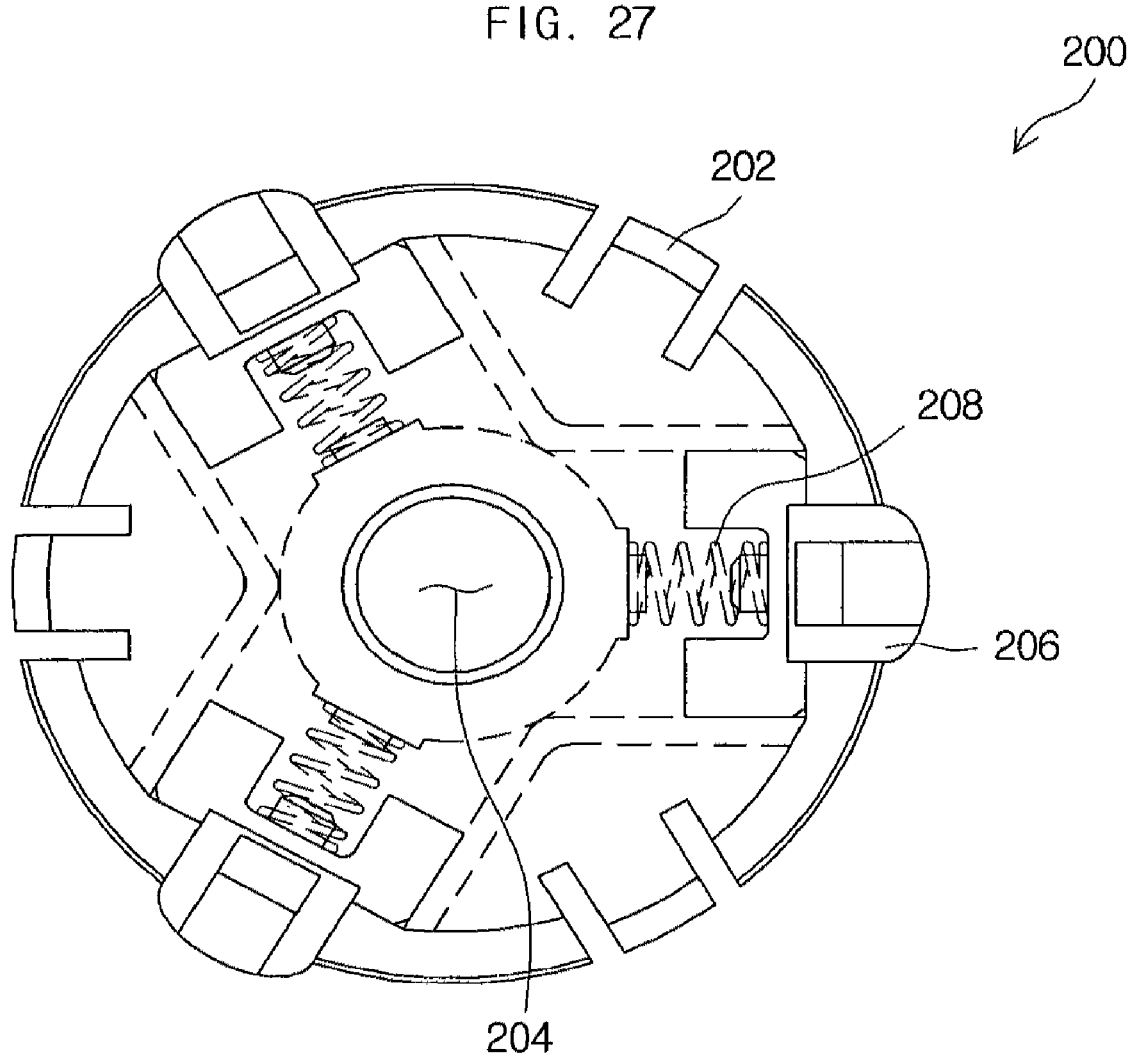
FIG. 27 is a bottom view of a disc chucking device according to the sixth disclosed embodiment of the invention.

FIG. 27 is a bottom view of a disc chucking device 200 according to the sixth disclosed embodiment of the invention. As illustrated in FIG. 27, the disc chucking device 200 may be coupled with one end of the rotor 100 of the motor 1000, and may be separably coupled with the disc. A center hole 204 may be formed in the middle of the chuck base 202, and the rotor may have one end inserted in the center hole 204 to be coupled with the motor 1000.

The chuck pins 206 may be held in the chuck base 202 and may protrude to the outside of the chuck base 202. Also, elastic members 208 may be included, which may elastically support the chuck pins 206 outwards, so that the chuck pins 206 protrude the outside of the chuck base 202. When a disc is mounted, a portion of the chuck base 202 may be inserted through the inner perimeter of the disc, and the chuck pins 206 may latch onto the inner perimeter of the disc, so that the disc may be detachably coupled to the disc driving device 1200.

Figure 28:
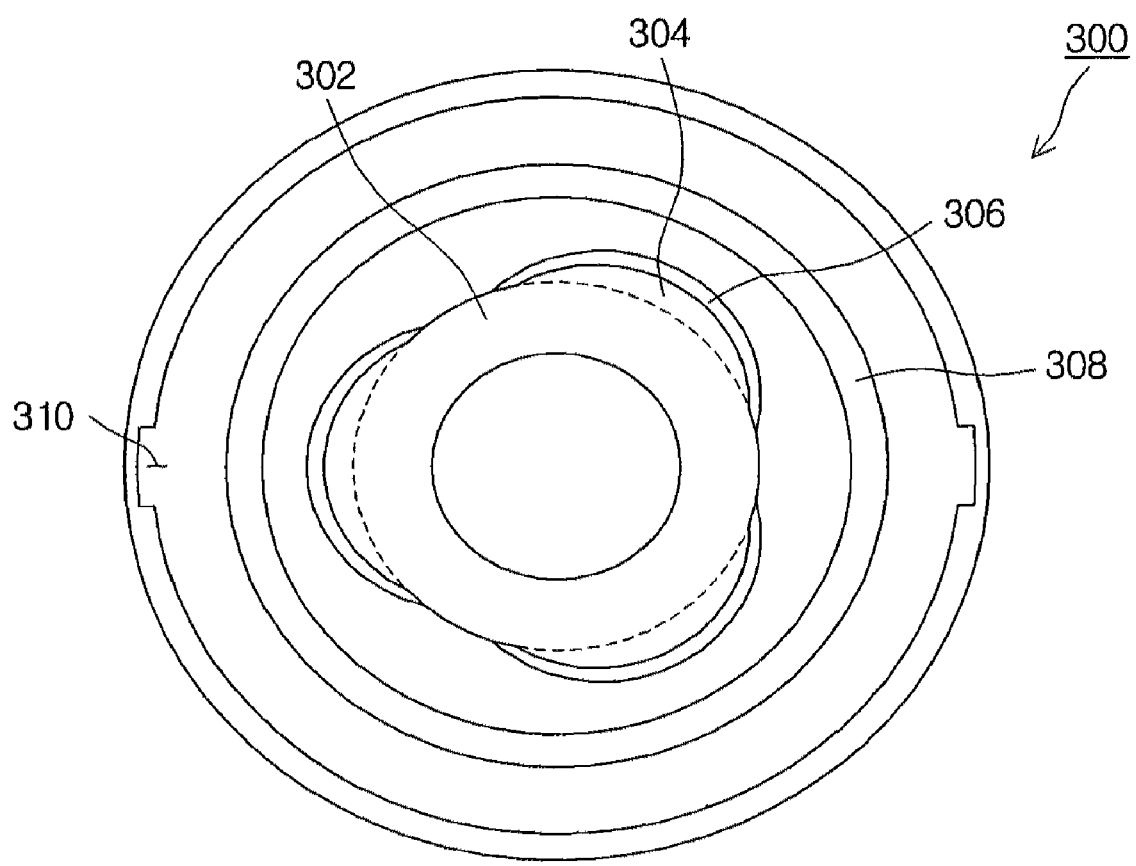
FIG. 28 is a bottom view of a housing in an auto-balancing device according to the sixth disclosed embodiment of the invention.
Figure 29:
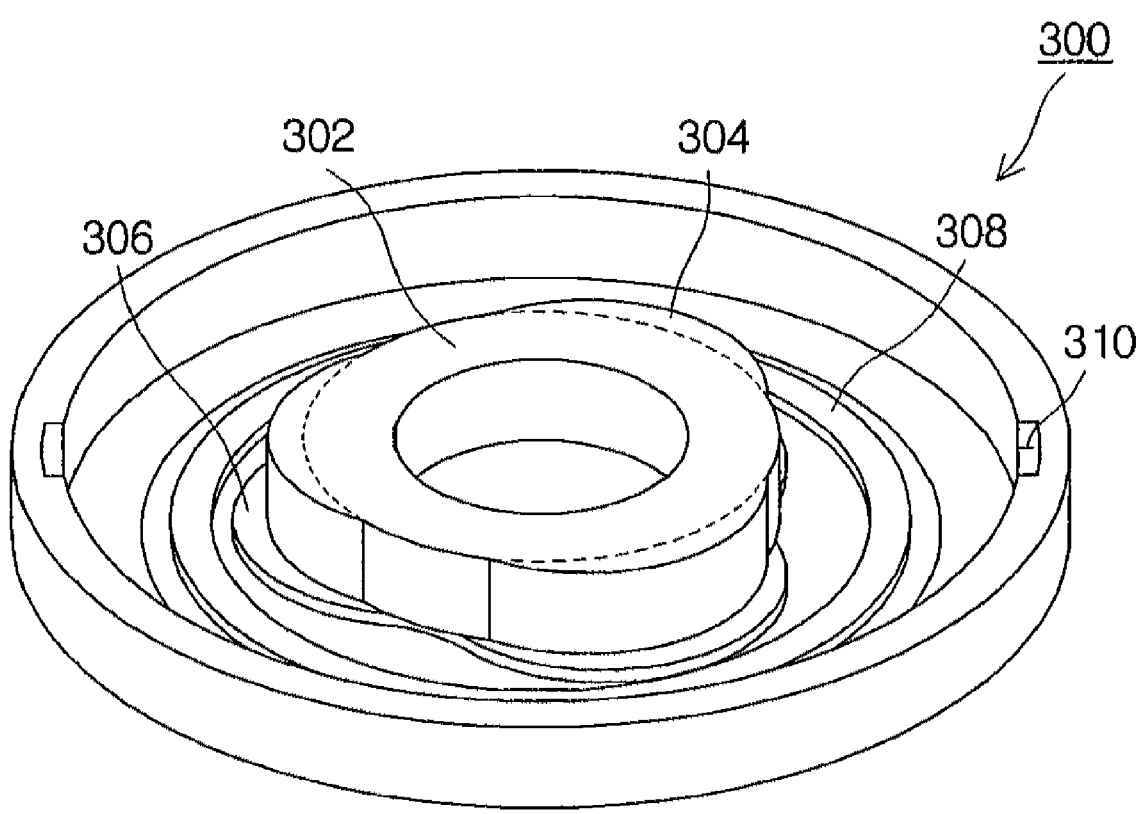
FIG. 29 is a perspective view of a housing in an auto-balancing device according to the sixth disclosed embodiment of the invention.

FIG. 28 is a bottom view of a housing 300 in an auto-balancing device 1100 according to the sixth disclosed embodiment of the invention, and FIG. 29 is a perspective view of a housing 300 in an auto-balancing device 1100 according to the sixth disclosed embodiment of the invention. In FIGS. 28 and 29, there are illustrated a housing 300, a boss 302, first protrusions 304, second protrusions 306, 308, and holding indentations 310.

As illustrated in FIGS. 28 and 29, the boss 302 may be formed inside the housing 300. The inner perimeter of the boss 302 can be the portion coupling with the rotor 100. The inner diameter of the boss 302 may be adjusted according to the size of the rotating body to which it is coupled. The housing 300 may be structured to cover the internal components of the auto-balancing device 1100. In the space formed by the boss 302 and the inner perimeter of the housing 300, balancing members 510, 520 may be installed.

On the outer perimeter of the boss 302, multiple first protrusions 304 may be formed in contact with the inner perimeters of the balancing members 510, 520. As the inner perimeters of the balancing members 510, 520 contact the first protrusions 304 of the boss 302, the balancing members 510, 520 may be rotatably supported by the first protrusions 304. The first protrusions 304 may decrease the area of contact between the boss 302 and the balancing members 510, 520, whereby the friction between the boss 302 and the balancing members 510, 520 may be reduced.

Second protrusions 306, 308 may be formed on a bottom surface of the housing 300 to support the balancing members 510, 520. Here, the second protrusions 306 maybe formed on the bottom of the housing 300 adjacent to the boss 302, to support the inner perimeters of the annular rings 502 forming the balancing members 510, 520. Also, a second protrusion 308 may be formed on a bottom surface of the housing 300 in an annular shape concentric with the rotating body, in order to support a mass 504 coupled to one side of an annular ring 502 in each of the balancing members 510, 520. The second protrusions 306 adjacent to the boss 302 and the ring-shaped second protrusion 308 may each reduce the contact area between the balancing members 510, 520 and the bottom surface of the housing 300, to thereby reduce friction between the balancing members 510, 520 and the bottom surface of the housing 300.

In the inner perimeter of the housing 300, holding indentations 310 may be formed, in which magnets 800 may be inserted. The holding indentations 310 may be formed in predetermined positions of the inner perimeter. The predetermined positions may refer to positions at which the magnets 800 inserted in the holding indentations 310 can apply magnetic attraction to protruding portions on the outer perimeters of the balancing members 510, 520 such that the balancing members 510, 520 become arranged in a symmetrical disposition with respect to the rotation shaft 102.

The magnets 800 may restrain the movement of the first and second balancing members 510, 520 during low-speed rotations, not to impose unnecessary loads on the motor 1000. Even when the disc driving device 1200 is installed such that the rotation shaft 102 is at an angle with the direction of gravity, the first and second balancing members 510, 520 facing downwards can be made to quickly rise with the starting of the rotation of the motor 1000.

During high-speed rotations, when the centrifugal forces applied on the first and second balancing members 510, 520 exceed the attractive forces of the magnets 800, the magnets 800 may no longer restrain the movement of the first and second balancing members 510, 520. Consequently, when vibrations occur in the disc driving device 1200, the first and second balancing members 510, 520 may concentrate in a particular area within the housing 300, to reduce or eliminate the vibrations.

Figure 30:
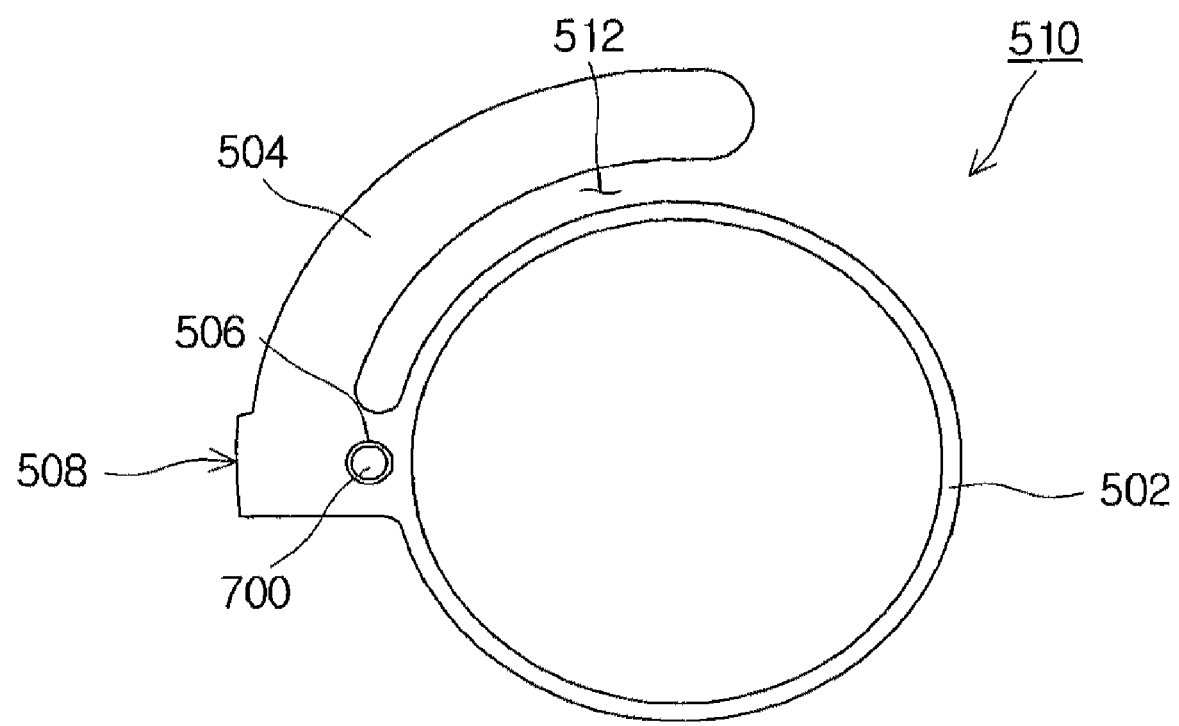
FIG. 30 is a plan view of a first balancing member in an auto-balancing device according to the sixth disclosed embodiment of the invention.
Figure 31:
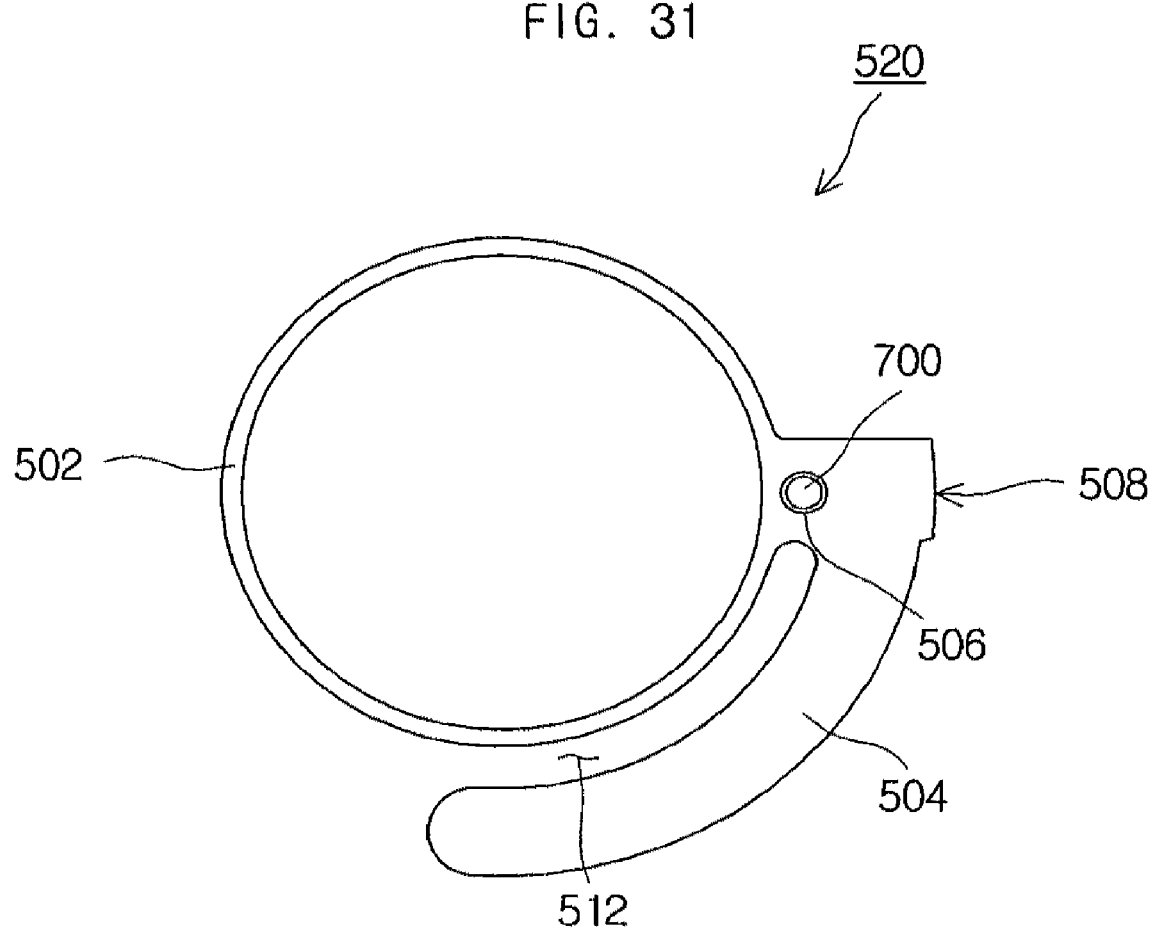
FIG. 31 is a plan view of a second balancing member in an auto-balancing device according to the sixth disclosed embodiment of the invention.

FIG. 30 is a plan view of a first balancing member 510 in an auto-balancing device 1100 according to the sixth disclosed embodiment of the invention, and FIG. 31 is a plan view of a second balancing member 520 in an auto-balancing device 1100 according to the sixth disclosed embodiment of the invention.

As illustrated in FIGS. 30 and 31, a balancing member 510, 520 may be rotatably supported by the boss 302 and may include a hole 506 formed therein. The balancing member 510, 520 can include an annular ring 502, which may be inserted onto the boss 302, and a mass 504, which may be coupled to one side of the annular ring 502. A multiple number of balancing members can be included.

Because of the mass 504 coupled to one side of the annular ring 502, the balancing member 510, 520 is given a generally eccentric form. When the rotating body is in an unbalanced state, the masses 504 on the multiple balancing members 510, 520 may be concentrated in a particular area, whereas in a balanced state, the masses 504 may be evenly distributed inside the housing 300.

A pair of balancing members 510, 520 may be used, where the pair of balancing members 510, 520 may be inserted in the housing 300 in the same orientation. The auto-balancing device 1100 may be coupled to an upper surface of the rotor 100, whereby the space within the housing 300 in which the balancing members 510, 520 may be inserted can be increased even further. This means that the balancing member 510, 520 may be coupled in greater proximity to the rotation shaft 102, and that the force required by the motor 1000 to rotate the auto-balancing device 1100 may consequently be reduced.

In other words, the auto-balancing device 1100 may perform an operation for reducing vibration in the disc driving device 1200 in a shorter amount of time. This can be of particular importance for the auto-balancing device 1100, when the rotation shaft 102 of the disc driving device 1200 is installed at an angle with the direction of gravity.

Also, the magnets 800 may restrain the movement of the first and second balancing members 510, 520 during low-speed rotations, so that the first and second balancing members 510, 520 facing downwards can be made to rise quickly.

An increase in the amount of space within the housing 300, in which a balancing member 510, 520 may be inserted, allows an increase in the size of the mass 504 of the balancing member 510, 520. An increase in size of the mass 504 leads to an increase in the degree of eccentricity of the balancing member 510, 520, and hence an improvement in the performance of the auto-balancing device 1100. Of course, the balancing member may be modified to have various other forms in consideration of the structure of the motor 1000 and the installation space in the auto-balancing device 1100, etc.

Lubrication may be interposed between the balancing members 510, 520 and the housing 300. Examples of such lubrication include liquid lubricants and slidable plastic spacers. Also, the material used for the balancing members 510, 520 can be a metal or a plastic coated with hard metal.

The auto-balancing device 1100 may further include a sliding disc 400 that supports the guiding rollers 700 and the balancing members 510, 520. The sliding disc 400 may be positioned between the guiding rollers 700 and first and second balancing members 510, 520 and the rotor holder 104 to support the balancing members 510, 520 and guiding rollers 700.

The sliding disc 400 may facilitate the operation of the first and second balancing members 510, 520 regardless of state of the surface of the rotor holder 104. The sliding disc 400 may include a layer of lubrication on its surface, where the lubrication layer may include a hard metal coating layer.

As illustrated in FIGS. 30 and 31, a receiving indentation 512 may be formed in the outer perimeter of a balancing member 510, 520, where the receiving indentation 512 may follow an imaginary circumference, which is concentric with the balancing member 510, 520, and which passes through the guiding roller 700. A receiving indentation 512 may be formed in the mass 504 of a first balancing member 510, allowing the second guiding roller 700 of a second balancing member 520 to be received in the receiving indentation 512.

As the first and second balancing members 510, 520 overlap each other with the second guiding roller 700 received in the receiving indentation 512 of the first balancing member 510, the balancing members 510, 520 may be disposed in a more concentrated area. The second balancing member 520 may be inserted inside the housing 300 in the same orientation as that of the first balancing member 510.

Figure 32:
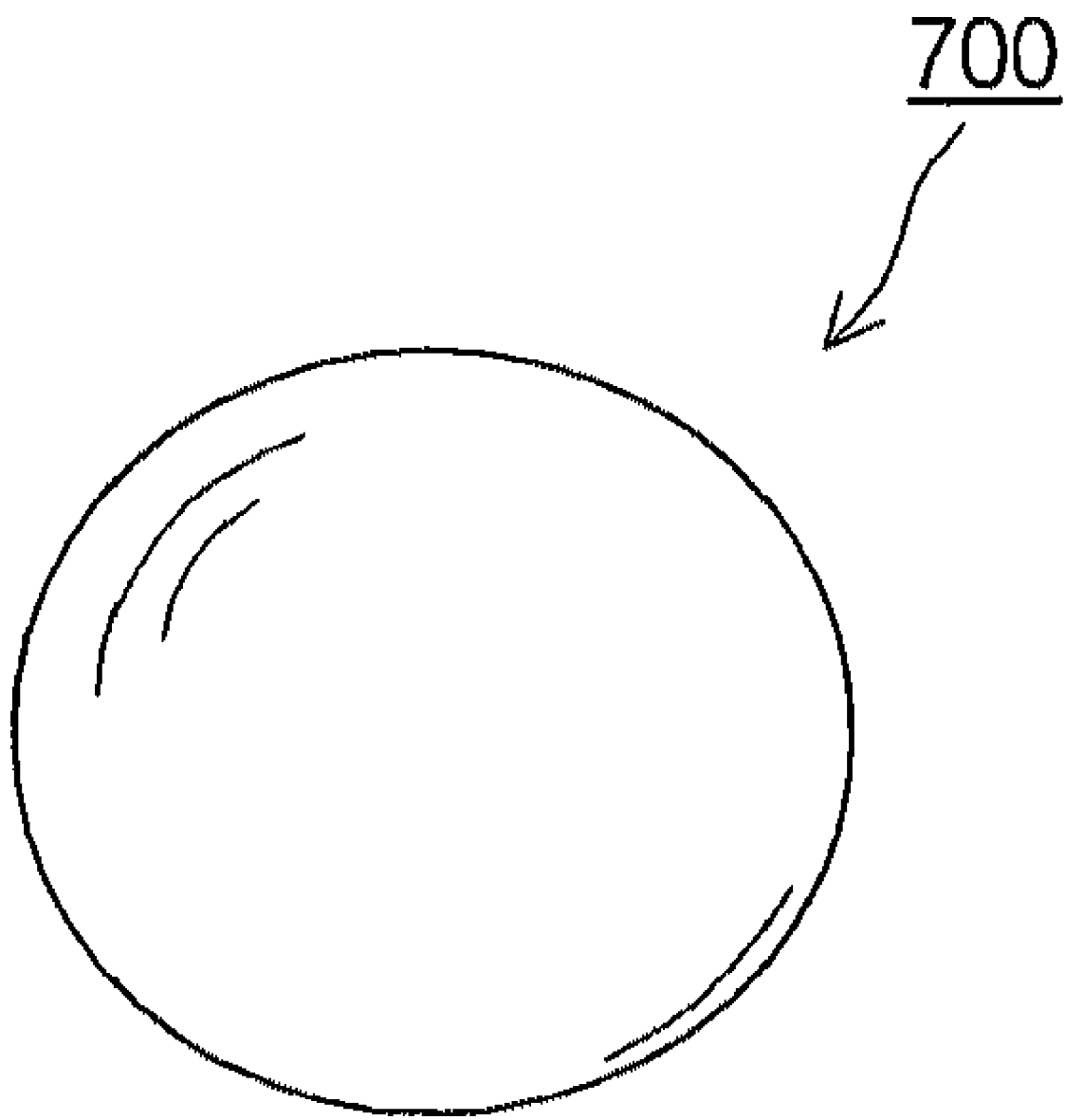
FIG. 32 is a perspective view of a guiding roller in an auto-balancing device according to the sixth disclosed embodiment of the invention.

FIG. 32 is a perspective view of a guiding roller 700 in an auto-balancing device 1100 according to the sixth disclosed embodiment of the invention. The guiding roller 700 in an auto-balancing device 1100 according to the sixth disclosed embodiment of the invention can have a spherical shape. The guiding roller 700 may be inserted in the hole 506 in the mass 504 of a balancing member 510, 520, to restrain and guide the movement of the balancing member 510, 520.

A first guiding roller 700 may be in contact with the outer perimeter of a second balancing member 520, whereby the movement of the balancing members 510, 520 may be limited. Also, the guiding roller 700 can be detached from the hole 506, and may thus act as a damper which absorbs the vibration energy that may occur when the motor 1000 accelerates or decelerates.

A spherical guiding roller 700 may have a small contact area with the balancing member, sliding disc 400, bottom surface of the housing 300, etc., so that the friction applied on the spherical guiding roller 700 may be reduced.

Figure 33:
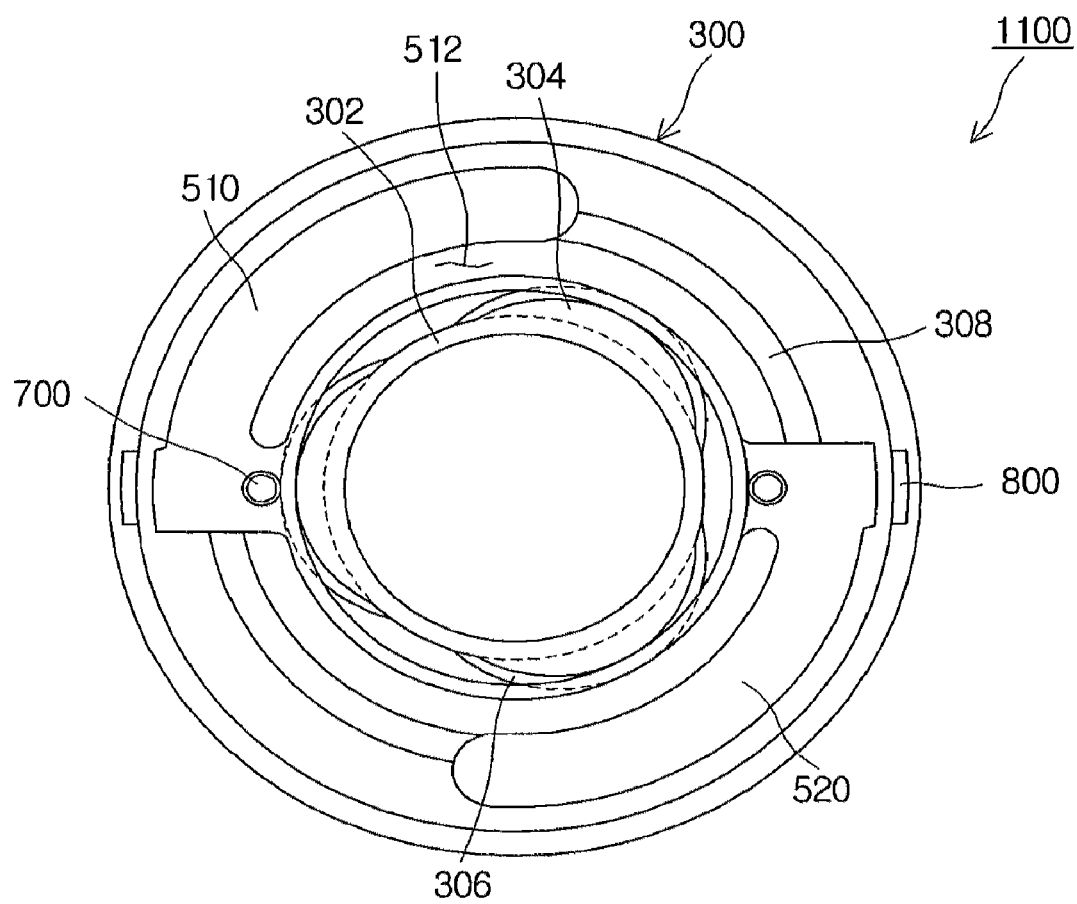
FIG. 33 is a bottom view of an auto-balancing device according to the sixth disclosed embodiment of the invention, in a balanced state.

FIG. 33 is a bottom view of an auto-balancing device 1100 according to the sixth disclosed embodiment of the invention in a balanced state. FIG. 33 illustrates the auto-balancing device 1100 when the motor 1000 is in a balanced state. In this particular embodiment, the balancing members 510, 520 are inserted in the housing 300 in the same orientation, to be arranged inside the housing 300 in symmetry with respect to the rotation shaft 102 of the motor 1000.

In a balanced state, the magnets 800 may be adjacent to the first and second balancing members 510, 520, and may selectively restrain their movement. The selective restraining refers to how the magnets 800 may restrain the first and second balancing members 510, 520 in particular positions by way of magnetic attraction, until the centrifugal forces applied on the balancing members 510, 520 exceed the attractive forces of the magnets 800, when the magnets 800 may no longer restrain the first and second balancing members 510, 520.

Figure 34:
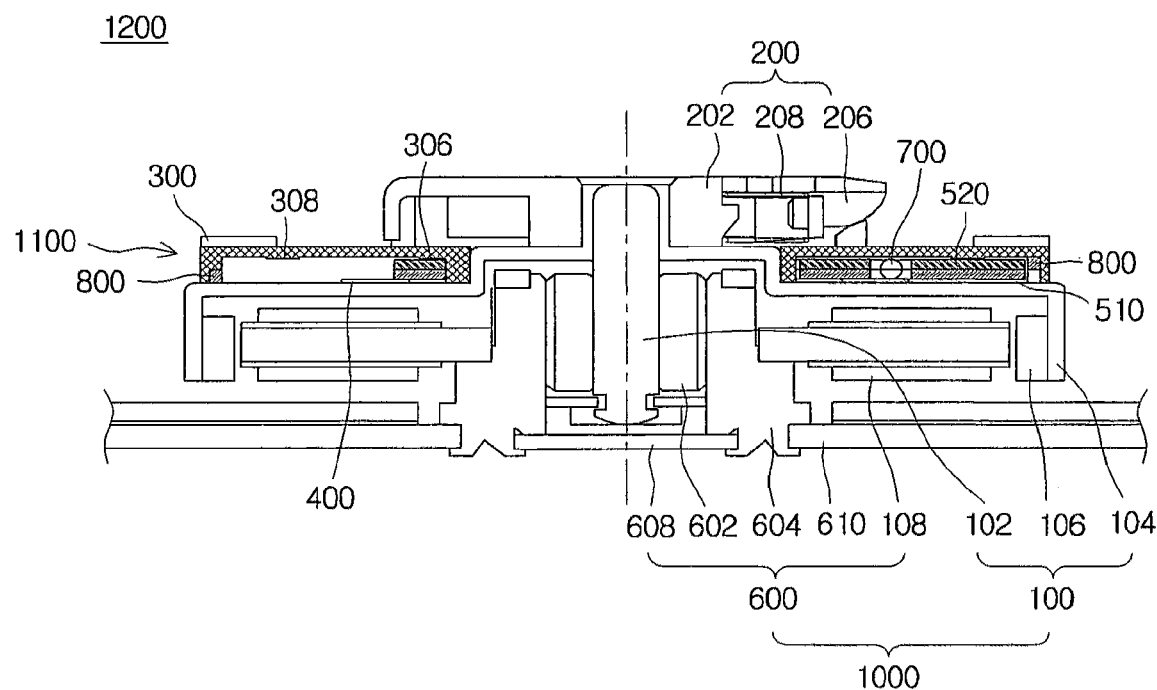
FIG. 34 is a cross-sectional view of a disc driving device according to the sixth disclosed embodiment of the invention, in an unbalanced state.
Figure 35:
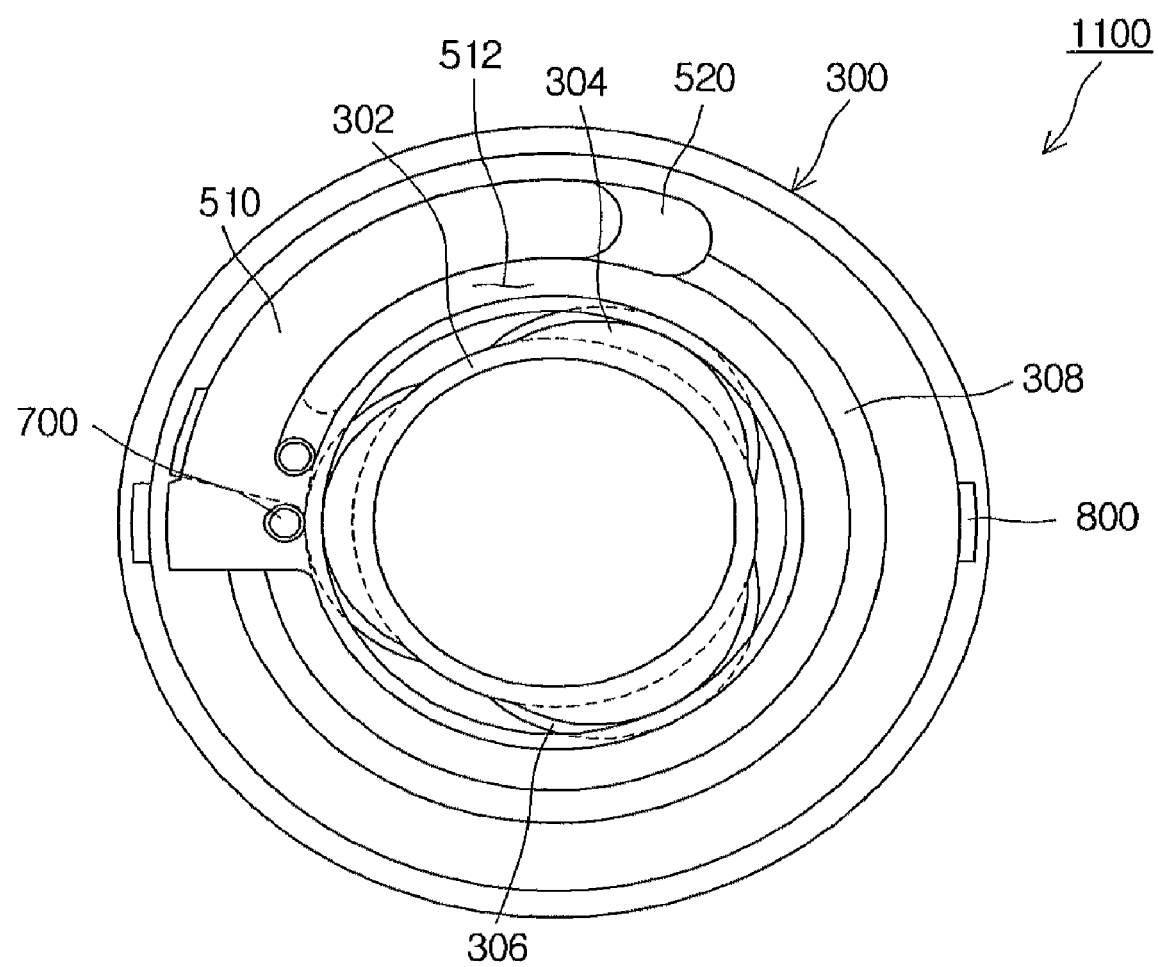
FIG. 35 is a bottom view of an auto-balancing device according to the sixth disclosed embodiment of the invention, in an unbalanced state.
Figure 36:
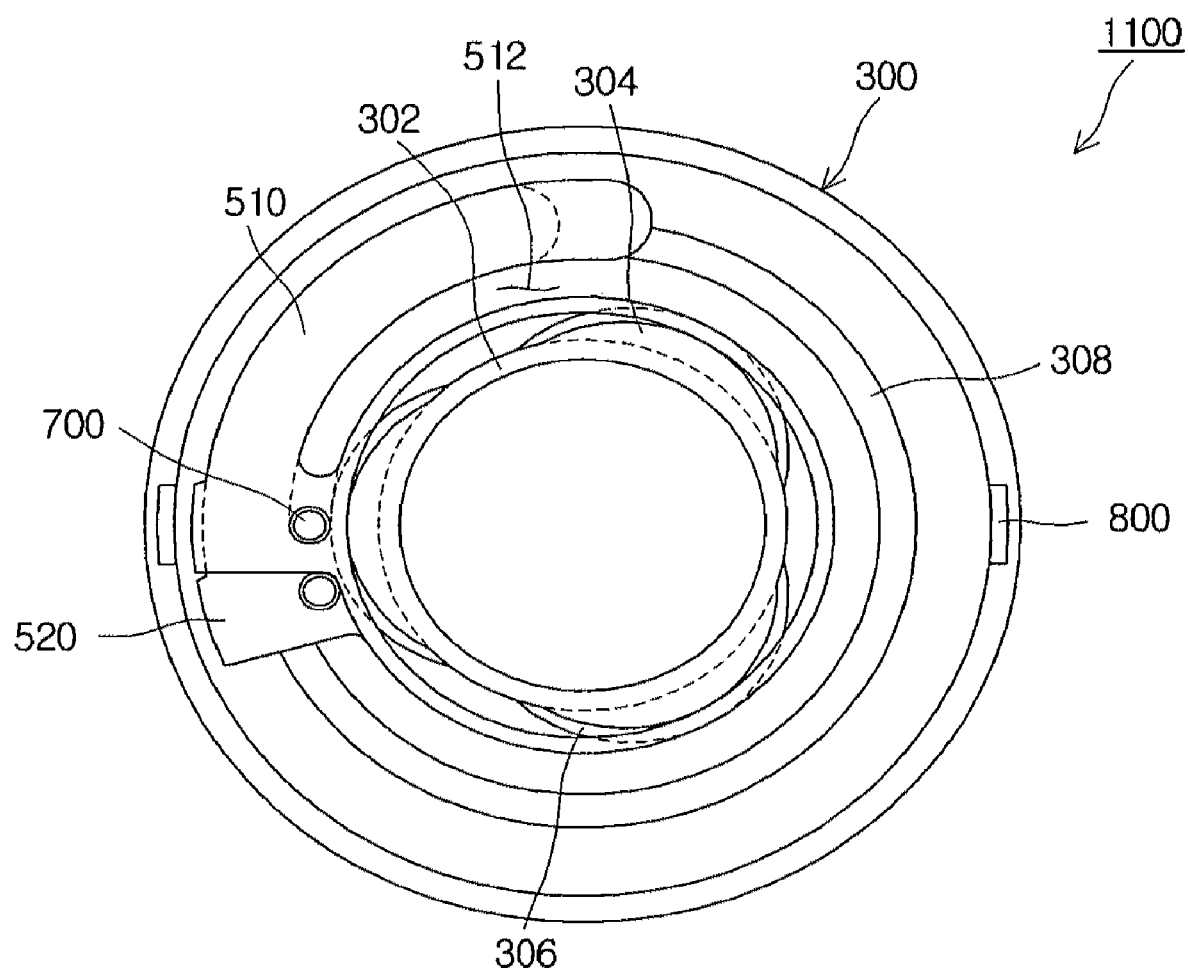
FIG. 36 is a bottom view of another auto-balancing device according to the sixth disclosed embodiment of the invention, in an unbalanced state.

FIG. 34 is a cross-sectional view of a disc driving device 1200 according to the sixth disclosed embodiment of the invention in an unbalanced state, FIG. 35 is a bottom view of an auto-balancing device 1100 according to the sixth disclosed embodiment of the invention in an unbalanced state, and FIG. 36 is a bottom view of another auto-balancing device 1100 according to the sixth disclosed embodiment of the invention in an unbalanced state.

When the rotation speed of the motor 1000 increases such that the centrifugal forces applied on the balancing members 510, 520 exceed the attractive forces between the magnets 800 and the balancing members 510, 520, the magnets 800 may no longer restrain the movement of the balancing members 510, 520.

As illustrated in FIG. 34, when an unbalance occurs in the disc driving device 1200, the balancing members 510, 520 may freely rotate inside the housing 300, and may be disposed concentrated in a particular area of the housing 300, to resolve the unbalance in the disc driving device 1200.

Also, as illustrated in FIGS. 35 and 36, the second guiding roller 700 can be held in the receiving indentation 512 formed in the mass 504 of the first balancing member 510, allowing the first and second balancing members 510, 520 to be arranged in a more concentrated area.

As described above, an auto-balancing device 1100 according to this embodiment uses a simple composition to implement a vibration reduction function for a disc driving device 1200, to provide possibilities for reductions in manufacture or assembly costs.

Figure 37:
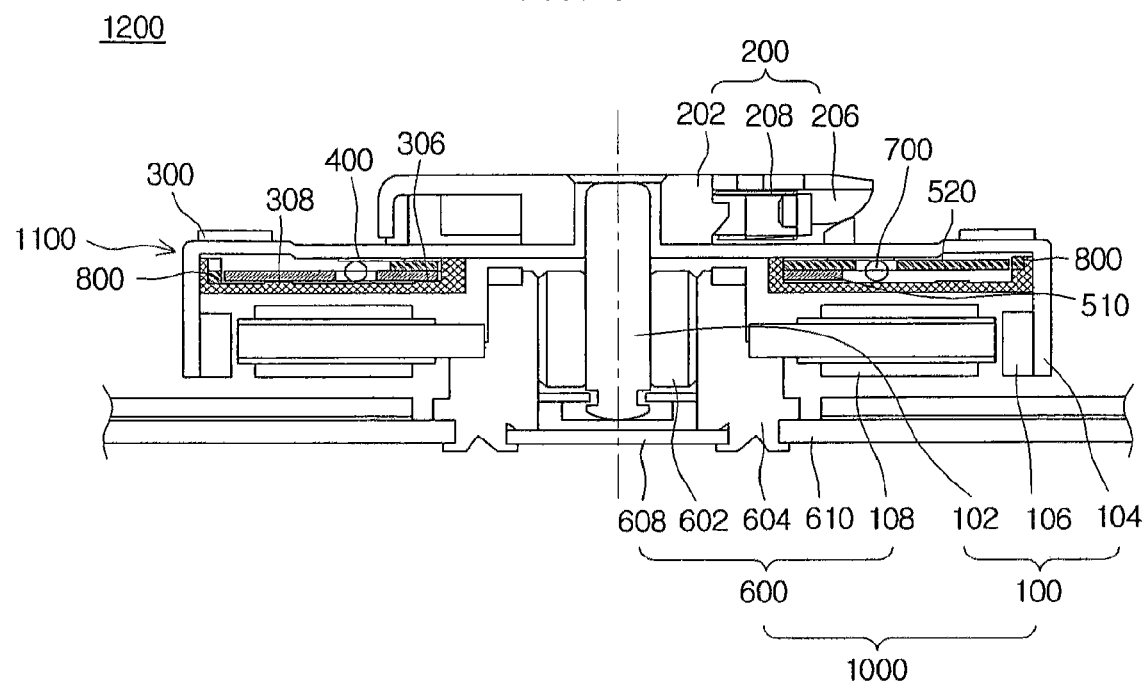
FIG. 37 is a cross-sectional view of a disc driving device according to a seventh disclosed embodiment of the invention, in a balanced state.

FIG. 37 is a cross-sectional view of a disc driving device 1200 according to a seventh disclosed embodiment of the invention in a balanced state. This embodiment illustrates a disc driving device 1200 in which the auto-balancing device 1100 is coupled to an inner side of the rotor 100. The components, other than the auto-balancing device 1100, of a disc driving device 1200 according to this embodiment can be substantially the same as those of a disc driving device 1200 based on the sixth disclosed embodiment of the invention described above.

An auto-balancing device 1100 based on this embodiment may use balancing members 510, 520 to reduce vibration in a disc driving device 1200, and may be manufactured to have a simple and thin structure. As such, if there is room inside the rotor 100 in which the auto-balancing device 1100 can be installed, the auto-balancing device 1100 may be coupled on without modifying the structure of the motor 1000. As a result, a disc driving device 1200 may be implemented with a smaller thickness.

The coupling position of an auto-balancing device based on an embodiment of the invention may vary according to the structure of the motor, and is not limited to the inside or outside of the rotor.

Figure 38:
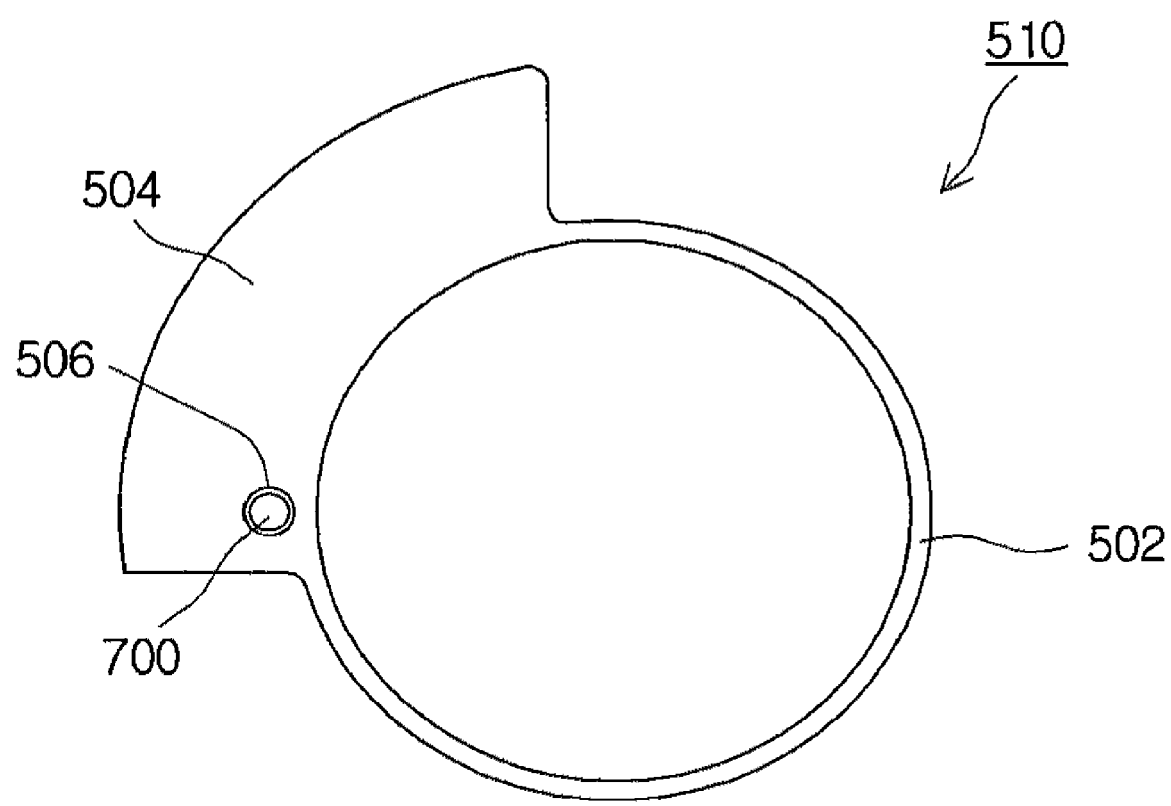
FIG. 38 is a plan view of a first balancing member in an auto-balancing device according to an eighth disclosed embodiment of the invention.
Figure 39:
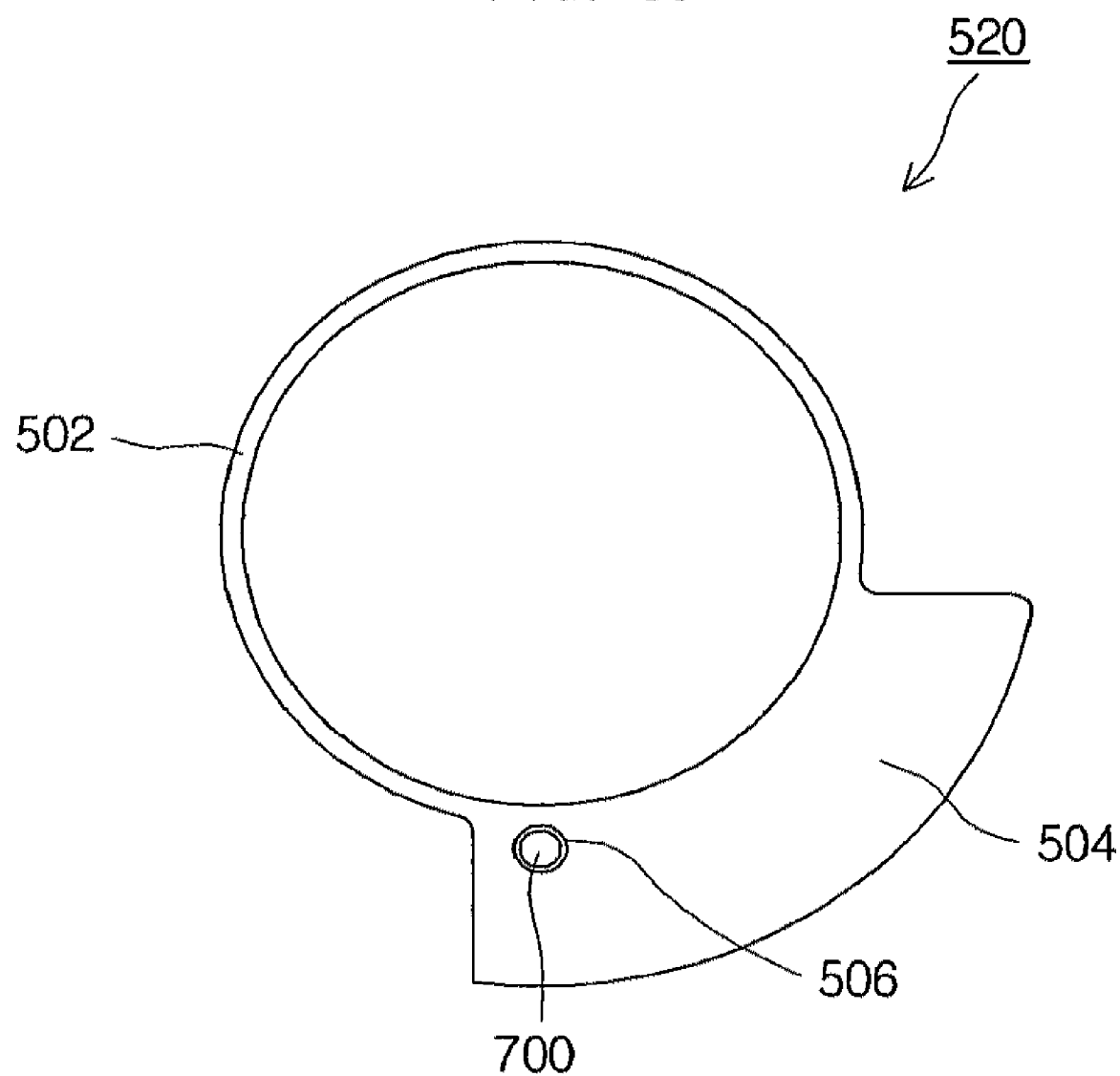
FIG. 39 is a plan view of a second balancing member in an auto-balancing device according to the eighth disclosed embodiment of the invention.
Figure 40:
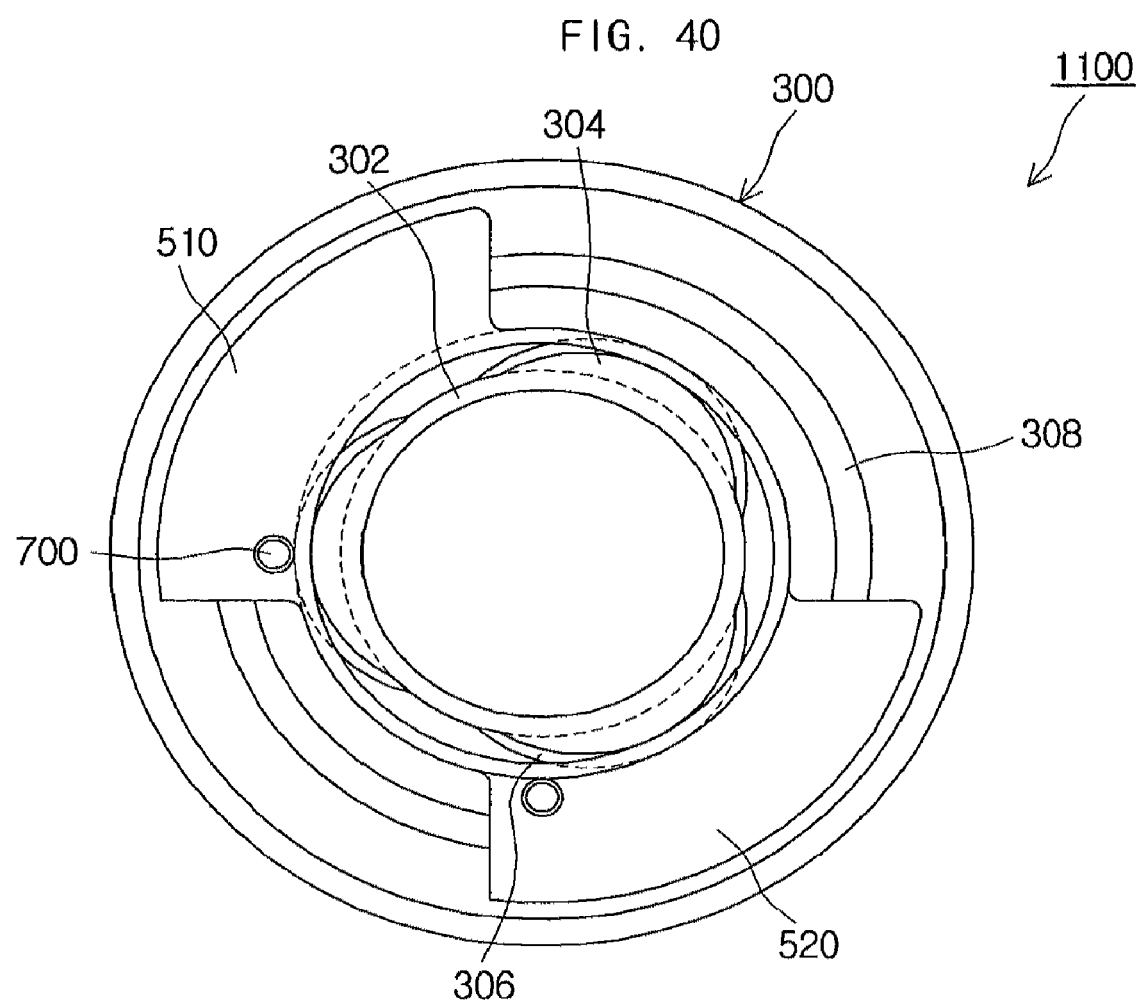
FIG. 40 is a bottom view of an auto-balancing device according to the eighth disclosed embodiment of the invention.

FIG. 38 is a plan view of a first balancing member 510 in an auto-balancing device 1100 according to an eighth disclosed embodiment of the invention, FIG. 39 is a plan view of a second balancing member 520 in an auto-balancing device 1100 according to the eighth disclosed embodiment of the invention, and FIG. 40 is a bottom view of an auto-balancing device 1100 according to the eighth disclosed embodiment of the invention.

The auto-balancing device 1100 according to this embodiment includes balancing members 510, 520 having a different structure. As illustrated in FIGS. 38 to 40, the first and second balancing members 510, 520 may be inserted in opposite orientations. FIG. 40 shows the arrangement of the first and second balancing members 510, 520 when the disc driving device 1200 is in a balanced state. The components, other than the auto-balancing device 1100, of a disc driving device 1200 according to this embodiment can be substantially the same as those of a disc driving device 1200 based on the sixth disclosed embodiment of the invention described above.

In a balanced state, the first and second balancing members 510, 520 may be evenly distributed inside the housing 300. In a balanced state, the first and second balancing members 510, 520 may be arranged in a symmetrical form with respect to the rotation shaft 102, due to the centrifugal force acting on each of the balancing members 510, 520. As such, in the disc driving device 1200 overall, the eccentric masses 504 of the balancing members 510, 520 may not affect the rotation of the motor 1000.

Figure 41:
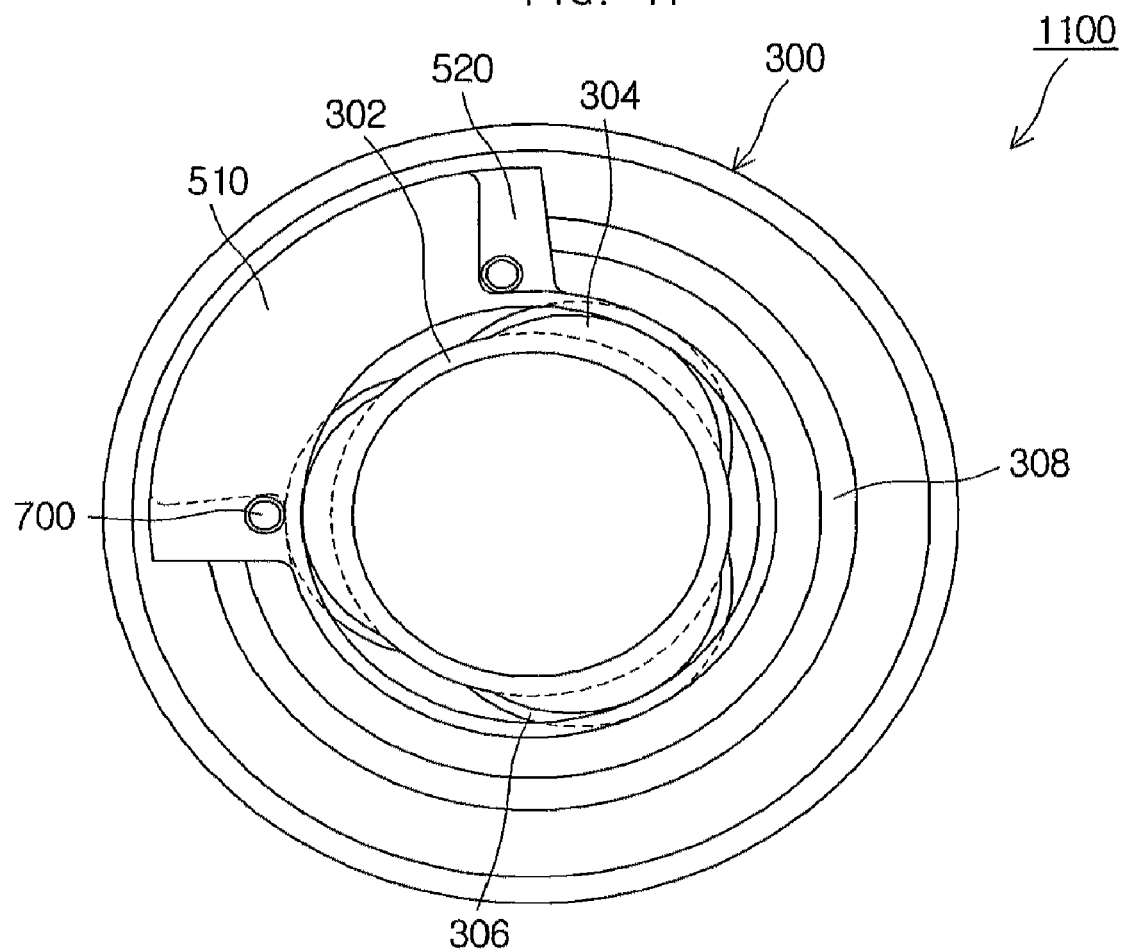
FIG. 41 is a bottom view of an auto-balancing device according to the eighth disclosed embodiment of the invention, in an unbalanced state.
Figure 42:
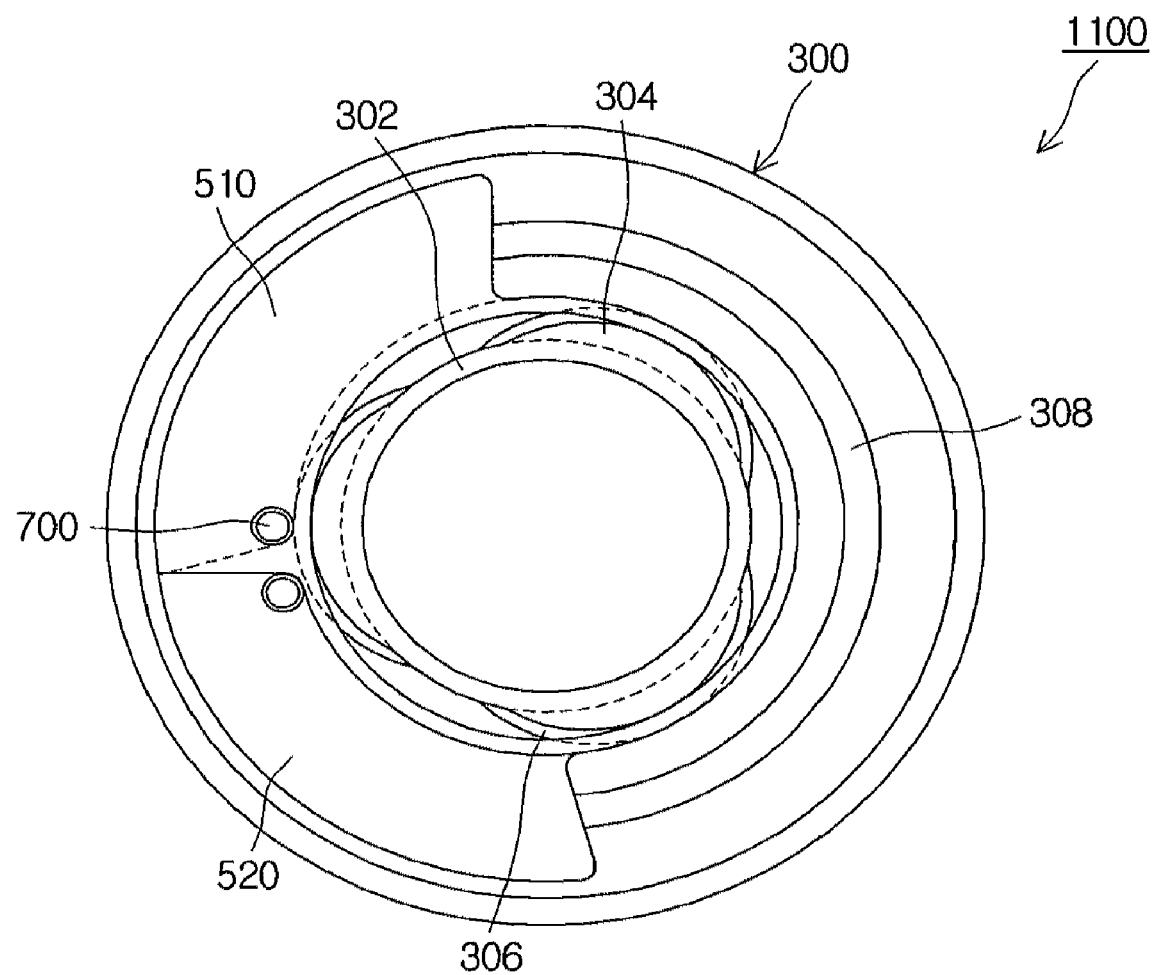
FIG. 42 is a bottom view of another auto-balancing device according to the eighth disclosed embodiment of the invention, in an unbalanced state.

FIG. 41 is a bottom view of an auto-balancing device 1100 according to the eighth disclosed embodiment of the invention in an unbalanced state, and FIG. 42 is a bottom view of another auto-balancing device 1100 according to the eighth disclosed embodiment of the invention in an unbalanced state.

The balancing members 510, 520 of this embodiment, while in an unbalanced state, may rotate freely within the inside of the housing 300, to be arranged concentrated in a particular area inside the housing 300 and resolve the unbalanced state. Because the first and second balancing members 510, 520 may be inserted in opposite orientations, as illustrated in FIG. 41, they may be arranged in a more concentrated form according to the operating direction of the motor 1000. Of course, in this case, the movement of the balancing members 510, 520 may be guided by the guiding rollers 700.

Figure 43:
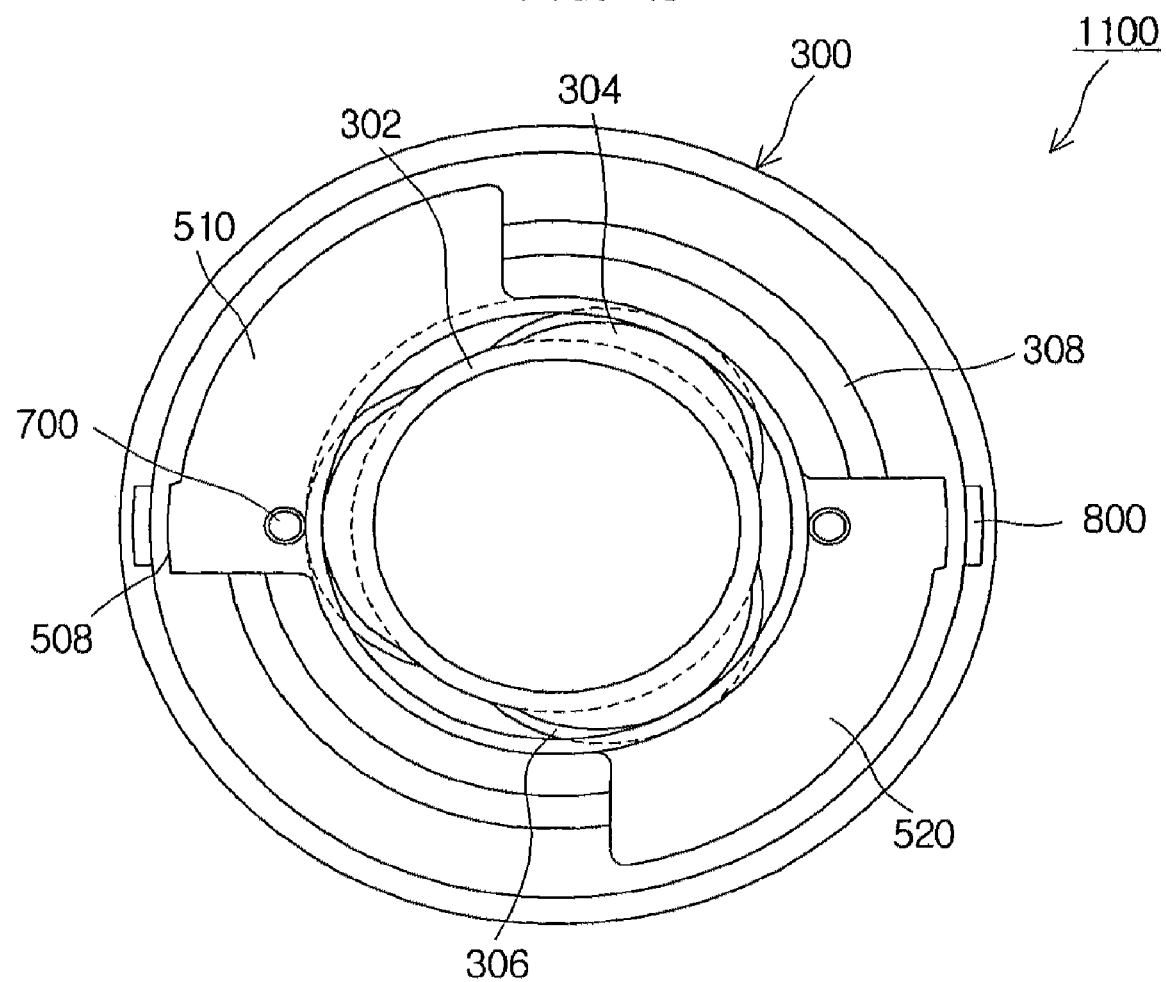
FIG. 43 is a bottom view of an auto-balancing device according to a ninth disclosed embodiment of the invention, in a balanced state.
Figure 44:
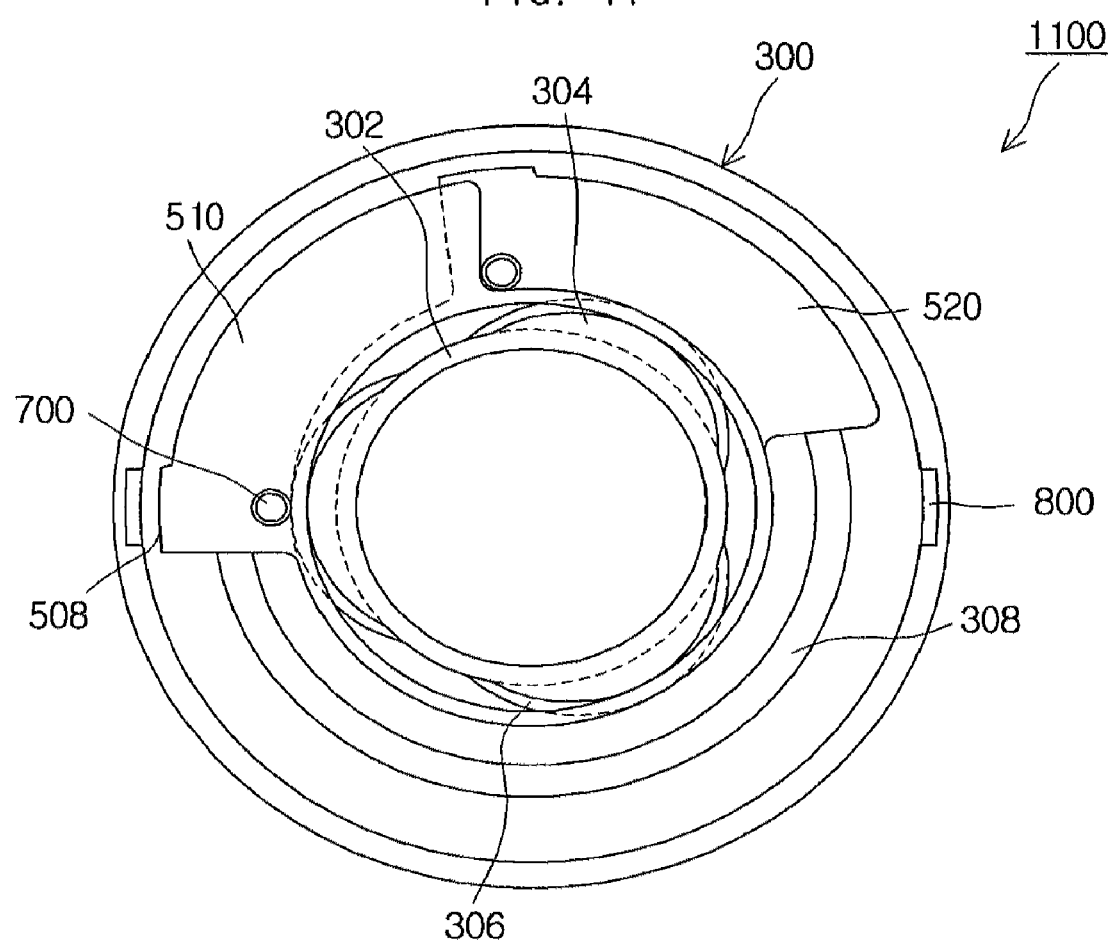
FIG. 44 is a bottom view of an auto-balancing device according to the ninth disclosed embodiment of the invention, in an unbalanced state.
Figure 45:
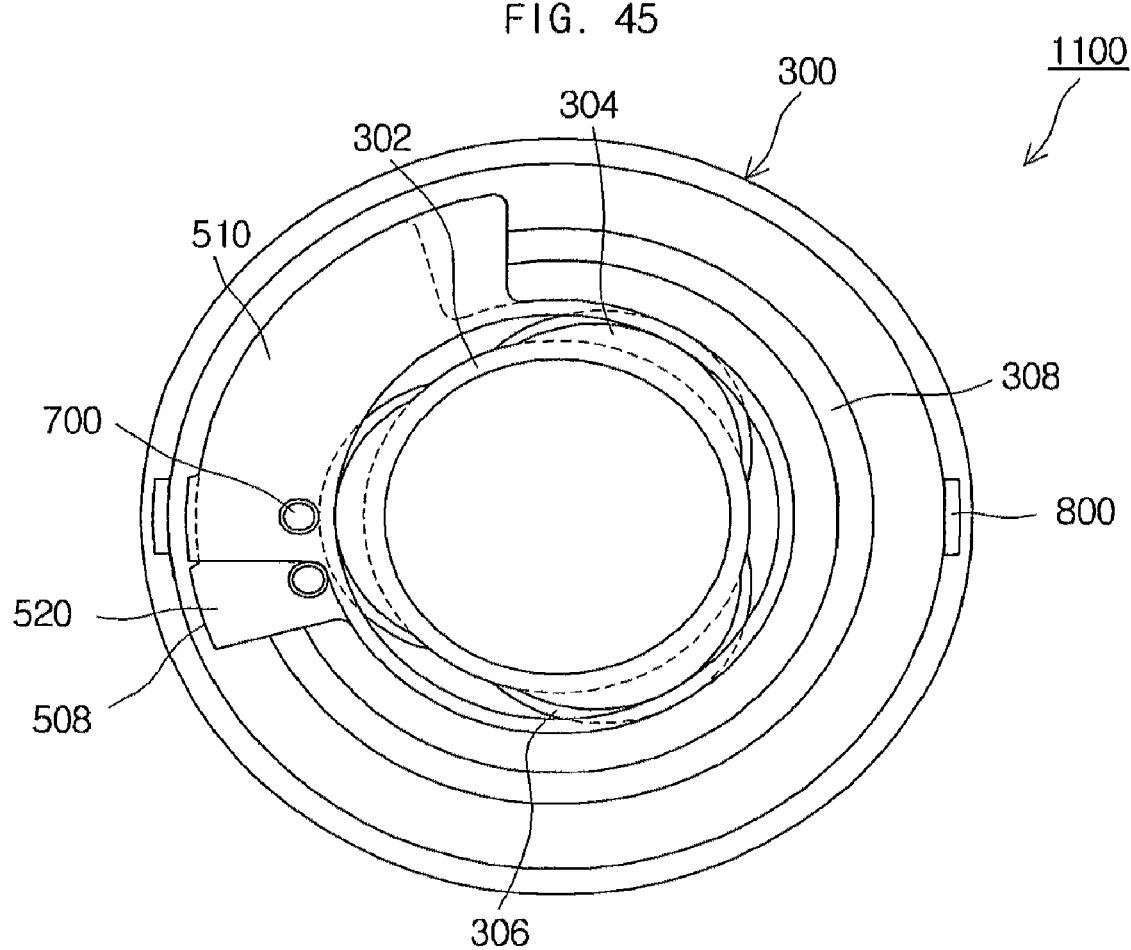
FIG. 45 is a bottom view of another auto-balancing device according to the ninth disclosed embodiment of the invention, in an unbalanced state.

FIG. 43 is a bottom view of an auto-balancing device 1100 according to a ninth disclosed embodiment of the invention in a balanced state, FIG. 44 is a bottom view of an auto-balancing device 1100 according to the ninth disclosed embodiment of the invention in an unbalanced state, and FIG. 45 is a bottom view of another auto-balancing device 1100 according to the ninth disclosed embodiment of the invention in an unbalanced state.

In the disc driving device 1200 of this embodiment, the balancing members 510, 520 are differently, compared to the first and second balancing members 510, 520 of the eighth disclosed embodiment of the invention described above. Also, magnets 800 may be coupled onto predetermined positions on an inner perimeter of the housing 300, and a protruding portion 508 may be formed on the outer perimeter of each of the first and second balancing members 510, 520, such that the protruding portions 508 are adjacent to the magnets 800.

As illustrated in FIG. 43, in a balanced state, the first and second balancing members 510, 520 may be arranged in the housing 300 in symmetry with respect to the rotation shaft 102. Here, the magnets 800 may be adjacent to the portions protruding from the outer perimeters of the first and second balancing members 510, 520, so that the magnetic attraction may restrain the first and second balancing members 510, 520. In other words, the attractive forces between the magnets 800 and the first and second balancing members 510, 520 may be greater than the centrifugal forces acting on the first and second balancing members 510, 520.

In a balanced state, the first and second balancing members 510, 520 may be maintained at particular positions by the magnets 800, not to impose unnecessary loads on the motor 1000. Also, when the motor 1000 starts rotation or undergoes low-speed rotations, unnecessary movement of the balancing members 510, 520 may be removed, to prevent or reduce the occurrence of noise or vibration in the auto-balancing device 1100.

Such features of this embodiment can be of particular importance for the auto-balancing device 1100, when the rotation shaft 102 of the disc driving device 1200 is installed at an angle with the direction of gravity.

As illustrated in FIGS. 44 and 45, when the rotation speed of the disc driving device 1200 increases, such that the centrifugal forces applied on the first and second balancing members 510, 520 exceed the attractive forces between the magnets 800 and the first and second balancing members 510, 520, the magnets 800 may no longer restrain the movement of the first and second balancing members 510, 520. As such, when the disc driving device 1200 is in an unbalanced state, the first and second balancing members 510, 520 may rotate to particular areas of the housing 300 to resolve the unbalance in the disc driving device 1200.

Here, the guiding roller 700 of the second balancing member 520 may touch against the first balancing member 510, so that the first and second balancing members 510, 520 may not overlap any further. In this way, the guiding rollers 700 can guide the movement of the first and second balancing members 510, 520.

Figure 46:
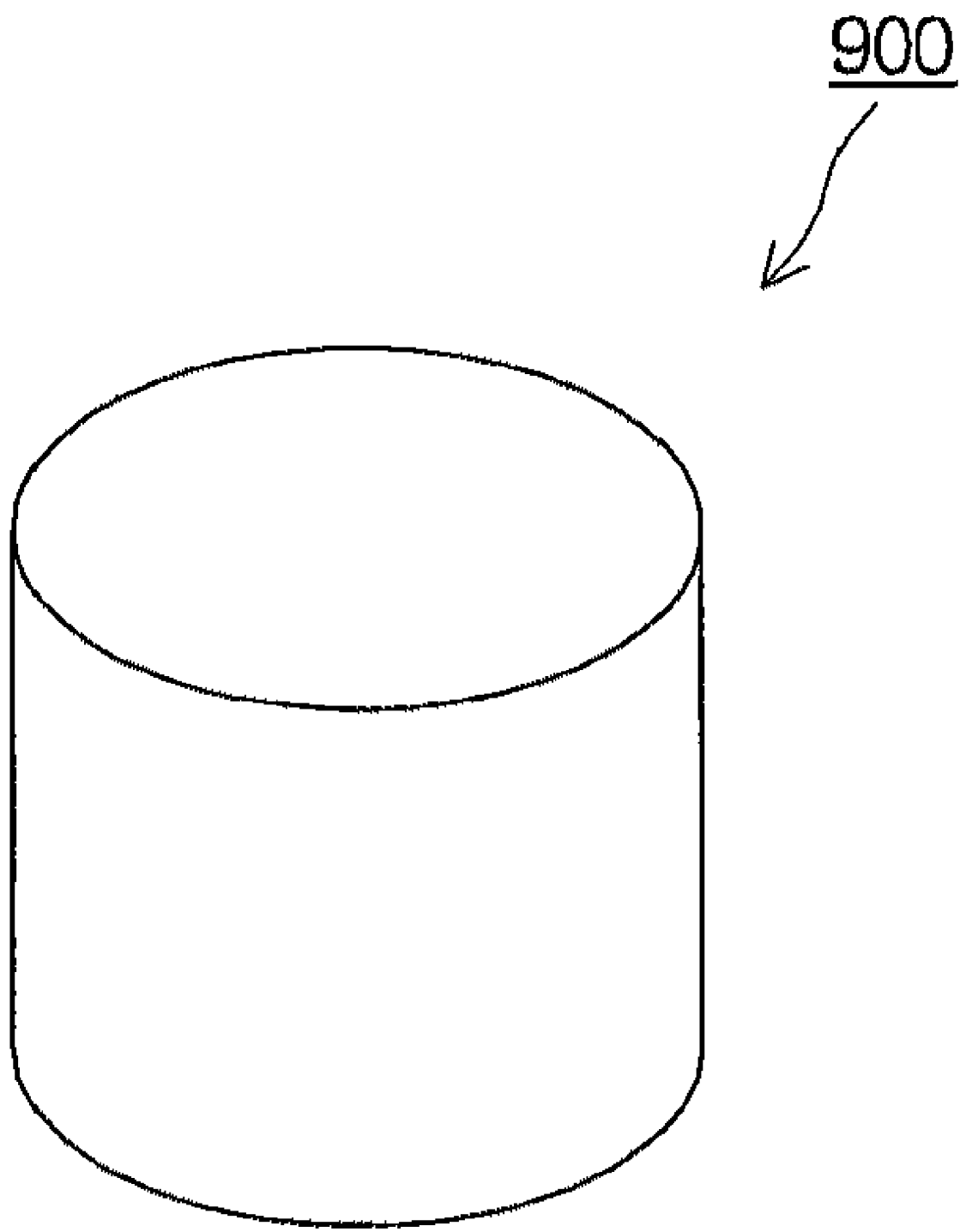
FIG. 46 is a perspective view of a guiding roller in an auto-balancing device according to a tenth disclosed embodiment of the invention.
Figure 47:
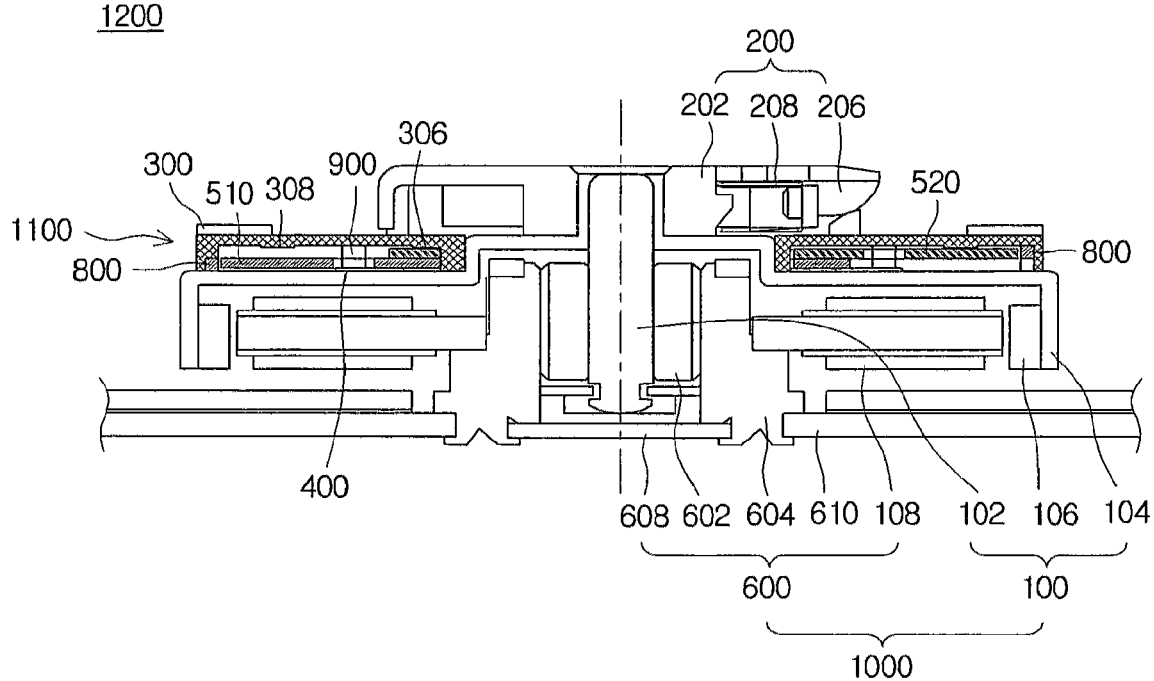
FIG. 47 is a cross-sectional view of a disc driving device according to the tenth disclosed embodiment of the invention, in a balanced state.

FIG. 46 is a perspective view of a guiding roller 900 in an auto-balancing device 1100 according to a tenth disclosed embodiment of the invention, and FIG. 47 is a cross-sectional view of a disc driving device 1200 according to the tenth disclosed embodiment of the invention in a balanced state. As illustrated in FIG. 33, a guiding roller 900 based on this particular embodiment can have a cylindrical shape.

As illustrated in FIG. 46, cylindrical guiding rollers 900 can be inserted in the holes 506, to be rotatably coupled to the first and second balancing members 510, 520, respectively. The cylindrical guiding rollers 900 allow a more effective use of the operating space for the first and second balancing members, 510, 520 and guiding rollers 900 inside the housing 300, and can improve the performance of the auto-balancing device 1100.

As set forth above, certain embodiments of the invention can be utilized to reduce noise and vibration for a rotating body during acceleration and deceleration and during high-speed rotations.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:
1. An auto-balancing device comprising:
a housing coupled with a rotating body and having a boss formed thereon;
a plurality of balancing members rotatably supported by the boss, at least one of the balancing members having a hole formed therein; and
a guiding roller inserted in the hole and configured to guide a movement of the balancing member,
wherein each of the balancing members is a magnetic body, and a magnet is coupled to a predetermined position on an inner perimeter of the housing, the magnet being configured to selectively restrain a movement of the balancing members.

2. The auto-balancing device of claim 1, wherein the balancing members comprise an annular ring inserted onto the boss and a mass coupled to one side of the annular ring.

3. The auto-balancing device of claim 2, wherein a plurality of first protrusions are formed on an outer perimeter of the boss, the first protrusions configured to contact an inner perimeter of the annular ring.

4. The auto-balancing device of claim 2, wherein a second protrusion is formed on a bottom surface of the housing, the second protrusion configured to support the balancing members.

5. The auto-balancing device of claim 4, wherein the second protrusion is formed on the bottom surface adjacent to the boss such that the second protrusion supports an inner perimeter of the annular ring.

6. The auto-balancing device of claim 4, wherein the second protrusion is formed in an annular shape concentric with the rotating body such that the second protrusion supports the mass.

7. The auto-balancing device of claim 1, wherein the hole is detached from the guiding roller.

8. The auto-balancing device of claim 7, wherein the hole is shaped as an arc, the arc formed along a circumference concentric with the rotating body.

9. The auto-balancing device of claim 1, wherein a portion on an outer perimeter of the balancing members protrudes from the balancing members, the portion being adjacent to the magnet.

10. The auto-balancing device of claim 1, wherein a holding indentation is formed in the inner perimeter, and the magnet is inserted in the holding indentation.

11. The auto-balancing device of claim 10, wherein a side wall of the holding indentation slants towards an inside surface of the holding indentation such that the magnet is restrained in a configuration facing a center of rotation of the rotating body.

12. The auto-balancing device of claim 11, wherein the magnet is detached in the holding indentation.

13. The auto-balancing device of claim 1, wherein a receiving indentation is formed in an outer perimeter of the balancing members along an imaginary circumference, the imaginary circumference being concentric with the balancing members and passing through the guiding roller.

14. The auto-balancing device of claim 1, further comprising:
a sliding disc supporting the guiding roller and the balancing members.

15. The auto-balancing device of claim 14, wherein the sliding disc comprises a lubrication layer on a surface thereof.

16. The auto-balancing device of claim 15, wherein the lubrication layer comprises a hard metal coating layer.

17. The auto-balancing device of claim 1, wherein the guiding roller has a cylindrical shape.

18. The auto-balancing device of claim 1, wherein the guiding roller has a spherical shape.

19. A disc chucking device comprising:
a chuck base;
a plurality of chuck pins inserted in the chuck base such that the chuck pins protrude outwards from the chuck base;
an elastic member coupled to the chuck base and configured to elastically support at least one of the chuck pins;
a boss formed on an inside of the chuck base;
a plurality of balancing members rotatably supported by the boss, at least one of the balancing members having a hole formed therein; and
a guiding roller inserted in the hole and configured to guide a movement of the balancing member,
wherein each of the balancing members is a magnetic body, and
a magnet is coupled to a predetermined position on an inner perimeter of the chuck base, the magnet being configured to selectively restrain a movement of the balancing members.

20. The disc chucking device of claim 19, wherein the balancing members comprises an annular ring inserted onto the boss and a mass coupled to one side of the annular ring.

21. The disc chucking device of claim 20, wherein a plurality of first protrusions are formed on an outer perimeter of the boss, the first protrusions configured to contact an inner perimeter of the annular ring.

22. The disc chucking device of claim 20, wherein a second protrusion is formed on a bottom surface of the chuck base, the second protrusion configured to support the balancing members.

23. The disc chucking device of claim 22, wherein the second protrusion is formed on the bottom surface adjacent to the boss such that the second protrusion supports an inner perimeter of the annular ring.

24. The disc chucking device of claim 22, wherein the second protrusion is formed in an annular shape concentric with the chuck base such that the second protrusion supports the mass.

25. The disc chucking device of claim 19, wherein the hole is detached from the guiding roller.

26. The disc chucking device of claim 25, wherein the hole is shaped as an arc, the arc formed along a circumference concentric with the chuck base.

27. The disc chucking device of claim 19, wherein a portion on an outer perimeter of the balancing members protrudes from the balancing members, the portion being adjacent to the magnet.

28. The disc chucking device of claim 19, wherein a holding indentation is formed in the inner perimeter, and the magnet is inserted in the holding indentation.

29. The disc chucking device of claim 28, wherein a side wall of the holding indentation slants towards an inside surface of the holding indentation such that the magnet is restrained in a configuration facing a center of rotation of the chuck base.

30. The disc chucking device of claim 29, wherein the magnet is detached in the holding indentation.

31. The disc chucking device of claim 19, wherein a receiving indentation is formed in an outer perimeter of the balancing members along an imaginary circumference, the imaginary circumference being concentric with the balancing members and passing through the guiding roller.

32. The disc chucking device of claim 19, further comprising:
a sliding disc supporting the guiding roller and the balancing members.

33. The disc chucking device of claim 32, wherein the sliding disc comprises a lubrication layer on a surface thereof.

34. The disc chucking device of claim 33, wherein the lubrication layer comprises a hard metal coating layer.

35. The disc chucking device of claim 19, wherein the guiding roller has a cylindrical shape.

36. The disc chucking device of claim 19, wherein the guiding roller has a spherical shape.

37. A disc driving device for driving a disc, the disc driving device comprising:
- a stator;
- a rotor configured to rotate relatively to the stator;
- a disc chucking device coupled to one end of the rotor and configured to separably couple with the disc;
- a housing coupled with the rotor and having a boss formed thereon;
- a plurality of balancing members rotatably supported by the boss, at least one of the balancing members having a hole formed therein; and
- a guiding roller inserted in the hole and configured to guide a movement of the balancing member,
- wherein each of the balancing members is a magnetic body, and
- a magnet is coupled to a predetermined position on an inner perimeter of the housing, the magnet being configured to selectively restrain a movement of the balancing members.

38. The disc driving device of claim 37, wherein the balancing members comprise an annular ring inserted onto the boss and a mass coupled to one side of the annular ring.

39. The disc driving device of claim 38, wherein a plurality of first protrusions are formed on an outer perimeter of the boss, the first protrusions configured to contact an inner perimeter of the annular ring.

40. The disc driving device of claim 38, wherein a second protrusion is formed on a bottom surface of the housing, the second protrusion configured to support the balancing members.

41. The disc driving device of claim 40, wherein the second protrusion is formed on the bottom surface adjacent to the boss such that the second protrusion supports an inner perimeter of the annular ring.

42. The disc driving device of claim 40, wherein the second protrusion is formed in an annular shape concentric with the rotor such that the second protrusion supports the mass.

43. The disc driving device of claim 37, wherein the hole is detached from the guiding roller.

44. The disc driving device of claim 43, wherein the hole is shaped as an arc, the arc formed along a circumference concentric with the rotor.

45. The disc driving device of claim 37, wherein a portion on an outer perimeter of the balancing members protrudes from the balancing members, the portion being adjacent to the magnet.

46. The disc driving device of claim 37, wherein a receiving indentation is formed in an outer perimeter of the balancing members along an imaginary circumference, the imaginary circumference being concentric with the balancing members and passing through the guiding roller.

47. The disc driving device of claim 37, further comprising:
- a sliding disc supporting the guiding roller and the balancing members.

48. The disc driving device of claim 47, wherein the sliding disc comprises a lubrication layer on a surface thereof.

49. The disc driving device of claim 48, wherein the lubrication layer comprises a hard metal coating layer.

50. The disc driving device of claim 37, wherein the guiding roller has a cylindrical shape.

51. The disc driving device of claim 37, wherein the guiding roller has a spherical shape.

* * * * *